United States Patent
Yamada et al.

(10) Patent No.: US 10,686,223 B2
(45) Date of Patent: Jun. 16, 2020

(54) NONAQUEOUS ELECTROLYTE SECONDARY BATTERY

(71) Applicants: THE UNIVERSITY OF TOKYO, Tokyo (JP); KABUSHIKI KAISHA TOYOTA JIDOSHOKKI, Kariya-shi, Aichi-ken (JP)

(72) Inventors: Atsuo Yamada, Tokyo (JP); Yuki Yamada, Tokyo (JP); Kohei Mase, Kariya (JP); Tomoyuki Kawai, Kariya (JP); Yoshihiro Nakagaki, Kariya (JP); Yuki Hasegawa, Kariya (JP); Nobuhiro Goda, Kariya (JP)

(73) Assignees: KABUSHIKI KAISHA TOYOTA JIDOSHOKKI, Kariya-shi (JP); THE UNIVERSITY OF TOKYO, Tokyo (JP)

( * ) Notice: Subject to any disclaimer, the term of this patent is extended or adjusted under 35 U.S.C. 154(b) by 536 days.

(21) Appl. No.: 15/024,418

(22) PCT Filed: Sep. 25, 2014

(86) PCT No.: PCT/JP2014/004916
§ 371 (c)(1),
(2) Date: Mar. 24, 2016

(87) PCT Pub. No.: WO2015/045392
PCT Pub. Date: Apr. 2, 2015

(65) Prior Publication Data
US 2016/0233548 A1 Aug. 11, 2016

(30) Foreign Application Priority Data

Sep. 25, 2013 (JP) .................. 2013-198593
Dec. 10, 2013 (JP) .................. 2013-255080
Sep. 12, 2014 (JP) .................. 2014-186386

(51) Int. Cl.
*H01M 10/0568* (2010.01)
*H01M 4/66* (2006.01)
(Continued)

(52) U.S. Cl.
CPC ....... *H01M 10/0568* (2013.01); *H01M 4/131* (2013.01); *H01M 4/133* (2013.01);
(Continued)

(58) Field of Classification Search
CPC ......... H01M 10/0568; H01M 10/0525; H01M 10/0567; H01M 10/0569; H01M 4/131;
(Continued)

(56) References Cited

U.S. PATENT DOCUMENTS 5,607,485 A * 3/1997 Gozdz .................. C08J 9/28
29/623.5
6,274,271 B1 8/2001 Koshiba et al.
(Continued)

FOREIGN PATENT DOCUMENTS

CA 2625271 A1 9/2009
CN 101164189 A 4/2008
(Continued)

OTHER PUBLICATIONS

Elisabeth Kramer et al., "Dependency of Aluminum Collector Corrosion in Lithium Ion Batteries on the Electrolyte Solvent", ECS Electrochemistry Letters, 2012, pp. C9-C11, vol. 1, No. 5.
(Continued)

*Primary Examiner* — Jimmy Vo
(74) *Attorney, Agent, or Firm* — Sughrue Mion, PLLC

(57) ABSTRACT

To provide a nonaqueous electrolyte secondary battery that suppresses elution of Al from a positive electrode current collector formed of aluminum or an aluminum alloy, and is superior in thermal characteristics and input-output characteristics. Provided is a nonaqueous electrolyte secondary
(Continued)

battery including a positive electrode, a negative electrode, and an electrolytic solution. The positive electrode has a positive electrode current collector formed of aluminum or an aluminum alloy. The electrolytic solution contains a metal salt and an organic solvent having a heteroelement. Regarding an intensity of a peak derived from the organic solvent in a vibrational spectroscopy spectrum of the electrolytic solution, Is>Io is satisfied when an intensity of an original peak of the organic solvent is represented as Io and an intensity of a peak resulting from shifting of the original peak is represented as Is.

22 Claims, 36 Drawing Sheets

(51) Int. Cl.
| | |
|---|---|
| H01M 10/0569 | (2010.01) |
| H01M 10/0567 | (2010.01) |
| H01M 4/131 | (2010.01) |
| H01M 4/133 | (2010.01) |
| H01M 4/505 | (2010.01) |
| H01M 4/525 | (2010.01) |
| H01M 4/587 | (2010.01) |
| H01M 4/62 | (2006.01) |
| H01M 10/0525 | (2010.01) |
| H01M 4/02 | (2006.01) |

(52) U.S. Cl.
CPC ........... *H01M 4/505* (2013.01); *H01M 4/525* (2013.01); *H01M 4/587* (2013.01); *H01M 4/622* (2013.01); *H01M 4/623* (2013.01); *H01M 4/625* (2013.01); *H01M 4/661* (2013.01); *H01M 4/662* (2013.01); *H01M 10/0525* (2013.01); *H01M 10/0567* (2013.01); *H01M 10/0569* (2013.01); *H01M 2004/027* (2013.01); *H01M 2004/028* (2013.01); *H01M 2220/20* (2013.01); *H01M 2220/30* (2013.01); *H01M 2300/0028* (2013.01); *Y02E 60/122* (2013.01); *Y02T 10/7011* (2013.01)

(58) Field of Classification Search
CPC ...... H01M 4/133; H01M 4/505; H01M 4/525; H01M 4/587; H01M 4/622; H01M 4/623; H01M 4/625; H01M 4/661; H01M 4/662
See application file for complete search history.

(56) References Cited

U.S. PATENT DOCUMENTS

| | | |
|---|---|---|
| 6,340,716 B1 | 1/2002 | Armand et al. |
| 6,420,070 B1 | 7/2002 | Kasamatsu et al. |
| 7,622,226 B2 | 11/2009 | Takahashi |
| 8,076,026 B2 | 12/2011 | Muthu et al. |
| 8,148,017 B2 | 4/2012 | Matsui et al. |
| 8,257,865 B2 | 9/2012 | Suzuki et al. |
| 8,568,931 B2 | 10/2013 | Iwaya et al. |
| 8,945,780 B2 | 2/2015 | Odani et al. |
| 8,986,880 B2 | 3/2015 | Odani et al. |
| 9,017,881 B2 | 4/2015 | Lee et al. |
| 9,590,239 B2 | 3/2017 | Abe et al. |
| 2002/0013381 A1 | 1/2002 | Armand et al. |
| 2003/0195269 A1 | 10/2003 | Armand et al. |
| 2004/0094741 A1 | 5/2004 | Sato et al. |
| 2004/0106047 A1 | 6/2004 | Mie et al. |
| 2005/0158631 A1 | 7/2005 | Armand et al. |
| 2005/0221170 A1 | 10/2005 | Takeuchi et al. |
| 2006/0127764 A1 | 6/2006 | Chen et al. |
| 2007/0031729 A1 | 2/2007 | Sato et al. |
| 2007/0205388 A1 | 9/2007 | Armand et al. |
| 2008/0076021 A1 | 3/2008 | Takahashi |
| 2008/0314482 A1 | 12/2008 | Suzuki et al. |
| 2009/0023074 A1 | 1/2009 | Matsui et al. |
| 2009/0130565 A1 | 5/2009 | Matsui et al. |
| 2009/0176164 A1 | 7/2009 | Matsui et al. |
| 2009/0301866 A1 | 12/2009 | Zaghib et al. |
| 2010/0015514 A1 | 1/2010 | Miyagi et al. |
| 2011/0159379 A1* | 6/2011 | Matsumoto ......... H01M 4/0421 429/326 |
| 2011/0183218 A1 | 7/2011 | Odani et al. |
| 2011/0287325 A1 | 11/2011 | Zaghib et al. |
| 2011/0318647 A1 | 12/2011 | Lee et al. |
| 2012/0135308 A1 | 5/2012 | Loveridge et al. |
| 2012/0171580 A1 | 7/2012 | Iwaya et al. |
| 2012/0316716 A1 | 12/2012 | Odani et al. |
| 2013/0022861 A1 | 1/2013 | Miyagi et al. |
| 2013/0164618 A1 | 6/2013 | Konishi |
| 2014/0242458 A1 | 8/2014 | Abe et al. |
| 2015/0050563 A1 | 2/2015 | Yamada et al. |
| 2015/0243936 A1 | 8/2015 | Miyagi et al. |
| 2017/0040593 A1 | 2/2017 | Miyagi et al. |

FOREIGN PATENT DOCUMENTS

| | | |
|---|---|---|
| CN | 101385183 A | 3/2009 |
| CN | 101292389 B | 9/2010 |
| CN | 101882696 A | 11/2010 |
| CN | 102576905 A | 7/2012 |
| EP | 1380569 A1 | 4/2004 |
| EP | 1 906 481 A1 | 4/2008 |
| JP | 6036315 A | 2/1985 |
| JP | 7320783 A | 12/1995 |
| JP | 1027733 A | 1/1998 |
| JP | 1069922 A | 3/1998 |
| JP | 1131637 A | 2/1999 |
| JP | 11154513 A | 6/1999 |
| JP | 2000077100 A | 3/2000 |
| JP | 2001507043 A | 5/2001 |
| JP | 2001266878 A | 9/2001 |
| JP | 2002203562 A | 7/2002 |
| JP | 2003268053 A | 9/2003 |
| JP | 2004111294 A | 4/2004 |
| JP | 2004511887 A | 4/2004 |
| JP | 2005243321 A | 9/2005 |
| JP | 200673434 A | 3/2006 |
| JP | 2006513554 A | 4/2006 |
| JP | 2006-164759 A | 6/2006 |
| JP | 2006164960 A | 6/2006 |
| JP | 2006-324167 A | 11/2006 |
| JP | 200719027 A | 1/2007 |
| JP | 200791573 A | 4/2007 |
| JP | 2007115671 A | 5/2007 |
| JP | 2007243111 A | 9/2007 |
| JP | 200810613 A | 1/2008 |
| JP | 2008501220 A | 1/2008 |
| JP | 2008-47479 A | 2/2008 |
| JP | 2008-53207 A | 3/2008 |
| JP | 2009026514 A | 2/2009 |
| JP | 2009117334 A | 5/2009 |
| JP | 2009123474 A | 6/2009 |
| JP | 2010-097802 A | 4/2010 |
| JP | 2010073489 A | 4/2010 |
| JP | 2010-225539 A | 10/2010 |
| JP | 201154298 A | 3/2011 |
| JP | 2011077051 A | 4/2011 |
| JP | 2011-119053 A | 6/2011 |
| JP | 2011146359 A | 7/2011 |
| JP | 2011-150958 A | 8/2011 |
| JP | 2011216480 A | 10/2011 |
| JP | 4862555 B2 | 1/2012 |
| JP | 201233268 A | 2/2012 |
| JP | 2012504314 A | 2/2012 |
| JP | 2012160345 A | 8/2012 |
| JP | 2013016456 A | 1/2013 |
| JP | 2013-065493 A | 4/2013 |
| JP | 5177211 B2 | 4/2013 |
| JP | 201365575 A | 4/2013 |
| JP | 2013-093242 A | 5/2013 |
| JP | 201382581 A | 5/2013 |

(56) References Cited

FOREIGN PATENT DOCUMENTS

| JP | 2013134922 A | 7/2013 |
|---|---|---|
| JP | 2013137873 A | 7/2013 |
| JP | 2013145724 A | 7/2013 |
| JP | 2013149477 A | 8/2013 |
| JP | 2013178885 A | 9/2013 |
| JP | 2013179067 A | 9/2013 |
| JP | 2014-096528 A | 5/2014 |
| KR | 10-2006-0044479 A | 5/2006 |
| KR | 10-2007-0121034 A | 12/2007 |
| WO | 2004019356 A1 | 3/2004 |
| WO | 2004027789 A1 | 4/2004 |
| WO | 2005076299 A1 | 8/2005 |
| WO | 2006049027 A1 | 5/2006 |
| WO | 2006/115023 A1 | 11/2006 |
| WO | 2007/125682 A1 | 11/2007 |
| WO | 2010130976 A1 | 11/2010 |
| WO | 2011111364 A1 | 9/2011 |

OTHER PUBLICATIONS

Hong-Bo Han et al., "Lithium bis(fluorosulfonyl)imide (LiFSI) as conducting salt for nonaqueous liquid electrolytes for lithium-ion batteries: Physicochemical and electrochemical properties", Journal of Power Sources, 2011, pp. 3623-3632, vol. 196.
Yuki Yamada et al., "Electrochemical Anomalies of Organic Solutions in Crystallinity Gap", 80th Anniversary Convention of Public Interest Incorporated Association "Electrochemical Society", Mar. 29, 2013.
International Search Report for PCT/JP2014/004916 dated Dec. 22, 2014.
Written Opinion for PCT/JP2014/004916 dated Dec. 22, 2014.
M. Yaegashi et al., "Increasing Both Cathodic and Anodic Stability of Ether-Based Electrolyte for Lithium-Ion Batteries", The Electrochemical Society of Japan Dai 79 Kai Taikai Koen Yoshishu, Mar. 29, 2012, p. 83.
Yuki Yamada et al., "Electrochemical Lithium Intercalation into Graphite in Dimethyl Sulfoxide-Based Electrolytes: Effect of Solvation Structure of Lithium Ion", J. Phys. Chem. C, 2010, vol. 114, No. 26, pp. 11680-11685 (6 pgs. total).
Communication dated Aug. 30, 2018 from the Japanese Patent Office in application No. 2015-172655.
Communication dated Sep. 20, 2018 from the Japanese Patent Office in application No. 2015-192458.
Furukawa et al., "Li-Air Battery Using Stabilized Acetonitrile Electrokyte", Abstracts the 53rd Battery Symposium in Japan, The Committee of Battery Technology, The Electrochemical Society of Japan, 2012, p. 455 (3 pages).
Communication dated Jul. 19, 2018 from the Japanese Patent Office in Japanese application No. 2015-172591.
Communication dated Jul. 24, 2018 from the Japanese Patent Office in Japanese application No. 2015-172547.
Communication dated Jul. 24, 2018 from the Japanese Patent Office in Japanese application No. 2015-172553.
Communication dated Jul. 24, 2018 from the Japanese Patent Office in counterpart Japanese application No. 2016-131137.
Communication dated Jul. 24, 2018 from the Japanese Patent Office in Japanese application No. 2016-131147.
Communication dated Jun. 1, 2017 from the State Intellectual Property Office of the P.R.C. in counterpart Application No. 201480053195.4.
Communication dated Jun. 9, 2017 from the State Intellectual Property Office of the P.R.C. in counterpart Application No. 201480053185.0.
Communication dated Jun. 2, 2017 from the State Intellectual Property Office of the P.R.C. in counterpart Application No. 201480053187.X.
Communication dated Jun. 1, 2017 from the State Intellectual Property Office of the P.R.C. in counterpart Application No. 201480053188.4.

Notification of Reasons for Refusal issued by the Japanese Patent Office in JP 2015-192458, a divisional of JP 2014-186298, dated Nov. 20, 2018.
Communication dated Mar. 3, 2017 issued by the Canadian Intellectual Property Office in counterpart Canadian Application No. 2,925,379.
Jun-ichi Yamaki, "Thermal Stability of Materials Used in Lithium-Ion Cells", Netsu Sokutei, The Japan Society of Calorimetry and Thermal Analysis, 2003, vol. 30, No. 1, p. 3.
Makoto Yaegashi, "Developing New Functions of Organic Solutions by Controlling Coordination State of Solvents", Abstracts the 53rd Battery Symposium in Japan, The Committee of Battery Technology, The Electrochemical Society of Japan, Nov. 13, 2012, p. 507.
Takeshi Abe et al., "Solvated Li-Ion Transfer at Interface Between Graphite and Electrolyte", Journal of the Electrochemical Society, 2004, vol. 151, No. 8, pp. A1120-A1123.
Takeshi Abe et al., "Lithium-Ion Transfer at the Interface Between Lithium-Ion Conductive Ceramic Electrolyte and Liquid Electrolyte—A Key to Enhancing the Rate Capability of Lithium-Ion Batteries", Journal of the Electrochemical Society, 2005, vol. 152, No. 11, pp. A2151-A2154.
Yuki Yamada et al., "Kinetics of Lithium Ion Transfer at the Interface between Graphite and Liquids Electrolytes: Effects of Solvent and Surface Film", Langmuir Article, 2009, vol. 25, No. 21, pp. 12766-12770 (6 pgs. total).
M. Yaegashi et al., "Increasing Both Cathodic and Anodic Stability of Ether-Based Electrolyte for Lithium-Ion Batteries", The Electrochemical Society of Japan Dai 79 Kai Taikai Koen Yoshishu, Mar. 29, 2012, p. 83 (6 pgs. total).
Yuki Yamada et al., "Electrochemical Lithium Intercalation in Graphite in Dimethyl Sulfoxide-Based Electrolytes: Effect of Solvation Structure of Lithium Ion", J. Phys. Chem. C, 2010, vol. 114, No. 26, pp. 11680-11685.
Seo, et al., "Electrolyte Solvation and Ionic Association II. Acetonitrile-Lithium Salt Mixtures: Highly Dissociated Salts," Journal of the Electrochemical Society; vol. 159, No. 9 (2012) pp. A1489-A1500.
U.S. Appl. No. 15/024,380, filed Mar. 24, 2016, Atsuo Yamada.
U.S. Appl. No. 15/024,415, filed Mar. 24, 2016, Atsuo Yamada.
U.S. Appl. No. 15/024,436, filed Mar. 24, 2016, Atsuo Yamada.
U.S. Appl. No. 15/024,654, filed Mar. 24, 2016, Atsuo Yamada.
Communication dated Mar. 8, 2017, issued from the European Patent Office in corresponding European Application No. 14848198.9.
Communication dated Aug. 24, 2017, from Korean Intellectual Property Office in application No. 10-2016-7010618.
Communication dated Aug. 22, 2017, from Korean Intellectual Property Office in application No. 10-2016-7010614.
Communication dated Sep. 28, 2017, from Korean Intellectual Property Office in application No. 10-2016-7010615.
Communication dated Aug. 24, 2017, from Korean Intellectual Property Office in application No. 10-2016-7010619.
Communication dated Aug. 24, 2017, from Korean Intellectual Property Office in counterpart application No. 10-2016-7010617.
Office Action dated Jul. 10, 2017 from the United States Patent and Trademark Office in U.S. Appl. No. 15/024,654.
Communication dated Mar. 7, 2018 from the United States Patent and Trademark Office in U.S. Appl. No. 15/024,436.
Communication dated Aug. 31, 2018 from the United States Patent and Trademark Office in U.S. Appl. No. 15/024,380.
Communication dated Jan. 24, 2019 from the United States Patent and Trademark Office in U.S. Appl. No. 15/024,380.
Communication dated Jan. 31, 2019 from the United States Patent and Trademark Office in U.S. Appl. No. 15/024,415.
Communication dated May 2, 2019 from the United States Patent and Trademark Office in U.S. Appl. No. 15/993,729.
Kazuki Yoshida et al., "Electrode Kinetics and Ion Transport Mechanism in Glyme-Li salts Complexes", battery debate lecture gists, Japan, and Inaba, in Committee of Battery Technology, Electrochemical Society of Japan, 2013, with restriction of p. 160 (6 pages).
Akihiro Orita, "Development of high safety energy devices with ionic liquids and proposals for new electrochemical reaction mod-

(56) References Cited

OTHER PUBLICATIONS els", National University Corporation Yokohama National University graduate school engineering prefecture With restriction of doctoral dissertation, Japan, Sep. 24, 2012, shell No. 1491 p. 101-103 (9 pages).

Kazuki Yoshida et al., "Oxidative-Stability Enhancement and Charge Transport Mechanism in Glyme—Lithium Salt Equimolar Complexes", Journal of the American Chemical Society, the U.S., American Chemical Society, 2011, No. 133, p. 13121-13126 (9 pages).

Notification of Reasons for Refusal dated Dec. 6, 2018, issued by the Japanese Patent Office in JP 2015-172655.

Lifei Li et al., "Transport and Electrochemical Properties and Spectral Features of Non-Aqueous Electrolytes Containing LiFSI in Linear Carbonate Solvents", Journal of the Electrochemical Society, vol. 158, No. 2, 2011, pp. A74-A82 (9 pages total).

Lifei, L., et al., "Transport and Electrochemical Properties and Spectral Features of Non-Aqueous Electrolytes Containing LiFSI in Linear Carbonate Solvents", Journal of the Electrochemical Society, U.S.A., vol. 158, issue 2, 2011, pp. A74-A82 (9 pages).

Communication dated Apr. 11, 2019, from the Japanese Patent Office in application No. 2015-192458.

Communication dated Apr. 11, 2019, from the Japanese Patent Office in application No. 2015-172553.

Yamada, Yuki et al., "A Superconcentrated Ether Electrolyte for Fast-Charging Li-Ion Batteries", The Royal Society of Chemistry: Chemical Communications, vol. 49, No. 95, 2013, pp. 11194-11196, doi: 10.1039/c3cc46665e (3 pages).

Communication dated Aug. 14, 2019 from the United States Patent and Trademark Office in U.S. Appl. No. 15/024,380.

Communication dated Jun. 10, 2019, issued by the U.S. Patent and Trademark Office in U.S. Appl. No. 15/024,415.

Communication dated Nov. 15, 2019, from United States Patent and Trademark Office in U.S. Appl. No. 15/993,729.

Communication dated Mar. 3, 2020, from United States Patent and Trademark Office in U.S. Appl. No. 15/024,436.

Wang et al., "Conversion of carbohydrates into 5-hydroxymethylfurfural in an advanced single-phase reaction system consisting of water and 1,2-dimethoxyethane", Rsc Advances, 2015, vol. 5, No. 102, pp. 84014-84021 (8 pages total).

Communication dated Apr. 13, 2020, issued by the U.S. Patent and Trademark Office in U.S. Appl. No. 15/024,380.

'SciFinder—CAS Registry No. 213195-23-4'. SciFinder [online], 2020, [retrieved on Apr. 7, 2020]. Retrieved from the Internet: <URL: https://scifinder.cas.org/scifinder/view/link_v1/substance.html?l=t7c60yhXV6ulSNfs-Mvwca4zCgqKkIZY3EVcwfP34mLvcIP_rO7WqVQFqvw3k1FL>. (Year: 2020) (3 pages total).

\* cited by examiner

NONAQUEOUS ELECTROLYTE SECONDARY BATTERY

CROSS REFERENCE TO RELATED APPLICATIONS

This application is a National Stage of International Application No. PCT/JP2014/004916 filed Sep. 25, 2014, claiming priority based on Japanese Patent Application Nos. 2013-198593 filed Sep. 25, 2013, 2013-255080 filed Dec. 10, 2013, and 2014-186386 filed Sep. 12, 2014, the contents of all of which are incorporated herein by reference in their entirety.

TECHNICAL FIELD

The present invention relates to a nonaqueous electrolyte secondary battery.

BACKGROUND ART

Associated with reduction in size and weight of electronic devices, secondary batteries with high energy density are desired as power supplies for electronic devices. A secondary battery takes out chemical energy, which the positive electrode active material and the negative electrode active material possess, to the outside as electric energy by means of chemical reaction via an electrolyte. Among such secondary batteries, nonaqueous electrolyte secondary batteries that perform charging and discharging by moving ions between a positive electrode and a negative electrode using a nonaqueous electrolyte are known.

A lithium ion secondary battery, which is one type of the nonaqueous electrolyte secondary batteries, is used in various use applications such as mobile phones and electric vehicles (EV). Characteristics demanded for the lithium ion secondary battery includes achieving high energy density, cycle characteristics, and safe operation in various environments.

For a positive electrode current collector of the lithium ion secondary battery, a metal such as Al that forms a stable passive film on a surface thereof for withstanding corrosion due to an electrolyte is commonly used. For example, when Al is used for the positive electrode current collector, a passive film such as $Al_2O_3$ or $AlF_3$ is thought to form on a surface thereof. An Al current collector is unlikely to be corroded since the passive film is formed on a surface thereof, and can maintain current collection function.

In recent years, the lithium ion secondary battery has been demanded to be employable satisfactorily even under a high-voltage usage environment (high-voltage usage is defined in the present application as usage at a voltage equal to or higher than 4.3 V). Under the high-voltage usage environment, the Al current collector can easily corrode gradually even when a passive film is formed on a surface thereof, and elution of Al from the current collector becomes a concern.

In an electrolytic solution of the lithium ion secondary battery, an appropriate electrolyte is added at an appropriate concentration range. For example, in an electrolytic solution of the lithium ion secondary battery, a lithium salt such as $LiClO_4$, $LiAsF_6$, $LiPF_6$, $LiBF_4$, $CF_3SO_3Li$, and $(CF_3SO_2)_2NLi$ is commonly added as an electrolyte, and the concentration of the lithium salt in the electrolytic solution is commonly set at about 1 mol/L.

As a matter of fact, Patent Literature 1 discloses a lithium ion secondary battery using an electrolytic solution containing $LiPF_6$ at a concentration of 1 mol/L. Furthermore, Patent Literature 2 discloses a lithium ion secondary battery using an electrolytic solution containing $(CF_3SO_2)_2NLi$ at a concentration of 1 mol/L.

Regarding elution of Al, for example, in a lithium ion secondary battery using $LiPF_6$ as an electrolyte, $LiPF_6$ is hydrolyzed to generate HF, and the HF is speculated to corrode Al of the current collector. In addition, Non-Patent Literature 1 and Non-Patent Literature 2 disclose that Al elutes from a positive electrode current collector also in a lithium ion secondary battery using an imide salt based electrolyte, such as, $(CF_3SO_2)_2NLi$ (LiTFSA) and $(FSO_2)_2NLi$ (LiFSA), having higher hydrolysis resistance than $LiPF_6$.

CITATION LIST

Patent Literature

Patent Literature 1: JP2008053207 (A)
Patent Literature 2: JP2010225539 (A)

Non-Patent Literature

Non-Patent Literature 1: Journal of Power Sources 196 (2011) 3623-3632
Non-Patent Literature 2: ECS Electrochemistry Letters, 1 (5) C9-C11 (2012)

SUMMARY OF INVENTION

Technical Problem

An object is to provide a nonaqueous electrolyte secondary battery that suppresses elution of Al from a positive electrode current collector formed of aluminum or an aluminum alloy, and that is superior in thermal characteristics and input-output characteristics.

Solution to Problem

As described in Patent Literature 1 and 2, conventionally, in an electrolytic solution used in a lithium ion secondary battery, having a lithium salt contained at a concentration of about 1 mol/L has been technical common knowledge. Contrary to the conventional technical common knowledge, the present inventors focused on the relationship between a metal salt and a solvent in an electrolytic solution, and discovered an electrolytic solution in which the metal salt and the solvent exist in a new state. Surprisingly, the present inventors found that, when the new electrolytic solution and a positive electrode current collector formed of aluminum or an aluminum alloy are combined, elution of Al from the positive electrode current collector is suppressed.

A nonaqueous electrolyte secondary battery of the present invention is a nonaqueous electrolyte secondary battery including a positive electrode, a negative electrode, and an electrolytic solution. The positive electrode has a positive electrode current collector formed of aluminum or an aluminum alloy. The electrolytic solution contains a salt whose cation is an alkali metal, an alkaline earth metal, or aluminum, and an organic solvent having a heteroelement. Regarding an intensity of a peak derived from the organic solvent in a vibrational spectroscopy spectrum of the electrolytic solution, Is>Io is satisfied when an intensity of an original peak of the organic solvent is represented as Io and an intensity of a peak resulting from shifting of the original peak is represented as Is.

The cation of the salt is preferably lithium.

The nonaqueous electrolyte secondary battery of the present invention is preferably a lithium ion secondary battery.

Advantageous Effects of Invention

The nonaqueous electrolyte secondary battery of the present invention can suppress elution of Al from a positive electrode current collector formed of aluminum or an aluminum alloy, and is superior in thermal characteristics and input-output characteristics.

DESCRIPTION OF EMBODIMENTS

Figure 1:
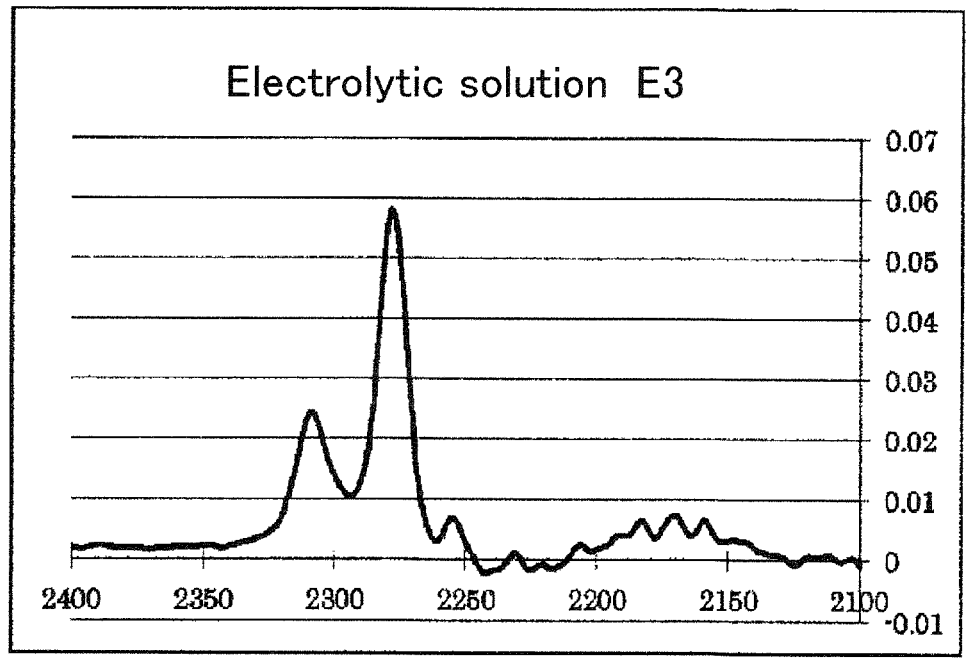
FIG. 1 is an IR spectrum of electrolytic solution E3.

The following describes embodiments of the present invention. Unless mentioned otherwise in particular, a numerical value range of "a to b" described in the present application includes, in the range thereof, a lower limit "a"

and an upper limit "b." A numerical value range can be formed by arbitrarily combining such upper limit values, lower limit values, and numerical values described in Examples. In addition, numerical values arbitrarily selected within the numerical value range can be used as upper limit and lower limit numerical values.

A nonaqueous electrolyte secondary battery of the present invention includes a positive electrode, a negative electrode, and an electrolytic solution.

Examples of the nonaqueous electrolyte secondary battery of the present invention include lithium ion secondary batteries. The nonaqueous electrolyte secondary battery of the present invention has a feature of including the electrolytic solution and a positive electrode having a positive electrode current collector formed of aluminum or an aluminum alloy. Regarding other components included in the nonaqueous electrolyte secondary battery, well-known components suitable for a nonaqueous electrolyte secondary battery can be used.

In the following, the electrolytic solution is described in detail, first.

(Electrolytic Solution)

The electrolytic solution is an electrolytic solution containing a salt (hereinafter, sometimes referred to as "metal salt" or simply "salt") whose cation is an alkali metal, an alkaline earth metal, or aluminum, and an organic solvent having a heteroelement. With regard to an intensity of a peak derived from the organic solvent in a vibrational spectroscopy spectrum of the electrolytic solution, Is>Io is satisfied when an intensity of a peak at a wave number of an original peak of the organic solvent is represented as Io and an intensity of a peak resulting from wave-number shifting of the original peak of the organic solvent is represented as Is.

The relationship between Is and Io in a conventional electrolytic solution is Is<Io.

Hereinafter, in an electrolytic solution containing a salt whose cation is an alkali metal, an alkaline earth metal, or aluminum, and an organic solvent having a heteroelement, regarding an intensity of a peak derived from the organic solvent in a vibrational spectroscopy spectrum of the electrolytic solution, when an intensity of an original peak of the organic solvent is represented as Io and an intensity of a peak resulting from shifting of the original peak is represented as Is; an electrolytic solution satisfying Is>Io is sometimes referred to as "an electrolytic solution of the present invention."

The metal salt may be a compound used as an electrolyte, such as $LiClO_4$, $LiAsF_6$, $LiPF_6$, $LiBF_4$, and $LiAlCl_4$ ordinarily contained in an electrolytic solution of a battery. Examples of a cation of the metal salt include alkali metals such as lithium, sodium, and potassium, alkaline earth metals such as beryllium, magnesium, calcium, strontium, and barium, and aluminum. The cation of the metal salt is preferably a metal ion identical to a charge carrier of the battery in which the electrolytic solution is used. For example, when the electrolytic solution of the present invention is to be used as an electrolytic solution for lithium ion secondary batteries, the cation of the metal salt is preferably lithium.

The chemical structure of an anion of the salt may include at least one element selected from a halogen, boron, nitrogen, oxygen, sulfur, or carbon. Specific examples of the chemical structure of the anion including a halogen or boron include: $ClO_4$, $PF_6$, $AsF_6$, $SbF_6$, $TaF_6$, $BF_4$, $SiF_6$, $B(C_6H_5)_4$, $B(oxalate)_2$, Cl, Br, and I.

The chemical structure of the anion including nitrogen, oxygen, sulfur, or carbon is described specifically in the following.

The chemical structure of the anion of the salt is preferably a chemical structure represented by the following general formula (1), general formula (2), or general formula (3).

$(R^1X^1)(R^2X^2)N$ 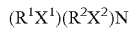 General Formula (1)

($R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^2$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

Furthermore, $R^1$ and $R^2$ optionally bind with each other to form a ring.

$X^1$ is selected from $SO_2$, C=O, C=S, $R^aP$=O, $R^bP$=S, S=O, or Si=O.

$X^2$ is selected from $SO_2$, C=O, C=S, $R^cP$=O, $R^dP$=S, S=O, or Si=O.

$R^a$, $R^b$, $R^c$, and $R^d$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

In addition, $R^a$, $R^b$, $R^c$, and $R^d$ each optionally bind with $R^1$ or $R^2$ to form a ring.)

$R^3X^3Y$  General Formula (2)

($R^3$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$X^3$ is selected from $SO_2$, C=O, C=S, $R^eP$=O, $R^fP$=S, S=O, or Si=O.

$R^e$ and $R^f$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

In addition, $R^e$ and $R^f$ each optionally bind with $R^3$ to form a ring.

Y is selected from O or S.)

$$(R^4X^4)(R^5X^5)(R^6X^6)C \qquad \text{General Formula (3)}$$

($R^4$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^5$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^6$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

In addition, any two or three of $R^4$, $R^5$, and $R^6$ optionally bind with each other to form a ring.

$X^4$ is selected from $SO_2$, C=O, C=S, $R^gP$=O, $R^hP$=S, S=O, or Si=O.

$X^5$ is selected from $SO_2$, C=O, C=S, $R^iP$=O, $R^jP$=S, S=O, or Si=O.

$X^6$ is selected from $SO_2$, C=O, C=S, $R^kP$=O, $R^lP$=S, S=O, or Si=O.

$R^g$, $R^h$, $R^i$, $R^j$, $R^k$, and $R^l$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

In addition, $R^g$, $R^h$, $R^i$, $R^j$, $R^k$, and $R^l$ each optionally bind with $R^4$, $R^5$, or $R^6$ to form a ring.)

The wording of "optionally substituted with a substituent group" in the chemical structures represented by the above described general formulae (1) to (3) is to be described. For example, "an alkyl group optionally substituted with a substituent group" refers to an alkyl group in which one or more hydrogen atoms of the alkyl group is substituted with a substituent group, or an alkyl group not including any particular substituent groups.

Examples of the substituent group in the wording of "optionally substituted with a substituent group" include alkyl groups, alkenyl groups, alkynyl groups, cycloalkyl groups, unsaturated cycloalkyl groups, aromatic groups, heterocyclic groups, halogens, OH, SH, CN, SCN, OCN, nitro group, alkoxy groups, unsaturated alkoxy groups, amino group, alkylamino groups, dialkylamino groups, aryloxy groups, acyl groups, alkoxycarbonyl groups, acyloxy groups, aryloxycarbonyl groups, acylamino groups, alkoxycarbonylamino groups, aryloxycarbonylamino groups, sulfonylamino groups, sulfamoyl groups, carbamoyl group, alkylthio groups, arylthio groups, sulfonyl group, sulfinyl group, ureido groups, phosphoric acid amide groups, sulfo group, carboxyl group, hydroxamic acid groups, sulfino group, hydrazino group, imino group, and silyl group, etc. These substituent groups may be further substituted. In addition, when two or more substituent groups exist, the substituent groups may be identical or different from each other.

The chemical structure of the anion of the salt is more preferably a chemical structure represented by the following general formula (4), general formula (5), or general formula (6).

$$(R^7X^7)(R^8X^8)N \qquad \text{General Formula (4)}$$

($R^7$ and $R^8$ are each independently $C_nH_aF_bCl_cBr_dI_e(CN)_f(SCN)_g(OCN)_h$.

"n," "a," "b," "c," "d," "e," "f," "g," and "h" are each independently an integer not smaller than 0, and satisfy 2n+1=a+b+c+d+e+f+g+h.

In addition, $R^7$ and $R^8$ optionally bind with each other to form a ring, and, in that case, satisfy 2n=a+b+c+d+e+f+g+h.

$X^7$ is selected from $SO_2$, C=O, C=S, R'''P=O, R''P=S, S=O, or Si=O.

$X^8$ is selected from $SO_2$, C=O, C=S, $R^o$P=O, $R^p$P=S, S=O, or Si=O.

$R^m$, $R^n$, $R^o$, and $R^p$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

In addition, $R^m$, $R^n$, $R^o$, and $R^p$ each optionally bind with $R^7$ or $R^8$ to form a ring).

$$R^9 X^9 Y \qquad \text{General Formula (5)}$$

($R^9$ is $C_n H_a F_b Cl_c Br_d I_e (CN)_f (SCN)_g (OCN)_h$.

"n," "a," "b," "c," "d," "e," "f," "g," and "h" are each independently an integer not smaller than 0, and satisfy 2n+1=a+b+c+d+e+f+g+h.

$X^9$ is selected from $SO_2$, C=O, C=S, $R^q$P=O, $R^r$P=S, S=O, or Si=O.

$R^q$ and $R^r$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

In addition, $R^q$ and $R^r$ each optionally bind with $R^9$ to form a ring.

Y is selected from O or S.)

$$(R^{10}X^{10})(R^{11}X^{11})(R^{12}X^{12})C \qquad \text{General Formula (6)}$$

($R^{10}$, $R^{11}$, and $R^{12}$ are each independently $C_n H_a F_b Cl_c Br_d I_e (CN)_f (SCN)_g (OCN)_h$.

"n," "a," "b," "c," "d," "e," "f," "g," and "h" are each independently an integer not smaller than 0, and satisfy 2n+1=a+b+c+d+e+f+g+h.

Any two of $R^{10}$, $R^{11}$ and $R^{12}$ optionally bind with each other to form a ring, and, in that case, groups forming the ring satisfy 2n=a+b+c+d+e+f+g+h. In addition, the three of $R^{10}$, $R^{11}$, and $R^{12}$ optionally bind with each other to form a ring, and, in that case, among the three groups, two groups satisfy 2n=a+b+c+d+e+f+g+h and one group satisfies 2n−1=a+b+c+d+e+f+g+h.

$X^{10}$ is selected from $SO_2$, C=O, C=S, $R^s$P=O, $R^t$P=S, S=O, or Si=O.

$X^{11}$ is selected from $SO_2$, C=O, C=S, $R^u$P=O, $R^v$P=S, S=O, or Si=O.

$X^{12}$ is selected from $SO_2$, C=O, C=S, $R^w$P=O, $R^x$P=S, S=O, or Si=O.

$R^s$, $R^t$, $R^u$, $R^v$, $R^w$, and $R^x$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

In addition, $R^s$, $R^t$, $R^u$, $R^v$, $R^w$, and $R^x$ each optionally bind with $R^{10}$, $R^{11}$, or $R^{12}$ to form a ring.)

In the chemical structures represented by the general formulae (4) to (6), the meaning of the wording of "optionally substituted with a substituent group" is synonymous with that described for the general formulae (1) to (3).

In the chemical structures represented by the general formulae (4) to (6), "n" is preferably an integer from 0 to 6, more preferably an integer from 0 to 4, and particularly preferably an integer from 0 to 2. In the chemical structures represented by the general formulae (4) to (6), when $R^7$ and $R^8$ bind with each other or $R^{10}$, $R^{11}$, and $R^{12}$ bind with each other to form a ring; "n" is preferably an integer from 1 to 8, more preferably an integer from 1 to 7, and particularly preferably an integer from 1 to 3.

The chemical structure of the anion of the salt is further preferably represented by the following general formula (7), general formula (8), or general formula (9).

$$(R^{13}SO_2)(R^{14}SO_2)N \qquad \text{General Formula (7)}$$

($R^{13}$ and $R^{14}$ are each independently $C_n H_a F_b Cl_c Br_d I_e$.

"n," "a," "b," "c," "d," and "e" are each independently an integer not smaller than 0, and satisfy 2n+1=a+b+c+d+e.

In addition, $R^{13}$ and $R^{14}$ optionally bind with each other to form a ring, and, in that case, satisfy 2n=a+b+c+d+e.)

$$R^{15}SO_3 \qquad \text{General Formula (8)}$$

($R^{15}$ is $C_n H_a F_b Cl_c Br_d I_e$.

"n," "a," "b," "c," "d," and "e" are each independently an integer not smaller than 0, and satisfy 2n+1=a+b+c+d+e.)

$$(R^{16}SO_2)(R^{17}SO_2)(R^{18}SO_2)C \qquad \text{General Formula (9)}$$

($R^{16}$, $R^{17}$, and $R^{18}$ are each independently $C_n H_a F_b Cl_c Br_d I_e$.

"n," "a," "b," "c," "d," and "e" are each independently an integer not smaller than 0, and satisfy 2n+1=a+b+c+d+e.

Any two of $R^{16}$, $R^{17}$, and $R^{18}$ optionally bind with each other to form a ring, and, in that case, groups forming the ring satisfy 2n=a+b+c+d+e. In addition, the three of $R^{16}$, $R^{17}$, and $R^{18}$ optionally bind with each other to form a ring, and, in that case, among the three groups, two groups satisfy 2n=a+b+c+d+e and one group satisfies 2n−1=a+b+c+d+e.)

In the chemical structures represented by the general formulae (7) to (9), "n" is preferably an integer from 0 to 6, more preferably an integer from 0 to 4, and particularly preferably an integer from 0 to 2. In the chemical structures represented by the general formulae (7) to (9), when $R^{13}$ and $R^{14}$ bind with each other or $R^{16}$, $R^{17}$, and $R^{18}$ bind with each other to form a ring; "n" is preferably an integer from 1 to 8, more preferably an integer from 1 to 7, and particularly preferably an integer from 1 to 3.

In addition, in the chemical structures represented by the general formulae (7) to (9), those in which "a," "c," "d," and "e" are 0 are preferable.

The metal salt is particularly preferably $(CF_3SO_2)_2NLi$ (hereinafter, sometimes referred to as "LiTFSA"), $(FSO_2)_2NLi$ (hereinafter, sometimes referred to as "LiFSA"), $(C_2F_5SO_2)_2NLi$, $FSO_2(CF_3SO_2)NLi$, $(SO_2CF_2CF_2SO_2)NLi$, $(SO_2CF_2CF_2CF_2SO_2)NLi$, $FSO_2(CH_3SO_2)NLi$, $FSO_2(C_2F_5SO_2)NLi$, or $FSO_2(C_2H_5SO_2)NLi$.

As the metal salt of the present invention, one that is obtained by combining appropriate numbers of a cation and an anion described above may be used. Regarding the metal salt in the electrolytic solution of the present invention, a single type may be used, or a combination of two or more types may be used.

As the organic solvent having a heteroelement, an organic solvent whose heteroelement is at least one selected from nitrogen, oxygen, sulfur, or a halogen is preferable, and an organic solvent whose heteroelement is at least one selected from nitrogen or oxygen is more preferable. In addition, as the organic solvent having the heteroelement, an aprotic solvent not having a proton donor group such as NH group, $NH_2$ group, OH group, and SH group is preferable.

Specific examples of "the organic solvent having the heteroelement" (hereinafter, sometimes simply referred to as "organic solvent") include nitriles such as acetonitrile, propionitrile, acrylonitrile, and malononitrile, ethers such as 1,2-dimethoxyethane, 1,2-diethoxyethane, tetrahydrofuran, 1,2-dioxane, 1,3-dioxane, 1,4-dioxane, 2,2-dimethyl-1,3-dioxo lane, 2-methyltetrahydropyran, 2-methyltetrahydrofuran, and crown ethers, carbonates such as ethylene carbonate, propylene carbonate, dimethyl carbonate, diethyl carbonate, and ethyl methyl carbonate, amides such as formamide, N,N-dimethylformamide, N,N-dimethylacetamide, and N-methylpyrrolidone, isocyanates such as isopropyl isocyanate, n-propylisocyanate, and chloromethyl isocyanate, esters such as methyl acetate, ethyl acetate, propyl acetate, methyl propionate, methyl formate, ethyl formate, vinyl acetate, methyl acrylate, and methyl methacrylate, epoxies such as glycidyl methyl ether, epoxy butane, and 2-ethyloxirane, oxazoles such as oxazole, 2-ethyloxazole, oxazoline, and 2-methyl-2-oxazoline, ketones such as acetone, methyl ethyl ketone, and methyl isobutyl ketone, acid anhydrides such as acetic anhydride and propionic anhydride, sulfones such as dimethyl sulfone and sulfolane, sulfoxides such as dimethyl sulfoxide, nitros such as 1-nitropropane and 2-nitropropane, furans such as furan and furfural, cyclic esters such as γ-butyrolactone, γ-valerolactone, and δ-valerolactone, aromatic heterocycles such as thiophene and pyridine, heterocycles such as tetrahydro-4-pyrone, 1-methylpyrrolidine, and N-methylmorpholine, and phosphoric acid esters such as trimethyl phosphate and triethyl phosphate.

Examples of the organic solvent include linear carbonates represented by the following general formula (10).

$$R^{19}OCOOR^{20} \quad \text{General Formula (10)}$$

($R^{19}$ and $R^{20}$ are each independently selected from $C_nH_aF_bCl_cBr_dI_e$ that is a linear alkyl, or $C_mH_fF_gCl_hBr_iI_j$ whose chemical structure includes a cyclic alkyl. "n," "a," "b," "c," "d," "e," "m," "f," "g," "h," "i," and "j" are each independently an integer not smaller than 0, and satisfy $2n+1=a+b+c+d+e$ and $2m=f+g+h+i+j$.)

In the linear carbonates represented by the general formula (10), "n" is preferably an integer from 1 to 6, more preferably an integer from 1 to 4, and particularly preferably an integer from 1 to 2. "m" is preferably an integer from 3 to 8, more preferably an integer from 4 to 7, and particularly preferably an integer from 5 to 6. In addition, among the linear carbonates represented by the general formula (10), dimethyl carbonate (hereinafter, sometimes referred to as "DMC"), diethyl carbonate (hereinafter, sometimes referred to as "DEC"), and ethyl methyl carbonate (hereinafter, sometimes referred to as "EMC") are particularly preferable.

As the organic solvent, a solvent whose relative permittivity is not smaller than 20 or that has ether oxygen having donor property is preferable, and examples of such an organic solvent include nitriles such as acetonitrile, propionitrile, acrylonitrile, and malononitrile, ethers such as 1,2-dimethoxyethane, 1,2-diethoxyethane, tetrahydrofuran, 1,2-dioxane, 1,3-dioxane, 1,4-dioxane, 2,2-dimethyl-1,3-dioxolane, 2-methyltetrahydropyran, 2-methyltetrahydrofuran, and crown ethers, N,N-dimethylformamide, acetone, dimethyl sulfoxide, and sulfolane. Among those, acetonitrile (hereinafter, sometimes referred to as "AN") and 1,2-dimethoxyethane (hereinafter, sometimes referred to as "DME") are particularly preferable.

Regarding these organic solvents, a single type may be used by itself in the electrolytic solution, or a combination of two or more types may be used.

A feature of the electrolytic solution of the present invention is, in its vibrational spectroscopy spectrum and regarding an intensity of a peak derived from the organic solvent contained in the electrolytic solution, satisfying Is>Io when an intensity of an original peak of the organic solvent is represented as Io and an intensity of "a peak resulting from shifting of the original peak of the organic solvent" (hereinafter, sometimes referred to as "shift peak") is represented as Is. More specifically, in a vibrational spectroscopy spectrum chart obtained by subjecting the electrolytic solution of the present invention to vibrational spectroscopy measurement, the relationship between the two peak intensities is Is>Io.

Here, "an original peak of the organic solvent" refers to a peak observed at a peak position (wave number) when the vibrational spectroscopy measurement is performed only on the organic solvent. The value of the intensity Io of the original peak of the organic solvent and the value of the intensity Is of the shift peak are the heights or area sizes from a baseline of respective peaks in the vibrational spectroscopy spectrum.

In the vibrational spectroscopy spectrum of the electrolytic solution of the present invention, when multiple peaks resulting from shifting of the original peak of the organic solvent exist, the relationship may be determined based on a peak enabling determination of the relationship between Is and Io most easily. In addition, when multiple types of the organic solvent having the heteroelement are used in the electrolytic solution of the present invention, an organic solvent enabling determination of the relationship between Is and Io most easily (resulting in the largest difference between Is and Io) is selected, and the relationship between Is and Io may be determined based on the obtained peak intensity. In addition, when the peak shift amount is small and peaks before and after shifting overlap with each other to give an appearance like a smooth mountain, the relationship between Is and Io may be determined by performing peak resolution with known means.

In the vibrational spectroscopy spectrum of the electrolytic solution using multiple types of the organic solvent having the heteroelement, a peak of an organic solvent most easily coordinated with a cation (hereinafter, sometimes referred to as "preferential coordination solvent") shifts preferentially from others. In the electrolytic solution using multiple types of the organic solvent having the heteroelement, the mass % of the preferential coordination solvent with respect to the whole organic solvent having the heteroelement is preferably 40% or higher, more preferably 50% or higher, further preferably 60% or higher, and particularly preferably 80% or higher. In addition, in the electrolytic solution using multiple types of the organic solvent having the heteroelement, the vol % of the preferential coordination solvent with respect to the whole organic solvent having the heteroelement is preferably 40% or higher, more preferably 50% or higher, further preferably 60% or higher, and particularly preferably 80% or higher.

The relationship between the two peak intensities in the vibrational spectroscopy spectrum of the electrolytic solution of the present invention preferably satisfies a condition of Is>2×Io, more preferably satisfies a condition of Is>3×Io, further preferably satisfies a condition of Is>5×Io, and particularly preferably satisfies a condition of Is>7×Io. A most preferable electrolytic solution is one in which the intensity Io of the original peak of the organic solvent is not observed and the intensity Is of the shift peak is observed in the vibrational spectroscopy spectrum of the electrolytic solution of the present invention. This means that, in the electrolytic solution, all molecules of the organic solvent contained in the electrolytic solution are completely solvated with the metal salt. The electrolytic solution of the present invention is most preferably in a state in which all molecules of the organic solvent contained in the electrolytic solution are completely solvated with the metal salt (a state of Io=0).

In the electrolytic solution of the present invention, the metal salt and the organic solvent having the heteroelement (or the preferential coordination solvent) are estimated to interact with each other. Specifically, the metal salt and the heteroelement in the organic solvent having the heteroelement (or the preferential coordination solvent) are estimated to form a coordinate bond and form a stable cluster formed of the metal salt and the organic solvent having the heteroelement (or the preferential coordination solvent). Based on results from later described Evaluation Examples, the cluster is estimated to be formed mostly from coordination of 2 molecules of the organic solvent having the heteroelement (or the preferential coordination solvent) with respect to 1 molecule of the metal salt. When this point is taken into consideration, in the electrolytic solution of the present invention, the mol range of the organic solvent having the heteroelement (or the preferential coordination solvent) with respect to 1 mol of the metal salt is preferably not lower than 1.4 mol but lower than 3.5 mol, more preferably not lower than 1.5 mol but not higher than 3.1 mol, and further preferably not lower than 1.6 mol but not higher than 3 mol.

In the electrolytic solution of the present invention, since a cluster is estimated to be formed mostly from coordination of 2 molecules of the organic solvent having the heteroelement (or the preferential coordination solvent) with respect to 1 molecule of the metal salt, the concentration (mol/L) of the electrolytic solution of the present invention depends on respective molecular weights of the metal salt and the organic solvent, and the density in the solution. Thus, unconditionally defining the concentration of the electrolytic solution of the present invention is not appropriate.

Concentration c (mol/L) of each of the electrolytic solutions of the present invention is shown in Table 1.

TABLE 1

| Metal Salt | Organic Solvent | Concentration (mol/L) |
|---|---|---|
| LiTFSA | DME | 2.2 to 3.4 |
| LiTFSA | AN | 3.2 to 4.9 |
| LiFSA | DME | 2.6 to 4.1 |
| LiFSA | AN | 3.9 to 6.0 |
| LiFSA | DMC | 2.3 to 4.5 |
| LiFSA | EMC | 2.0 to 3.8 |
| LiFSA | DEC | 1.8 to 3.6 |

An organic solvent forming the cluster and an organic solvent not involved in the formation of the cluster are different in terms of the environment in which the respective organic solvents exist. Thus, in the vibrational spectroscopy measurement, a peak derived from the organic solvent forming the cluster is observed to be shifted toward the high wave number side or the low wave number side with respect to the wave number observed at a peak (original peak of the organic solvent) derived from the organic solvent not involved in the formation of the cluster. Thus, the shift peak represents a peak of the organic solvent forming the cluster.

Examples of the vibrational spectroscopy spectrum include an IR spectrum or a Raman spectrum. Examples of measuring methods of IR measurement include transmission measuring methods such as Nujol mull method and liquid film method, and reflection measuring methods such as ATR method. Regarding which of the IR spectrum and the Raman spectrum is to be selected, a spectrum enabling easy determination of the relationship between Is and Io may be selected as the vibrational spectroscopy spectrum of the electrolytic solution of the present invention. The vibrational spectroscopy measurement is preferably performed at a condition where the effect of moisture in the atmosphere can be lessened or ignored. For example, performing the IR measurement under a low humidity or zero humidity condition such as in a dry room or a glovebox is preferable, or performing the Raman measurement in a state where the electrolytic solution is kept inside a sealed container is preferable.

Here, specific description is provided regarding a peak of the electrolytic solution of the present invention containing LiTFSA as the metal salt and acetonitrile as the organic solvent.

When the IR measurement is performed on acetonitrile alone, a peak derived from stretching vibration of a triple bond between C and N is ordinarily observed at around 2100 to 2400 cm$^{-1}$.

Here, based on conventional technical common knowledge, a case is envisioned in which an electrolytic solution is obtained by dissolving LiTFSA in an acetonitrile solvent at a concentration of 1 mol/L. Since 1 L of acetonitrile corresponds to approximately 19 mol, 1 mol of LiTFSA and 19 mol of acetonitrile exist in 1 L of a conventional electrolytic solution. Then, in the conventional electrolytic solution, at the same time when acetonitrile solvated with LiTFSA (coordinated with Li) exists, a large amount of acetonitrile not solvated with LiTFSA (not coordinated with Li) exists. Since an acetonitrile molecule solvated with LiTFSA and an acetonitrile molecule not solvated with LiTFSA are different regarding the environments in which the respective acetonitrile molecules are placed, the acetonitrile peaks of both molecules are distinctively observed in the IR spectrum. More specifically, although a peak of acetonitrile not solvated with LiTFSA is observed at the same position (wave number) as in the case with the IR measurement on acetonitrile alone, a peak of acetonitrile solvated with LiTFSA is observed such that its peak position (wave number) is shifted toward the high wave number side.

Since a large amount of acetonitrile not solvated with LiTFSA exists at the concentration of the conventional electrolytic solution, the relationship between the intensity Io of the original peak of acetonitrile and the intensity Is of the peak resulting from shift of the original peak of acetonitrile becomes Is<Io in the vibrational spectroscopy spectrum of the conventional electrolytic solution.

On the other hand, when compared to the conventional electrolytic solution, the electrolytic solution of the present invention has a high concentration of LiTFSA, and the number of acetonitrile molecules solvated (forming a cluster) with LiTFSA in the electrolytic solution is larger than the number of acetonitrile molecules not solvated with LiTFSA. As a result, the relationship between the intensity Io of the original peak of acetonitrile and the intensity Is of the peak resulting from shifting of the original peak of acetonitrile becomes Is>Io in the vibrational spectroscopy spectrum of the electrolytic solution of the present invention.

In Table 2, wave numbers and attributions thereof are exemplified for organic solvents considered to be useful when calculating Io and Is in the vibrational spectroscopy spectrum of the electrolytic solution of the present invention. Depending on measuring devices, measuring environments, and measuring conditions used for obtaining the vibrational spectroscopy spectrum, the wave number of the observed peak may be different from the following wave numbers.

TABLE 2

| Organic solvent | Wave number ($cm^{-1}$) | Attribution |
| --- | --- | --- |
| Ethylene carbonate | 1769 | Double bond between C and O |
| Propylene carbonate | 1829 | Double bond between C and O |
| Acetic anhydride | 1785, 1826 | Double bond between C and O |
| Acetone | 1727 | Double bond between C and O |
| Acetonitrile | 2250 | Triple bond between C and N |
| Acetonitrile | 899 | C-C single bond |
| DME | 1099 | C-O single bond |
| DME | 1124 | C-O single bond |
| N,N-Dimethylformamide | 1708 | Double bond between C and O |
| γ-Butyrolactone | 1800 | Double bond between C and O |
| Nitropropane | 1563 | Double bond between N and O |
| Pyridine | 977 | Unknown |
| Dimethyl sulfoxide | 1017 | Double bond between S and O |

Regarding a wave number of an organic solvent and an attribution thereof, well-known data may be referenced. Examples of the reference include "Raman spectrometry" Spectroscopical Society of Japan measurement method series 17, Hiroo Hamaguchi and Akiko Hirakawa, Japan Scientific Societies Press, pages 231 to 249. In addition, a wave number of an organic solvent considered to be useful for calculating Io and Is, and a shift in the wave number when the organic solvent and the metal salt coordinate with each other can be predicted from a calculation using a computer. For example, the calculation may be performed by using Gaussian09 (Registered trademark, Gaussian, Inc.), and setting the density function to B3LYP and the basis function to 6-311G++ (d, p). A person skilled in the art can calculate Io and Is by referring to the description in Table 2, well-known data, and a calculation result from a computer to select a peak of an organic solvent.

Since the electrolytic solution of the present invention has the metal salt and the organic solvent exist in a different environment and has a high metal salt concentration when compared to the conventional electrolytic solution; improvement in a metal ion transportation rate in the electrolytic solution (particularly improvement of lithium transference number when the metal is lithium), improvement in reaction rate between an electrode and an electrolytic solution interface, mitigation of uneven distribution of salt concentration in the electrolytic solution caused when a battery undergoes high-rate charging and discharging, and increase in the capacity of an electrical double layer, etc., can be expected. In the electrolytic solution of the present invention, since most of the organic solvent having the heteroelement is forming a cluster with the metal salt, the vapor pressure of the organic solvent contained in the electrolytic solution becomes lower. As a result, volatilization of the organic solvent from the electrolytic solution of the present invention is reduced.

When compared to the electrolytic solution of a conventional battery, the electrolytic solution of the present invention has a high viscosity. Thus, with a battery using the electrolytic solution of the present invention, even if the battery is damaged, leakage of the electrolytic solution is suppressed. Furthermore, a lithium ion secondary battery using the conventional electrolytic solution has displayed a significant reduction in capacity when subjected to high-rate charging and discharging cycles. One conceivable reason thereof is the inability of the electrolytic solution to supply sufficient amount of Li to a reaction interface of an electrode because of Li concentration unevenness generated in the electrolytic solution when charging and discharging are repeated rapidly, i.e., uneven distribution of Li concentration in the electrolytic solution. However, in a secondary battery using the electrolytic solution of the present invention, the capacity was shown to be suitably maintained when undergoing high-rate charging and discharging. A conceivable reason for that is the ability to suppress uneven distribution of the Li concentration in the electrolytic solution due to a physical property regarding having a high viscosity in the electrolytic solution of the present invention. In addition, another conceivable reason for the suppression of capacity reduction when undergoing high-rate charging and discharging cycles is, due to the physical property regarding having a high viscosity in the electrolytic solution of the present invention, improvement in liquid retaining property of the electrolytic solution at an electrode interface, resulting in suppression of a state of lacking the electrolytic solution at the electrode interface (i.e., liquid run-out state).

Regarding a viscosity η (mPa·s) of the electrolytic solution of the present invention, a range of $10<\eta<500$ is preferable, a range of $12<\eta<400$ is more preferable, a range of $15<\eta<300$ is further preferable, a range of $18<\eta<150$ is particularly preferable, and a range of $20<\eta<140$ is most preferable.

Ions move within an electrolytic solution easier when an ionic conductivity σ (mS/cm) of the electrolytic solution is higher. Thus, such an electrolytic solution is an excellent electrolytic solution for batteries. The ionic conductivity σ (mS/cm) of the electrolytic solution of the present invention preferably satisfies $1 \leq \sigma$. Regarding the ionic conductivity σ (mS/cm) of the electrolytic solution of the present invention, if a suitable range including an upper limit is to be shown, a range of $2<\sigma<200$ is preferable, a range of $3<\sigma<100$ is more preferable, a range of $4<\sigma<50$ is further preferable, and a range of $5<\sigma<35$ is particularly preferable.

The electrolytic solution of the present invention contains a cation of the metal salt at a high concentration. Thus, the distance between adjacent cations is extremely small within the electrolytic solution of the present invention. When a cation such as a lithium ion moves between a positive electrode and a negative electrode during charging and discharging of the secondary battery, a cation located most closely to an electrode that is a movement destination is firstly supplied to the electrode. Then, to the place where the supplied cation had been located, another cation adjacent to the cation moves. Thus, in the electrolytic solution of the present invention, a domino toppling-like phenomenon is predicted to be occurring in which adjacent cations sequentially change their positions one by one toward an electrode that is a supply target. Because of that, the distance for which a cation moves during charging and discharging is thought to be short, and movement speed of the cation is thought to be high, accordingly. Because of this reason, the secondary battery having the electrolytic solution of the present invention is thought to have a high reaction rate.

A density d ($g/cm^3$) of the electrolytic solution of the present invention preferably satisfies $d \geq 1.2$ or $d \leq 2.2$, and is more preferably within a range of $1.2 \leq d \leq 2.2$, even more preferably within a range of $1.24 \leq d \leq 2.0$, further preferably within a range of $1.26 \leq d \leq 1.8$, and particularly preferably within a range of $1.27 \leq d \leq 1.6$. The density d ($g/cm^3$) of the electrolytic solution of the present invention refers to the density at 20° C.

In the electrolytic solution of the present invention, "d/c" obtained by dividing the density d ($g/cm^3$) of the electrolytic solution by the concentration c (mol/L) of the electrolytic solution is preferably within a range of $0.15 \leq d/c \leq 0.71$, more preferably within a range of $0.15 \leq d/c \leq 0.56$, even more preferably within a range of $0.25 \leq d/c \leq 0.56$, further preferably within a range of $0.26 \leq d/c \leq 0.50$, and particularly preferably within a range of $0.27 \leq d/c \leq 0.47$.

"d/c" of the electrolytic solution of the present invention is defined also when the metal salt and the organic solvent are specified. For example, when LiTFSA and DME are respectively selected as the metal salt and the organic solvent, d/c is preferably within a range of $0.42 \leq d/c \leq 0.56$ and more preferably within a range of $0.44 \leq d/c \leq 0.52$. When LiTFSA and AN are respectively selected as the metal salt and the organic solvent, d/c is preferably within a range of $0.35 \leq d/c \leq 0.41$ and more preferably within a range of $0.36 \leq d/c \leq 0.39$. When LiFSA and DME are respectively selected as the metal salt and the organic solvent, d/c is preferably within a range of $0.32 \leq d/c \leq 0.46$ and more preferably within a range of $0.34 \leq d/c \leq 0.42$. When LiFSA and AN are respectively selected as the metal salt and the organic solvent, d/c is preferably within a range of $0.25 \leq d/c \leq 0.31$ and more preferably within a range of $0.26 \leq d/c \leq 0.29$. When LiFSA and DMC are respectively selected as the metal salt and the organic solvent, d/c is preferably within a range of $0.32 \leq d/c \leq 0.48$, more preferably within a range of $0.32 \leq d/c \leq 0.46$, and further preferably within a range of $0.34 \leq d/c \leq 0.42$. When LiFSA and EMC are respectively selected as the metal salt and the organic solvent, d/c is preferably within a range of $0.34 \leq d/c \leq 0.50$ and more preferably within a range of $0.37 \leq d/c \leq 0.45$. When LiFSA and DEC are respectively selected as the metal salt and the organic solvent, d/c is preferably within a range of $0.36 \leq d/c \leq 0.54$ and more preferably within a range of $0.39 \leq d/c \leq 0.48$.

The method for producing the electrolytic solution of the present invention is described. Since the electrolytic solution of the present invention contains a large amount of the metal salt compared to the conventional electrolytic solution, a production method of adding the organic solvent to a solid (powder) metal salt results in an aggregate, and manufacturing an electrolytic solution in a solution state is difficult. Thus, in the method for producing the electrolytic solution of the present invention, the metal salt is preferably gradually added to the organic solvent while a solution state of the electrolytic solution is maintained during production.

Depending on the types of the metal salt and the organic solvent, the electrolytic solution of the present invention includes a liquid in which the metal salt is dissolved in the organic solvent in a manner exceeding a conventionally regarded saturation solubility. A method for producing the electrolytic solution of the present invention includes: a first dissolution step of preparing a first electrolytic solution by mixing the organic solvent having the heteroelement and the metal salt to dissolve the metal salt; a second dissolution step of preparing a second electrolytic solution in a supersaturation state by adding the metal salt to the first electrolytic solution under stirring and/or heating conditions to dissolve the metal salt; and a third dissolution step of preparing a third electrolytic solution by adding the metal salt to the second electrolytic solution under stirring and/or heating conditions to dissolve the metal salt.

Here, the "supersaturation state" described above refers to a state in which a metal salt crystal is deposited from the electrolytic solution when the stirring and/or heating conditions are discontinued or when crystal nucleation energy such as vibration is provided thereto. The second electrolytic solution is in the "supersaturation state," whereas the first electrolytic solution and the third electrolytic solution are not in the "supersaturation state."

In other words, with the method for producing the electrolytic solution of the present invention, via the first electrolytic solution encompassing a conventional metal salt concentration and being in a thermodynamically stable liquid state, and via the second electrolytic solution in a thermodynamically unstable liquid state, the third electrolytic solution, i.e., the electrolytic solution of the present invention, in a thermodynamically stable new liquid state is obtained.

Since the third electrolytic solution in the stable liquid state maintains its liquid state at an ordinary condition, in the third electrolytic solution, for example, a cluster, formed of 2 molecules of the organic solvent with respect to 1 molecule of a lithium salt and stabilized by a strong coordinate bond between these molecules, is estimated to be inhibiting crystallization of the lithium salt.

The first dissolution step is a step of preparing the first electrolytic solution by mixing the organic solvent having a heteroatom with the metal salt to dissolve the metal salt.

For the purpose of mixing the organic solvent having a heteroatom with the metal salt, the metal salt may be added with respect to the organic solvent having a heteroatom, or the organic solvent having a heteroatom may be added with respect to the metal salt.

The first dissolution step is preferably performed under stirring and/or heating conditions. The stirring speed may be set suitably. The heating condition is preferably controlled suitably using a temperature controlled bath such as a water bath or an oil bath. Since dissolution heat is generated when dissolving the metal salt, the temperature condition is preferably strictly controlled when a metal salt that is unstable against heat is to be used. In addition, the organic solvent may be cooled in advance, or the first dissolution step may be performed under a cooling condition.

The first dissolution step and the second dissolution step may be performed continuously, or the first electrolytic solution obtained from the first dissolution step may be temporarily kept (left still), and the second dissolution step may be performed after a certain period of time has elapsed.

The second dissolution step is a step of preparing the second electrolytic solution in the supersaturation state by adding the metal salt to the first electrolytic solution under stirring and/or heating conditions to dissolve the metal salt.

Performing the second dissolution step under the stirring and/or heating conditions is essential for preparing the second electrolytic solution in the thermodynamically unstable supersaturation state. The stirring condition may be obtained by performing the second dissolution step in a stirring device accompanied with a stirrer such as a mixer, or the stirring condition may be obtained by performing the second dissolution step using a stirring bar and a device (stirrer) for moving the stirring bar. The heating condition is preferably controlled suitably using a temperature controlled bath such as a water bath or an oil bath. Needless to say, performing the second dissolution step using an apparatus or a system having both a stirring function and a heating function is particularly preferable. "Heating" in the method for producing the electrolytic solution refers to warming an object to a temperature not lower than an ordinary temperature (25° C.). The heating temperature is more preferably not lower than 30° C. and further preferably not lower than 35° C. In addition, the heating temperature is preferably a temperature lower than the boiling point of the organic solvent.

In the second dissolution step, when the added metal salt does not dissolve sufficiently, increasing the stirring speed and/or further heating are performed. In this case, a small amount of the organic solvent having a heteroatom may be added to the electrolytic solution in the second dissolution step.

Since temporarily leaving still the second electrolytic solution obtained in the second dissolution step causes deposition of crystal of the metal salt, the second dissolution step and the third dissolution step are preferably performed continuously.

The third dissolution step is a step of preparing the third electrolytic solution by adding the metal salt to the second electrolytic solution under stirring and/or heating conditions to dissolve the metal salt. In the third dissolution step, since adding and dissolving the metal salt in the second electrolytic solution in the supersaturation state are necessary, performing the step under stirring and/or heating conditions similarly to the second dissolution step is essential. Specific stirring and/or heating conditions are similar to the conditions for the second dissolution step.

When the mole ratio of the organic solvent and the metal salt added throughout the first dissolution step, the second dissolution step, and the third dissolution step reaches roughly about 2:1, production of the third electrolytic solution (the electrolytic solution of the present invention) ends. A metal salt crystal is not deposited from the electrolytic solution of the present invention even when the stirring and/or heating conditions are discontinued. Based on these circumstances, in the electrolytic solution of the present invention, for example, a cluster, formed of 2 molecules of the organic solvent with respect to 1 molecule of a lithium salt and stabilized by a strong coordinate bond between these molecules, is estimated to be formed.

When producing the electrolytic solution of the present invention, even without via the supersaturation state at processing temperatures of each of the dissolution steps, the electrolytic solution of the present invention is suitably produced using the specific dissolution means described in the first to third dissolution steps depending on the types of the metal salt and the organic solvent.

In addition, the method for producing the electrolytic solution of the present invention preferably includes a vibrational spectroscopy measurement step of performing vibrational spectroscopy measurement on the electrolytic solution that is being produced. As a specific vibrational spectroscopy measurement step, for example, a method in which a portion of each of the electrolytic solutions being produced is sampled to be subjected to vibrational spectroscopy measurement may be performed, or a method in which vibrational spectroscopy measurement is conducted on each of the electrolytic solutions in situ may be performed. Examples of the method of conducting the vibrational spectroscopy measurement on the electrolytic solution in situ include a method of introducing the electrolytic solution that is being produced in a transparent flow cell and conducting the vibrational spectroscopy measurement, and a method of using a transparent production container and conducting Raman measurement from outside the container. Since the relationship between Is and Io in an electrolytic solution that is being produced is confirmed by including the vibrational spectroscopy measurement step in the method for producing the electrolytic solution of the present invention, whether or not an electrolytic solution that is being produced has reached the electrolytic solution of the present invention is determined, and, when an electrolytic solution that is being produced has not reached the electrolytic solution of the present invention, how much more of the metal salt is to be added for reaching the electrolytic solution of the present invention is understood.

To the electrolytic solution of the present invention, other than the organic solvent having the heteroelement, a solvent that has a low polarity (low permittivity) or a low donor number and that does not display particular interaction with the metal salt, i.e., a solvent that does not affect formation and maintenance of the cluster in the electrolytic solution of the present invention, may be added. Adding such a solvent to the electrolytic solution of the present invention is expected to provide an effect of lowering the viscosity of the electrolytic solution while maintaining the formation of the cluster in the electrolytic solution of the present invention.

Specific examples of the solvent that does not display particular interaction with the metal salt include benzene, toluene, ethylbenzene, o-xylene, m-xylene, p-xylene, 1-methylnaphthalene, hexane, heptane, and cyclohexane.

In addition, to the electrolytic solution of the present invention, a fire-resistant solvent other than the organic solvent having the heteroelement may be added. By adding the fire-resistant solvent to the electrolytic solution of the present invention, safety of the electrolytic solution of the present invention is further enhanced. Examples of the fire-resistant solvent include halogen based solvents such as carbon tetrachloride, tetrachloroethane, and hydrofluoroether, and phosphoric acid derivatives such as trimethyl phosphate and triethyl phosphate.

Furthermore, when the electrolytic solution of the present invention is mixed with a polymer or an inorganic filler to form a mixture, the mixture enables containment of the electrolytic solution to provide a pseudo solid electrolyte.

By using the pseudo solid electrolyte as an electrolytic solution of a battery, leakage of the electrolytic solution is suppressed in the battery.

As the polymer, a polymer used in batteries such as lithium ion secondary batteries and a common chemically cross-linked polymer are used. In particular, a polymer capable of turning into a gel by absorbing an electrolytic solution, such as polyvinylidene fluoride and polyhexafluoropropylene, and one obtained by introducing an ion conductive group to a polymer such as polyethylene oxide are suitable.

Specific examples of the polymer include polymethyl acrylate polymethyl methacrylate, polyethylene oxide, polypropylene oxide, polyacrylonitrile, polyvinylidene fluoride, polyethylene glycol dimethacrylate, polyethylene glycol acrylate, polyglycidol, polytetrafluoroethylene, polyhexafluoropropylene, polysiloxane, polyvinyl acetate, polyvinyl alcohol, polyacrylic acid, polymethacrylic acid, polyitaconic acid, polyfumaric acid, polycrotonic acid, polyangelic acid, polycarboxylic acid such as carboxymethyl cellulose, styrene-butadiene rubbers, nitrile-butadiene rubbers, polystyrene, polycarbonate, unsaturated polyester obtained through copolymerization of maleic anhydride and glycols, polyethylene oxide derivatives having a substituent group, and a copolymer of vinylidene fluoride and hexafluoropropylene. In addition, as the polymer, a copolymer obtained through copolymerization of two or more types of monomers forming the above described specific polymers may be selected.

Polysaccharides are also suitable as the polymer. Specific examples of the polysaccharides include glycogen, cellulose, chitin, agarose, carrageenan, heparin, hyaluronic acid, pectin, amylopectin, xyloglucan, and amylose. In addition, materials containing these polysaccharides may be used as the polymer, and examples of the materials include agar containing polysaccharides such as agarose.

As the inorganic filler, inorganic ceramics such as oxides and nitrides are preferable.

Inorganic ceramics have hydrophilic and hydrophobic functional groups on their surfaces. Thus, a conductive passage may form within the inorganic ceramics when the functional groups attract the electrolytic solution. Furthermore, the inorganic ceramics dispersed in the electrolytic solution form a network among the inorganic ceramics themselves due to the functional groups, and may serve as containment of the electrolytic solution. With such a function by the inorganic ceramics, leakage of the electrolytic solution in the battery is further suitably suppressed. In order to have the inorganic ceramics suitably exert the function described above, the inorganic ceramics having a particle shape are preferable, and those whose particle sizes are nano level are particularly preferable.

Examples of the types of the inorganic ceramics include common alumina, silica, titania, zirconia, lithium phosphate, and the like. In addition, inorganic ceramics that have lithium conductivity themselves are preferable, and specific examples thereof include $Li_3N$, $LiI$, $LiI—Li_3N—LiOH$, $LiI—Li_2S—P_2O_5$, $LiI—Li_2S—P_2S_5$, $LiI—Li_2S—B_2S_3$, $Li_2O—B_2S_3$, $Li_2O—V_2O_3—SiO_2$, $Li_2O—B_2O_3—P_2O_5$, $Li_2O—B_2O_3—ZnO$, $Li_2O—Al_2O_3—TiO_2—SiO_2—P_2O_5$, $LiTi_2(PO_4)_3$, $Li$-$\beta Al_2O_3$, and $LiTaO_3$.

Glass ceramics may be used as the inorganic filler. Since glass ceramics enables containment of ionic liquids, the same effect is expected for the electrolytic solution of the present invention. Examples of the glass ceramics include compounds represented by $xLi_2S—(1-x)P_2S_5$, and those in which one portion of S in the compound is substituted with another element and those in which one portion of P in the compound is substituted with germanium.

Since the electrolytic solution of the present invention described above displays excellent ionic conductivity, the electrolytic solution is suitably used as an electrolytic solution of a power storage device such as a battery. In particular, the electrolytic solution is preferably used as electrolytic solutions of secondary batteries, and, among those, preferably used as electrolytic solutions of lithium ion secondary batteries.

A nonaqueous electrolyte secondary battery of the present invention includes the electrolytic solution described above, and includes a positive electrode and a negative electrode. The positive electrode includes a positive electrode current collector formed of aluminum or an aluminum alloy. As the positive electrode and the negative electrode, those suitable for respective nonaqueous electrolyte secondary batteries are used. As one example of the nonaqueous electrolyte secondary battery, a configuration of a lithium ion secondary battery is described in the following.

(Lithium Ion Secondary Battery)

A lithium ion secondary battery of the present invention includes a positive electrode, a negative electrode, and the electrolytic solution of the present invention using a lithium salt as the metal salt.

The positive electrode includes a positive electrode current collector, and a positive electrode active material layer disposed on the positive electrode current collector.

The positive electrode current collector is formed of aluminum or an aluminum alloy. Here, aluminum refers to pure aluminum, and an aluminum whose purity is equal to or higher than 99.0% is referred to as pure aluminum. An alloy obtained by adding various elements to pure aluminum is referred as an aluminum alloy. Examples of the aluminum alloy include those that are Al—Cu based, Al—Mn based, Al—Fe based, Al—Si based, Al—Mg based, AL-Mg—Si based, and Al—Zn—Mg based.

In addition, specific examples of aluminum or the aluminum alloy include A1000 series alloys (pure aluminum based) such as JIS A1085, A1N30, etc., A3000 series alloys (Al—Mn based) such as JIS A3003, A3004, etc., and A8000 series alloys (Al—Fe based) such as JIS A8079, A8021, etc.

The current collector refers to a fine electron conductor that is chemically inert for continuously sending a flow of current to the electrode during discharging or charging of the lithium ion secondary battery.

The positive electrode current collector takes forms such as a foil, a sheet, a film, a line shape, a bar shape, and a mesh. As the positive electrode current collector, for example, a foil is used suitably. When the positive electrode current collector is in the form of a foil, a sheet, or a film, its thickness is preferably within a range of 1 μm to 100 μm. The positive electrode current collector may be coated with a protective layer known in the art.

The positive electrode active material layer includes a positive electrode active material and, if necessary, a binding agent and/or a conductive additive.

Examples of the positive electrode active material include layer compounds that are $Li_aNi_bCo_cMn_dD_eO_f$ (0.2≤a≤1.2; b+c+d+e=1; 0≤e<1; D is at least one element selected from Li, Fe, Cr, Cu, Zn, Ca, Mg, S, Si, Na, K, Al, Zr, Ti, P, Ga, Ge, V, Mo, Nb, W, or La; 1.72≤f≤2.1) and $Li_2MnO_3$. Additional examples of the positive electrode active material include spinel such as $LiMn_2O_4$, a solid solution formed of a mixture of spinel and a layer compound, and polyanion based compounds such as $LiMPO_4$, $LiMVO_4$, or $Li_2MSiO_4$ (wherein, "M" is selected from at least one of Co, Ni, Mn, or Fe). Further additional examples of the positive electrode active material include tavorite based compounds represented by LiMPO$_4$F ("Dl" is a transition metal) such as LiFePO$_4$F and borate based compounds represented by LiMBO$_3$ ("M" is a transition metal) such as LiFeBO$_3$. Any metal oxide used as the positive electrode active material may have a basic composition of the composition formulae described above, and those in which a metal element included in the basic composition is substituted with another metal element are also used. In addition, as the positive electrode active material, one that does not include a charge carrier (e.g., a lithium ion contributing to the charging and discharging) may also be used. For example, elemental substance sulfur (S), a compound that is a composite of sulfur and carbon, metal sulfides such as TiS$_2$, oxides such as V$_2$O$_5$ and MnO$_2$, polyaniline and anthraquinone and compounds including such aromatics in the chemical structure, conjugate based materials such as conjugate diacetic acid based organic matters, and other materials known in the art are used. Furthermore, a compound having a stable radical such as nitroxide, nitronyl nitroxide, galvinoxyl, and phenoxyl may be used as the positive electrode active material. When a positive electrode active material not containing a charge carrier such as lithium is to be used, a charge carrier has to be added in advance to the positive electrode and/or the negative electrode using a method known in the art. The charge carrier may be added in an ionic state, or may be added in a nonionic state such as a metal. For example, when the charge carrier is lithium, a lithium foil may be integrated with, such as through pasting to, the positive electrode and/or the negative electrode.

The binding agent serves a role of fastening the active material and the conductive additive to the surface of the current collector.

Examples of the binding agent include fluorine-containing resins such as polyvinylidene fluoride, polytetrafluoroethylene, and fluororubbers, thermoplastic resins such as polypropylene and polyethylene, imide based resins such as polyimide and polyamide-imide, and alkoxysilyl group-containing resins.

In addition, a polymer having a hydrophilic group may be used as the binding agent. Examples of the hydrophilic group of the polymer having the hydrophilic group include carboxyl group, sulfo group, silanol group, amino group, hydroxyl group, and phosphoric acid based group such as phosphoric acid group, etc. Among those described above, a polymer including a carboxyl group in its molecule, such as polyacrylic acid (PAA), carboxymethyl cellulose (CMC), and polymethacrylic acid, and a polymer including a sulfo group such as poly (p-styrenesulfonic acid) are preferable.

A polymer including a large number of carboxyl groups and/or sulfo groups, such as polyacrylic acid or a copolymer of acrylic acid and vinylsulfonic acid, is water soluble. Thus, the polymer including the hydrophilic group is preferably a water-soluble polymer, and is preferably a polymer including multiple carboxyl groups and/or sulfo groups in its one molecule.

A polymer including a carboxyl group in its molecule is produced through a method of such as, for example, polymerizing an acid monomer, or imparting a carboxyl group to a polymer. Examples of the acid monomer include acid monomers having one carboxyl group in respective molecules such as acrylic acid, methacrylic acid, vinylbenzoic acid, crotonic acid, pentenoic acid, angelic acid, and tiglic acid, and acid monomers having two or more carboxyl groups in respective molecules such as itaconic acid, mesaconic acid, citraconic acid, fumaric acid, maleic acid, 2-pentenedioic acid, methylenesuccinic acid, allylmalonic acid, isopropylidene succinic acid, 2,4-hexadienedioic acid, and acetylene dicarboxylic acid. A copolymer obtained through polymerization of two or more types of monomers selected from those described above may be used.

For example, as disclosed in JP2013065493 (A), a polymer that is formed of a copolymer of acrylic acid and itaconic acid and that includes, in its molecule, an acid anhydride group formed through condensation of carboxyl groups is preferably used as the binding agent. By having a structure derived from a monomer with high acidity by having two or more carboxyl groups in a single molecule, lithium ions and the like are thought to be easily trapped before a degradative reaction of the electrolytic solution occurs during charging. Furthermore, the acidity does not rise excessively since, as the acidity rises when more carboxyl groups exist compared to polyacrylic acid and polymethacrylic acid, a certain amount of the carboxyl groups change into acid anhydride groups. Thus, a secondary battery having an electrode formed using the binding agent has improved initial efficiency and input-output characteristics.

The blending ratio of the binding agent in the positive electrode active material layer is preferably, in mass ratio, positive electrode active material:binding agent=1:0.05 to 1:0.5. The reason is that when too little of the binding agent is contained, moldability of the electrode deteriorates, whereas when too much of the binding agent is contained, energy density of the electrode becomes low.

The conductive additive is added for increasing conductivity of the electrode. As the conductive additive, a fine electron conductor that is chemically inert may be used, and examples thereof include carbonaceous fine particles such as carbon black, graphite, acetylene black, Ketchen black (Registered Trademark), and vapor grown carbon fiber (VGCF), and various metal particles. With regard to the conductive additives described above, a single type by itself, or a combination of two or more types may be added to the active material layer. The blending ratio of the conductive additive in the positive electrode active material layer is preferably, in mass ratio, positive electrode active material: conductive additive=1:0.01 to 1:0.5. The reason is that when too little of the conductive additive is contained, efficient conducting paths cannot be formed, whereas when too much of the conductive additive is contained, moldability of the positive electrode active material layer deteriorates and energy density of the electrode becomes low.

The negative electrode includes a negative electrode current collector, and a negative electrode active material layer disposed on the surface of the negative electrode current collector.

Examples of the material of the negative electrode current collector include at least one selected from silver, copper, gold, aluminum, tungsten, cobalt, zinc, nickel, iron, platinum, tin, indium, titanium, ruthenium, tantalum, chromium, or molybdenum, and metal materials such as stainless steel. The negative electrode current collector may be coated with a protective layer known in the art.

The negative electrode current collector takes forms such as a foil, a sheet, a film, a line shape, a bar shape, and a mesh. Thus, as the negative electrode current collector, for example, metal foils such as copper foil, nickel foil, aluminum foil, and stainless steel foil are suitably used. When the negative electrode current collector is in the form of a foil, a sheet, or a film, its thickness is preferably within a range of 1 μm to 100 μm.

The negative electrode active material layer includes a negative electrode active material, and, if necessary, a binding agent and/or a conductive additive. The binding agent and the conductive additive of the negative electrode are similar to those described for the positive electrode.

As the negative electrode active material, a material capable of occluding and releasing lithium ions is used. Thus, the material is not particularly limited as long as the material is an elemental substance, an alloy, or a compound capable of occluding and releasing lithium ions. For example, respective elemental substances of Li, group 14 elements such as carbon, silicon, germanium, and tin, group 13 elements such as aluminum and indium, group 12 elements such as zinc and cadmium, group 15 elements such as antimony and bismuth, alkaline earth metals such as magnesium and calcium, and group 11 elements such as silver and gold may be used as the negative electrode active material. When silicon or the like is used as the negative electrode active material, a high capacity active material is obtained since a single silicon atom reacts with multiple lithium atoms. However, a fear of occurrence of a problem regarding a significant expansion and contraction of volume associated with occlusion and release of lithium exists. Thus, in order to mitigate the fear, an alloy or a compound obtained by combining an elemental substance of silicon or the like with another element such as a transition metal is suitably used as the negative electrode active material. Specific examples of the alloy or the compound include tin based materials such as Ag—Sn alloys, Cu—Sn alloys, and Co—Sn alloys, carbon based materials such as various graphites, silicon based materials such as $SiO_x$ ($0.3 \leq x \leq 1.6$) that undergoes disproportionation into the elemental substance silicon and silicon dioxide, and a complex obtained by combining a carbon based material with elemental substance silicon or a silicon based material. In addition, as the negative electrode active material, an oxide such as $Nb_2O_5$, $TiO_2$, $Li_4Ti_5O_{12}$, $WO_2$, $MoO_2$, and $Fe_2O_3$, or a nitride represented by $Li_{3-x}M_xN$ (M=Co, Ni, Cu) may be used. With regard to the negative electrode active material, one or more types described above may be used.

In order to form the active material layer on the surface of the current collector, the active material may be applied on the surface of the current collector using a conventional method known in the art such as roll coating method, die coating method, dip coating method, doctor blade method, spray coating method, and curtain coating method. Specifically, an active material layer forming composition including the active material and, if necessary, the binding agent and the conductive additive is prepared, and, after adding a suitable solvent to this composition to obtain a paste, the paste is applied on the surface of the current collector and then dried. Examples of the solvent include N-methyl-2-pyrrolidone, methanol, methyl isobutyl ketone, and water. In order to increase electrode density, compression may be performed after drying.

A separator is used in the lithium ion secondary battery, if necessary. The separator is for separating the positive electrode and the negative electrode to allow passage of lithium ions while preventing short circuiting of current due to a contact of both electrodes. Examples of the separator include porous materials, nonwoven fabrics, and woven fabrics using one or more types of materials having electrical insulation property such as: synthetic resins such as polytetrafluoroethylene, polypropylene, polyethylene, polyimide, polyamide, polyaramide (aromatic polyamide), polyester, and polyacrylonitrile; polysaccharides such as cellulose and amylose; natural polymers such as fibroin, keratin, lignin, and suberin; and ceramics. In addition, the separator may have a multilayer structure. Since the electrolytic solution of the present invention has a high polarity and a slightly high viscosity, a film easily impregnated with a polar solvent such as water is preferable. Specifically, a film in which 90% or more of gaps existing therein are impregnated with a polar solvent such as water is preferable.

An electrode assembly is formed from the positive electrode, the negative electrode, and, if necessary, the separator interposed therebetween. The electrode assembly may be a laminated type obtained by stacking the positive electrode, the separator, and the negative electrode, or a wound type obtained by winding the positive electrode, the separator, and the negative electrode. The lithium ion secondary battery is preferably formed by respectively connecting, using current collecting leads or the like, the positive electrode current collector to a positive electrode external connection terminal and the negative electrode current collector to a negative electrode external connection terminal, and adding the electrolytic solution of the present invention to the electrode assembly. In addition, the lithium ion secondary battery of the present invention preferably executes charging and discharging at a voltage range suitable for the types of active materials included in the electrodes.

The form of the nonaqueous electrolyte secondary battery of the present invention is not particularly limited, and various forms such as a cylindrical type, square type, a coin type, and a laminated type, etc., are used.

The nonaqueous electrolyte secondary battery of the present invention may be mounted on a vehicle. The vehicle may be a vehicle that uses, as all or one portion of the source of power, electrical energy obtained from the nonaqueous electrolyte secondary battery, and examples thereof include electric vehicles and hybrid vehicles. When the nonaqueous electrolyte secondary battery is to be mounted on the vehicle, a plurality of the nonaqueous electrolyte secondary batteries may be connected in series to form an assembled battery.

Other than the vehicles, examples of instruments on which the nonaqueous electrolyte secondary battery may be mounted include various home appliances, office instruments, and industrial instruments driven by a battery such as personal computers and portable communication devices. In addition, the nonaqueous electrolyte secondary battery of the present invention may be used as power storage devices and power smoothing devices for wind power generation, photovoltaic power generation, hydroelectric power generation, and other power systems, power supply sources for auxiliary machineries and/or power of ships, etc., power supply sources for auxiliary machineries and/or power of aircraft and spacecraft, etc., auxiliary power supply for vehicles that do not use electricity as a source of power, power supply for movable household robots, power supply for system backup, power supply for uninterruptible power supply devices, and power storage devices for temporarily storing power required for charging at charge stations for electric vehicles.

Although the embodiments of the nonaqueous electrolyte secondary battery of the present invention have been described above, the present invention is not limited to the embodiments. Without departing from the gist of the present invention, the present invention can be implemented in various modes with modifications and improvements, etc., that can be made by a person skilled in the art.

EXAMPLES

In the following, the present invention is described specifically by presenting Examples and Comparative Examples. The present invention is not limited to these Examples. Hereinafter, unless mentioned otherwise in particular, "part (s)" refers to part (s) by mass, and "%" refers to mass %.

First, the result of an experiment conducted using an electrolytic solution as a reference experiment is described.

(Electrolytic Solution E1)

An electrolytic solution used in the present invention was produced in the following manner.

Approximately 5 mL of 1,2-dimethoxyethane, which is an organic solvent, was placed in a flask including a stirring bar and a thermometer. Under a stirring condition, with respect to 1,2-dimethoxyethane in the flask, $(CF_3SO_2)_2NLi$, which is a lithium salt, was gradually added so as to maintain a solution temperature equal to or lower than 40° C. to be dissolved. Since dissolving of $(CF_3SO_2)_2NLi$ momentarily stagnated at a time point when approximately 13 g of $(CF_3SO_2)_2NLi$ was added, the flask was heated by placing the flask in a temperature controlled bath such that the solution temperature in the flask reaches 50° C. to dissolve $(CF_3SO_2)_2NLi$. Since dissolving of $(CF_3SO_2)_2NLi$ stagnated again at a time point when approximately 15 g of $(CF_3SO_2)_2NLi$ was added, a single drop of 1,2-dimethoxyethane was added thereto using a pipette to dissolve $(CF_3SO_2)_2NLi$. Furthermore, $(CF_3SO_2)_2NLi$ was gradually added to accomplish adding an entire predetermined amount of $(CF_3SO_2)_2NLi$. The obtained electrolytic solution was transferred to a 20-mL measuring flask, and 1,2-dimethoxyethane was added thereto until a volume of 20 mL was obtained. This was used as electrolytic solution E1. The volume of the obtained electrolytic solution was 20 mL, and 18.38 g of $(CF_3SO_2)_2NLi$ was contained in the electrolytic solution. The concentration of $(CF_3SO_2)_2NLi$ in electrolytic solution E1 was 3.2 mol/L. In electrolytic solution E1, 1.6 molecules of 1,2-dimethoxyethane were contained with respect to 1 molecule of $(CF_3SO_2)_2NLi$.

The production was performed within a glovebox under an inert gas atmosphere.

(Electrolytic Solution E2)

With a method similar to that of electrolytic solution E1, electrolytic solution E2 whose concentration of $(CF_3SO_2)_2NLi$ was 2.8 mol/L was produced using 16.08 g of $(CF_3SO_2)_2NLi$. In electrolytic solution E2, 2.1 molecules of 1,2-dimethoxyethane were contained with respect to 1 molecule of $(CF_3SO_2)_2NLi$.

(Electrolytic Solution E3)

Approximately 5 mL of acetonitrile, which is an organic solvent, was placed in a flask including a stirring bar. Under a stirring condition, with respect to acetonitrile in the flask, $(CF_3SO_2)_2NLi$, which is a lithium salt, was gradually added to be dissolved. A total amount of 19.52 g of $(CF_3SO_2)_2NLi$ was added to the flask, and stirring was performed overnight in the flask. The obtained electrolytic solution was transferred to a 20-mL measuring flask, and acetonitrile was added thereto until a volume of 20 mL was obtained. This was used as electrolytic solution E3. The production was performed within a glovebox under an inert gas atmosphere.

The concentration of $(CF_3SO_2)_2NLi$ in electrolytic solution E3 was 3.4 mol/L. In electrolytic solution E3, 3 molecules of acetonitrile were contained with respect to 1 molecule of $(CF_3SO_2)_2NLi$.

(Electrolytic Solution E4)

With a method similar to that of electrolytic solution E3, electrolytic solution E4 whose concentration of $(CF_3SO_2)_2NLi$ was 4.2 mol/L was produced using 24.11 g of $(CF_3SO_2)_2NLi$. In electrolytic solution E4, 1.9 molecules of acetonitrile were contained with respect to 1 molecule of $(CF_3SO_2)_2NLi$.

(Electrolytic Solution E5)

Electrolytic solution E5 whose concentration of $(FSO_2)_2NLi$ was 3.6 mol/L was produced with a method similar to that of electrolytic solution E3 except for using 13.47 g of $(FSO_2)_2NLi$ as the lithium salt and 1,2-dimethoxyethane as the organic solvent. In electrolytic solution E5, 1.9 molecules of 1,2-dimethoxyethane were contained with respect to 1 molecule of $(FSO_2)_2NLi$.

(Electrolytic Solution E6)

With a method similar to that of electrolytic solution E5, electrolytic solution E6 whose concentration of $(FSO_2)_2NLi$ was 4.0 mol/L was produced using 14.97 g of $(FSO_2)_2NLi$. In electrolytic solution E6, 1.5 molecules of 1,2-dimethoxyethane were contained with respect to 1 molecule of $(FSO_2)_2NLi$.

(Electrolytic Solution E7)

Electrolytic solution E7 whose concentration of $(FSO_2)_2NLi$ was 4.2 mol/L was produced with a method similar to that of electrolytic solution E3 except for using 15.72 g of $(FSO_2)_2NLi$ as the lithium salt. In electrolytic solution E7, 3 molecules of acetonitrile were contained with respect to 1 molecule of $(FSO_2)_2NLi$.

(Electrolytic Solution E8)

With a method similar to that of electrolytic solution E7, electrolytic solution E8 whose concentration of $(FSO_2)_2NLi$ was 4.5 mol/L was produced using 16.83 g of $(FSO_2)_2NLi$. In electrolytic solution E8, 2.4 molecules of acetonitrile were contained with respect to 1 molecule of $(FSO_2)_2NLi$.

(Electrolytic Solution E9)

With a method similar to that of electrolytic solution E7, electrolytic solution E9 whose concentration of $(FSO_2)_2NLi$ was 5.4 mol/L was produced using 20.21 g of $(FSO_2)_2NLi$. In electrolytic solution E9, 2 molecules of acetonitrile were contained with respect to 1 molecule of $(FSO_2)_2NLi$.

(Electrolytic Solution E10)

Approximately 5 mL of dimethyl carbonate, which is an organic solvent, was placed in a flask including a stirring bar. Under a stirring condition, with respect to dimethyl carbonate in the flask, $(FSO_2)_2NLi$, which is a lithium salt, was gradually added to be dissolved. A total amount of 14.64 g of $(FSO_2)_2NLi$ was added to the flask, and stirring was performed overnight in the flask. The obtained electrolytic solution was transferred to a 20-mL measuring flask, and dimethyl carbonate was added thereto until a volume of 20 mL was obtained. This was used as electrolytic solution E10. The production was performed within a glovebox under an inert gas atmosphere.

The concentration of $(FSO_2)_2NLi$ in electrolytic solution E10 was 3.9 mol/L. In electrolytic solution E10, 2 molecules of dimethyl carbonate were contained with respect to 1 molecule of $(FSO_2)_2NLi$.

(Electrolytic Solution E11)

Electrolytic solution E11 whose concentration of $(FSO_2)_2NLi$ was 3.4 mol/L was obtained by adding dimethyl carbonate to, and thereby diluting, electrolytic solution E10. In electrolytic solution E11, 2.5 molecules of dimethyl carbonate were contained with respect to 1 molecule of $(FSO_2)_2NLi$.

(Electrolytic Solution E12)

Electrolytic solution E12 whose concentration of $(FSO_2)_2NLi$ was 2.9 mol/L was obtained by adding dimethyl carbonate to, and thereby diluting, electrolytic solution E10.

In electrolytic solution E12, 3 molecules of dimethyl carbonate were contained with respect to 1 molecule of $(FSO_2)_2NLi$.

(Electrolytic Solution E13)

Electrolytic solution E13 whose concentration of $(FSO_2)_2NLi$ was 2.6 mol/L was obtained by adding dimethyl carbonate to, and thereby diluting, electrolytic solution E10. In electrolytic solution E13, 3.5 molecules of dimethyl carbonate were contained with respect to 1 molecule of $(FSO_2)_2NLi$.

(Electrolytic Solution E14)

Electrolytic solution E14 whose concentration of $(FSO_2)_2NLi$ was 2.0 mol/L was obtained by adding dimethyl carbonate to, and thereby diluting, electrolytic solution E10. In electrolytic solution E14, 5 molecules of dimethyl carbonate were contained with respect to 1 molecule of $(FSO_2)_2NLi$ (Electrolytic Solution E15)

Approximately 5 mL of ethyl methyl carbonate, which is an organic solvent, was placed in a flask including a stirring bar. Under a stirring condition, with respect to ethyl methyl carbonate in the flask, $(FSO_2)2NLi$, which is a lithium salt, was gradually added to be dissolved. A total amount of 12.81 g of $(FSO_2)_2NLi$ was added to the flask, and stirring was performed overnight in the flask. The obtained electrolytic solution was transferred to a 20-mL measuring flask, and ethyl methyl carbonate was added thereto until a volume of 20 mL was obtained. This was used as electrolytic solution E15. The production was performed within a glovebox under an inert gas atmosphere.

The concentration of $(FSO_2)_2NLi$ in electrolytic solution E15 was 3.4 mol/L. In electrolytic solution E15, 2 molecules of ethyl methyl carbonate were contained with respect to 1 molecule of $(FSO_2)_2NLi$.

(Electrolytic Solution E16)

Electrolytic solution E16 whose concentration of $(FSO_2)_2NLi$ was 2.9 mol/L was obtained by adding ethyl methyl carbonate to, and thereby diluting, electrolytic solution E15. In electrolytic solution E16, 2.5 molecules of ethyl methyl carbonate were contained with respect to 1 molecule of $(FSO_2)_2NLi$.

(Electrolytic Solution E17)

Electrolytic solution E17 whose concentration of $(FSO_2)_2NLi$ was 2.2 mol/L was obtained by adding ethyl methyl carbonate to, and thereby diluting, electrolytic solution E15. In electrolytic solution E17, 3.5 molecules of ethyl methyl carbonate were contained with respect to 1 molecule of $(FSO_2)_2NLi$.

(Electrolytic Solution E18)

Approximately 5 mL of diethyl carbonate, which is an organic solvent, was placed in a flask including a stirring bar. Under a stirring condition, with respect to diethyl carbonate in the flask, $(FSO_2)_2NLi$, which is a lithium salt, was gradually added to be dissolved. A total amount of 11.37 g of $(FSO_2)_2NLi$ was added to the flask, and stirring was performed overnight in the flask. The obtained electrolytic solution was transferred to a 20-mL measuring flask, and diethyl carbonate was added thereto until a volume of 20 mL was obtained. This was used as electrolytic solution E18. The production was performed within a glovebox under an inert gas atmosphere.

The concentration of $(FSO_2)_2NLi$ in electrolytic solution E18 was 3.0 mol/L. In electrolytic solution E18, 2 molecules of diethyl carbonate were contained with respect to 1 molecule of $(FSO_2)_2NLi$.

(Electrolytic Solution E19)

Electrolytic solution E19 whose concentration of $(FSO_2)_2NLi$ was 2.6 mol/L was obtained by adding diethyl carbonate to, and thereby diluting, electrolytic solution E18. In electrolytic solution E19, 2.5 molecules of diethyl carbonate were contained with respect to 1 molecule of $(FSO_2)_2NLi$.

(Electrolytic Solution E20)

Electrolytic solution E20 whose concentration of $(FSO_2)_2NLi$ was 2.0 mol/L was obtained by adding diethyl carbonate to, and thereby diluting, electrolytic solution E18. In electrolytic solution E20, 3.5 molecules of diethyl carbonate were contained with respect to 1 molecule of $(FSO_2)_2NLi$.

(Electrolytic Solution E21)

With a method similar to that of electrolytic solution E7, electrolytic solution E21 whose concentration of $(FSO_2)_2NLi$ was 5.0 mol/L was produced using 18.71 g of $(FSO_2)_2NLi$. In electrolytic solution E21, 2.1 molecules of acetonitrile were contained with respect to 1 molecule of $(FSO_2)_2NLi$.

(Electrolytic Solution C1)

Electrolytic solution C1 whose concentration of $(CF_3SO_2)_2NLi$ was 1.0 mol/L was produced with a method similar to that of electrolytic solution E3, except for using 5.74 g of $(CF_3SO_2)_2NLi$ and 1,2-dimethoxyethane as the organic solvent. In electrolytic solution C1, 8.3 molecules of 1,2-dimethoxyethane were contained with respect to 1 molecule of $(CF_3SO_2)_2NLi$.

(Electrolytic Solution C2)

With a method similar to that of electrolytic solution E3, electrolytic solution C2 whose concentration of $(CF_3SO_2)_2NLi$ was 1.0 mol/L was produced using 5.74 g of $(CF_3SO_2)_2NLi$. In electrolytic solution C2, 16 molecules of acetonitrile were contained with respect to 1 molecule of $(CF_3SO_2)_2NLi$.

(Electrolytic Solution C3)

With a method similar to that of electrolytic solution E5, electrolytic solution C3 whose concentration of $(FSO_2)_2NLi$ was 1.0 mol/L was produced using 3.74 g of $(FSO_2)_2NLi$. In electrolytic solution C3, 8.8 molecules of 1,2-dimethoxyethane were contained with respect to 1 molecule of $(FSO_2)_2NLi$.

(Electrolytic Solution C4)

With a method similar to that of electrolytic solution E7, electrolytic solution C4 whose concentration of $(FSO_2)_2NLi$ was 1.0 mol/L was produced using 3.74 g of $(FSO_2)_2NLi$. In electrolytic solution C4, 17 molecules of acetonitrile were contained with respect to 1 molecule of $(FSO_2)_2NLi$.

(Electrolytic Solution C5)

Electrolytic solution C5 whose concentration of $LiPF_6$ was 1.0 mol/L was produced with a method similar to that of electrolytic solution E3 except for using a mixed solvent of ethylene carbonate and diethyl carbonate (volume ratio of 3:7; hereinafter, sometimes referred to as "EC/DEC") as the organic solvent, and 3.04 g of $LiPF_6$ as the lithium salt.

(Electrolytic Solution C6)

Electrolytic solution C6 whose concentration of $(FSO_2)_2NLi$ was 1.1 mol/L was obtained by adding dimethyl carbonate to, and thereby diluting, electrolytic solution E10. In electrolytic solution C6, 10 molecules of dimethyl carbonate were contained with respect to 1 molecule of $(FSO_2)_2NLi$.

(Electrolytic Solution C7)

Electrolytic solution C7 whose concentration of $(FSO_2)_2NLi$ was 1.1 mol/L was obtained by adding ethyl methyl carbonate to, and thereby diluting, electrolytic solution E15. In electrolytic solution C7, 8 molecules of ethyl methyl carbonate were contained with respect to 1 molecule of $(FSO_2)_2NLi$.

(Electrolytic Solution C8)

Electrolytic solution C8 whose concentration of $(FSO_2)_2NLi$ was 1.1 mol/L was obtained by adding diethyl carbonate to, and thereby diluting, electrolytic solution E18. In electrolytic solution C8, 7 molecules of diethyl carbonate were contained with respect to 1 molecule of $(FSO_2)_2NLi$.

Table 3 shows a list of electrolytic solutions E1 to E21 and C1 to C8.

TABLE 3

| | Lithium salt | Organic solvent | Lithium salt concentration (mol/L) | Organic solvent/ Lithium salt (mole ratio) |
|---|---|---|---|---|
| Electrolytic solution E1 | LiTFSA | DME | 3.2 | 1.6 |
| Electrolytic solution E2 | LiTFSA | DME | 2.8 | 2.1 |
| Electrolytic solution E3 | LiTFSA | AN | 3.4 | 3 |
| Electrolytic solution E4 | LiTFSA | AN | 4.2 | 1.9 |
| Electrolytic solution E5 | LiFSA | DME | 3.6 | 1.9 |
| Electrolytic solution E6 | LiFSA | DME | 4.0 | 1.5 |
| Electrolytic solution E7 | LiFSA | AN | 4.2 | 3 |
| Electrolytic solution E8 | LiFSA | AN | 4.5 | 2.4 |
| Electrolytic solution E9 | LiFSA | AN | 5.4 | 2 |
| Electrolytic solution E10 | LiFSA | DMC | 3.9 | 2 |
| Electrolytic solution E11 | LiFSA | DMC | 3.4 | 2.5 |
| Electrolytic solution E12 | LiFSA | DMC | 2.9 | 3 |
| Electrolytic solution E13 | LiFSA | DMC | 2.6 | 3.5 |
| Electrolytic solution E14 | LiFSA | DMC | 2.0 | 5 |
| Electrolytic solution E15 | LiFSA | EMC | 3.4 | 2 |
| Electrolytic solution E16 | LiFSA | EMC | 2.9 | 2.5 |
| Electrolytic solution E17 | LiFSA | EMC | 2.2 | 3.5 |
| Electrolytic solution E18 | LiFSA | DEC | 3.0 | 2 |
| Electrolytic solution E19 | LiFSA | DEC | 2.6 | 2.5 |
| Electrolytic solution E20 | LiFSA | DEC | 2.0 | 3.5 |
| Electrolytic solution E21 | LiFSA | AN | 5.0 | 2.1 |
| Electrolytic solution C1 | LiTFSA | DME | 1.0 | 8.3 |
| Electrolytic solution C2 | LiTFSA | AN | 1.0 | 16 |
| Electrolytic solution C3 | LiFSA | DME | 1.0 | 8.8 |
| Electrolytic solution C4 | LiFSA | AN | 1.0 | 17 |
| Electrolytic solution C5 | $LiPF_6$ | EC/DEC | 1.0 | |
| Electrolytic solution C6 | LiFSA | DMC | 1.1 | 10 |
| Electrolytic solution C7 | LiFSA | EMC | 1.1 | 8 |
| Electrolytic solution C8 | LiFSA | DEC | 1.1 | 7 |

LiTFSA: $(CF_3SO_2)_2NLi$,
LiFSA: $(FSO_2)_2NLi$
AN: acetonitrile,
DME: 1,2-dimethoxyethane
DMC: dimethyl carbonate,
EMC: ethyl methyl carbonate,
DEC: diethyl carbonate
EC/DEC: mixed solvent of ethylene carbonate and diethyl carbonate (volume ratio 3:7)

Evaluation Example 1: IR Measurement

IR measurement was performed using the following conditions on electrolytic solutions E3, E4, E7, E8, E9, C2, and C4, acetonitrile, $(CF_3SO_2)_2NLi$, and $(FSO_2)_2NLi$. An IR spectrum in a range of 2100 $cm^{-1}$ to 2400 $cm^{-1}$ is shown in each of FIGS. 1 to 10. Furthermore, IR measurement was performed using the following conditions on electrolytic solutions E10 to E20 and C6 to C8, dimethyl carbonate, ethyl methyl carbonate, and diethyl carbonate. An IR spectrum in a range of 1900 to 1600 $cm^{-1}$ is shown in each of FIGS. 11 to 27. In addition, an IR spectrum of $(FSO_2)_2NLi$ in a range of 1900 to 1600 $cm^{-1}$ is shown in FIG. 28. In each figure, the horizontal axis represents wave number ($cm^{-1}$) and the vertical axis represents absorbance (reflective absorbance).

IR Measuring Conditions

Device: FT-IR (manufactured by Bruker Optics K.K.)
Measuring condition: ATR method (diamond was used)
Measurement atmosphere: Inert gas atmosphere At around 2250 $cm^{-1}$ in the IR spectrum of acetonitrile shown in FIG. 8, a characteristic peak derived from stretching vibration of a triple bond between C and N of acetonitrile was observed. No particular peaks were observed at around 2250 $cm^{-1}$ in the IR spectrum of $(CF_3SO_2)_2NLi$ shown in FIG. 9 and the IR spectrum of $(FSO_2)_2NLi$ shown in FIG. 10.

In the IR spectrum of electrolytic solution E3 shown in FIG. 1, a characteristic peak derived from stretching vibration of a triple bond between C and N of acetonitrile was slightly (Io=0.00699) observed at around 2250 $cm^{-1}$. Additionally in the IR spectrum in FIG. 1, a characteristic peak derived from stretching vibration of a triple bond between C and N of acetonitrile was observed at a peak intensity of Is=0.05828 at around 2280 $cm^{-1}$ shifted toward the high wave number side from around 2250 $cm^{-1}$. The relationship between peak intensities of Is and Io was Is>Io and Is=8×Io.

Figure 2:
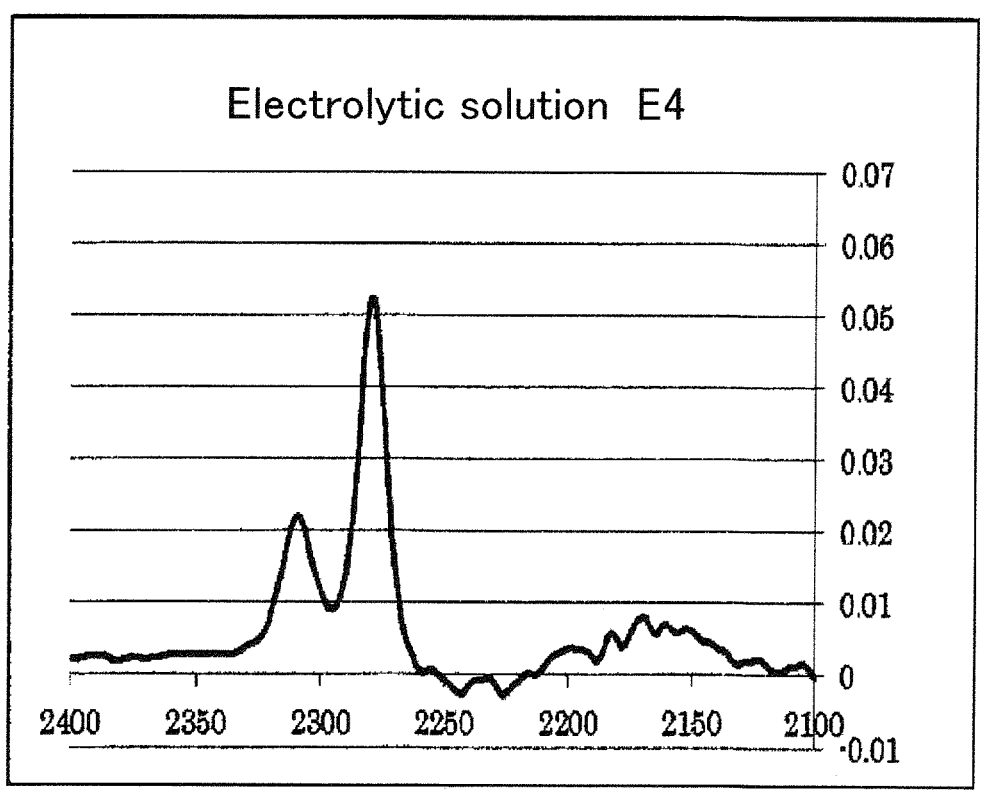
FIG. 2 is an IR spectrum of electrolytic solution E4.

In the IR spectrum of electrolytic solution E4 shown in FIG. 2, a peak derived from acetonitrile was not observed at around 2250 $cm^{-1}$, whereas a characteristic peak derived from stretching vibration of a triple bond between C and N of acetonitrile was observed at a peak intensity of Is=0.05234 at around 2280 $cm^{-1}$ shifted toward the high wave number side from around 2250 $cm^{-1}$. The relationship between peak intensities of Is and Io was Is>Io.

Figure 3:
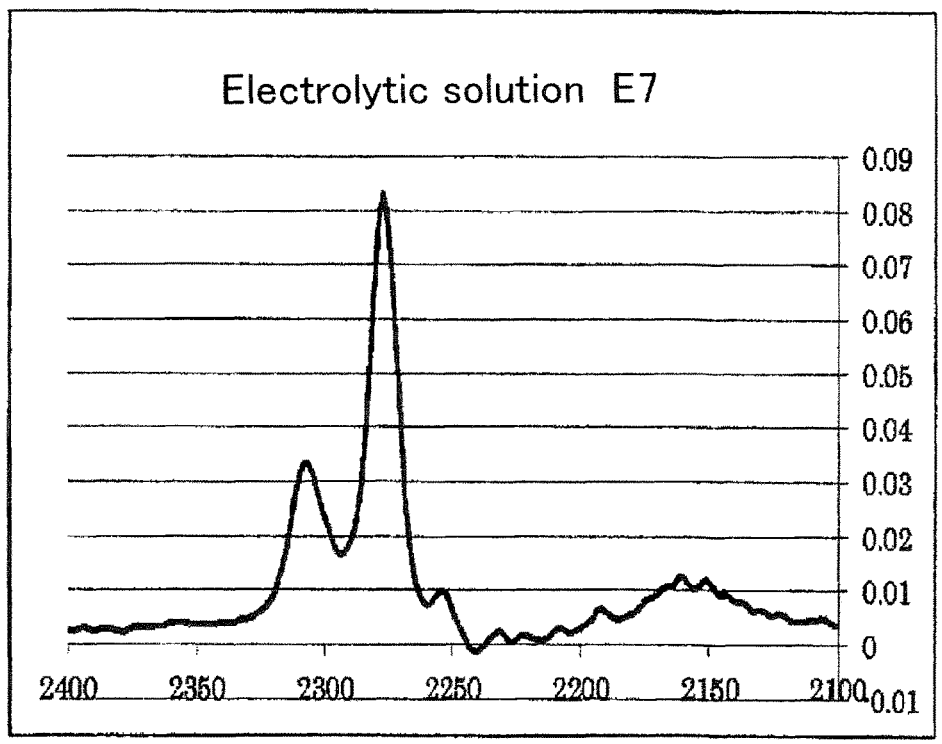
FIG. 3 is an IR spectrum of electrolytic solution E7.
Figure 4:
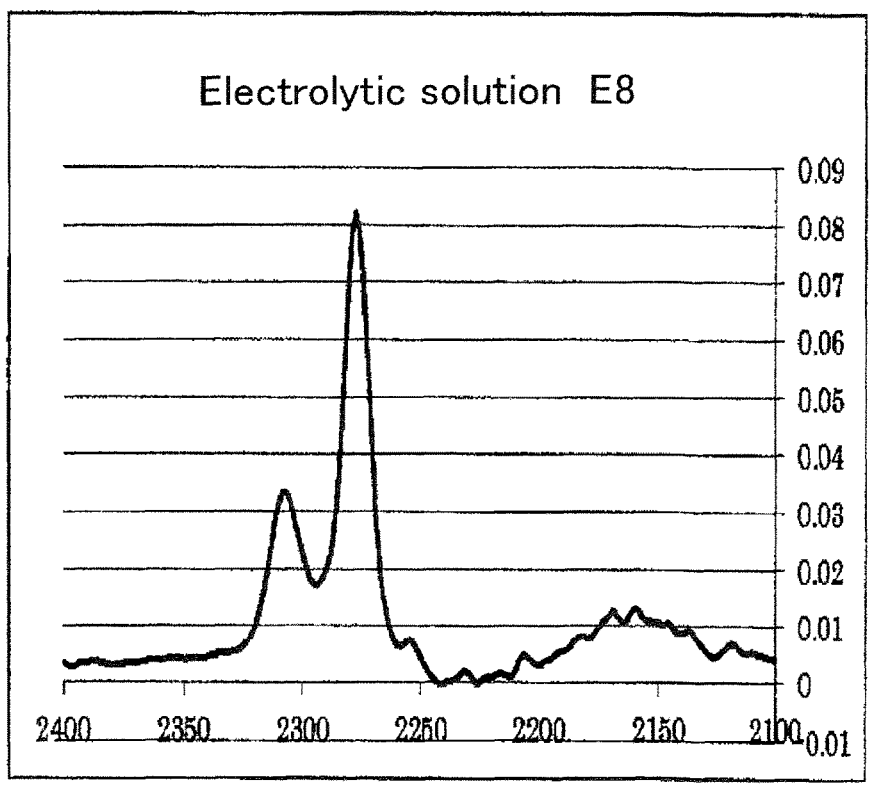
FIG. 4 is an IR spectrum of electrolytic solution E8.

In the IR spectrum of electrolytic solution E7 shown in FIG. 3, a characteristic peak derived from stretching vibration of a triple bond between C and N of acetonitrile was slightly (Io=0.00997) observed at around 2250 $cm^{-1}$. Additionally in the IR spectrum in FIG. 3, a characteristic peak derived from stretching vibration of a triple bond between C and N of acetonitrile was observed at a peak intensity of Is=0.08288 at around 2280 cm$^{-1}$ shifted toward the high wave number side from around 2250 cm$^{-1}$. The relationship between peak intensities of Is and Io was Is>Io and Is=8×Io. A peak having a similar intensity and similar wave number to those in the IR chart of FIG. 3 was also observed in the IR spectrum of electrolytic solution E8 shown in FIG. 4. The relationship between peak intensities of Is and Io was Is>Io and Is=11×Io.

Figure 5:
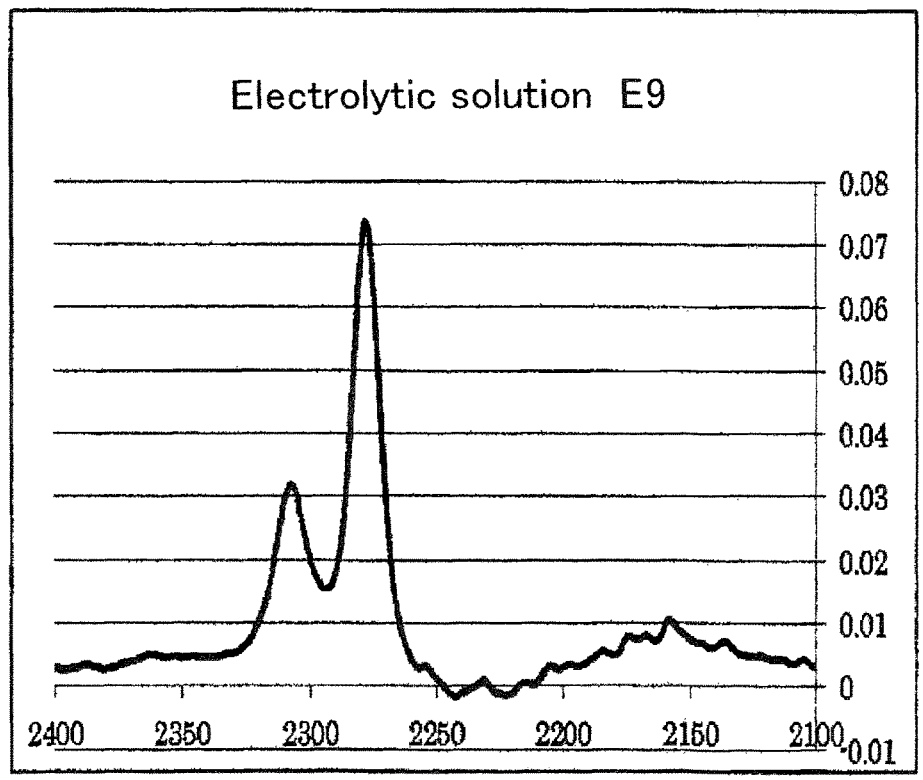
FIG. 5 is an IR spectrum of electrolytic solution E9.

In the IR spectrum of electrolytic solution E9 shown in FIG. 5, a peak derived from acetonitrile was not observed at around 2250 cm$^{-1}$, whereas a characteristic peak derived from stretching vibration of a triple bond between C and N of acetonitrile was observed at a peak intensity of Is=0.07350 at around 2280 cm$^{-1}$ shifted toward the high wave number side from around 2250 cm$^{-1}$. The relationship between peak intensities of Is and Io was Is>Io.

Figure 6:
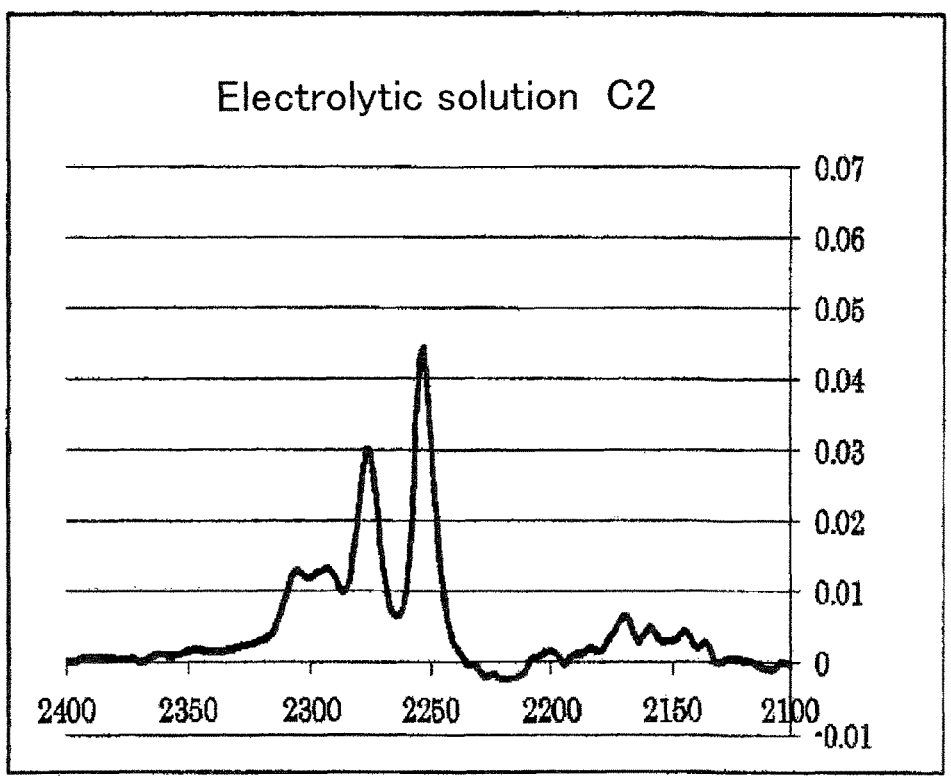
FIG. 6 is an IR spectrum of electrolytic solution C2.
Figure 8:
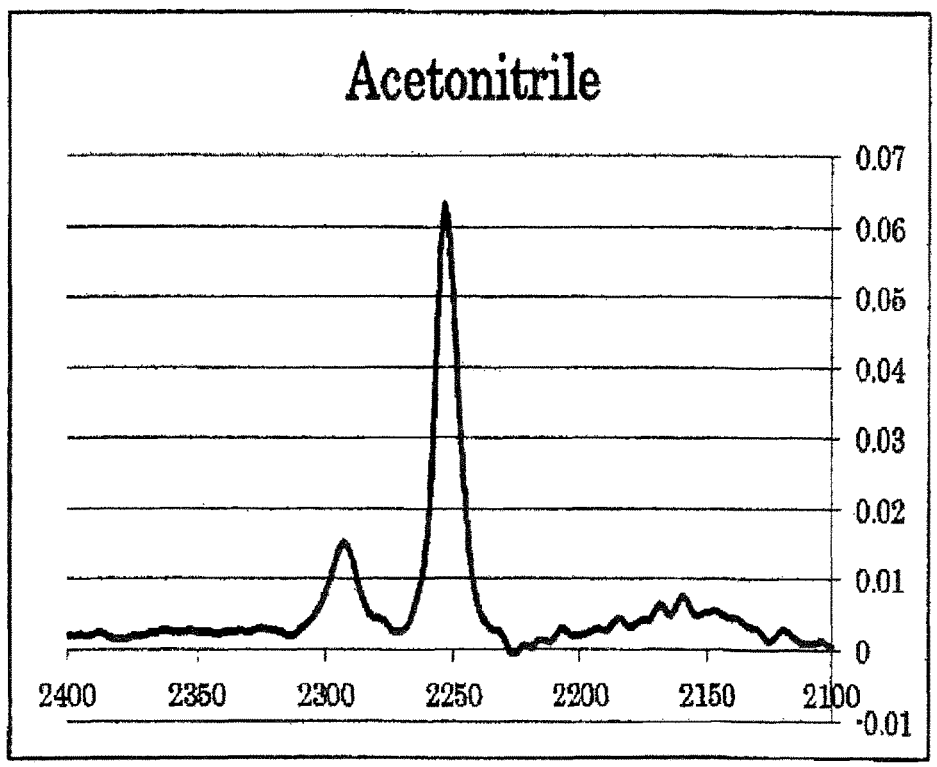
FIG. 8 is an IR spectrum of acetonitrile.
Figure 9:
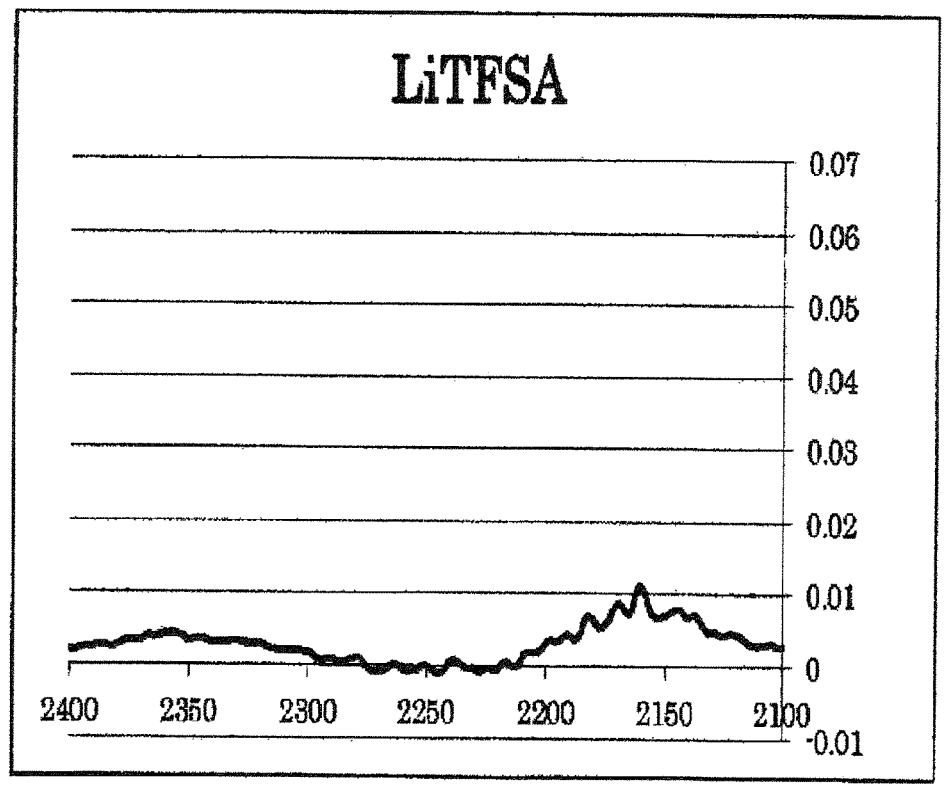
FIG. 9 is an IR spectrum of $(CF_3SO_2)_2NLi$.
Figure 10:
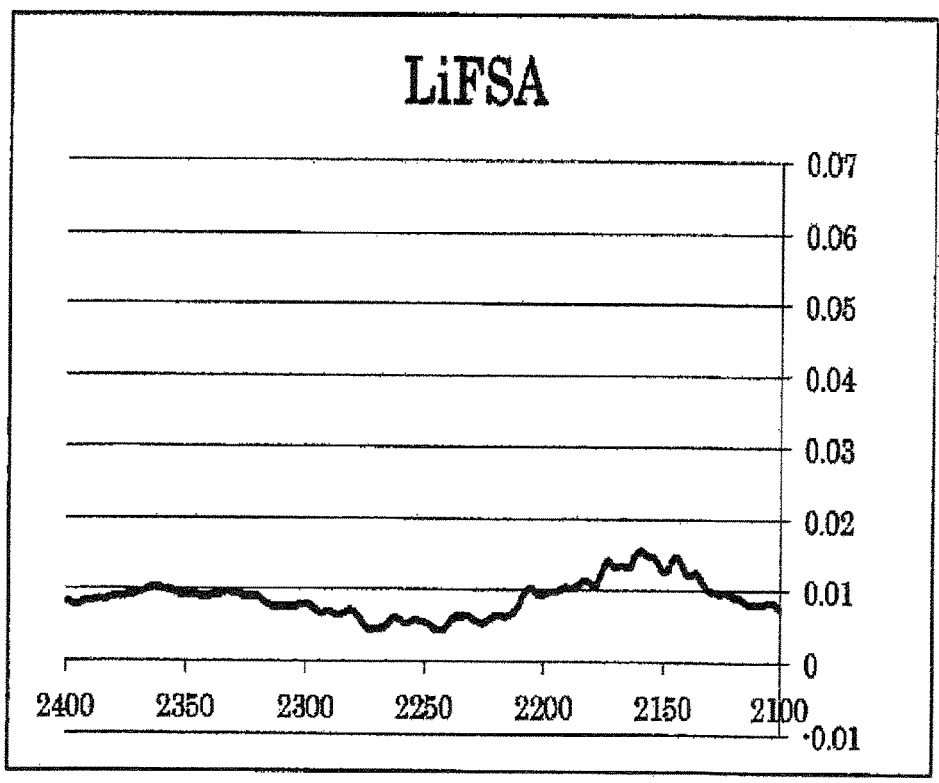
FIG. 10 is an IR spectrum of $(FSO_2)_2NLi$ (2100 to 2400 $cm^{-1}$)

In the IR spectrum of electrolytic solution C2 shown in FIG. 6, a characteristic peak derived from stretching vibration of a triple bond between C and N of acetonitrile was observed at a peak intensity of Io=0.04441 at around 2250 cm$^{-1}$ in a manner similar to FIG. 8. Additionally in the IR spectrum in FIG. 6, a characteristic peak derived from stretching vibration of a triple bond between C and N of acetonitrile was observed at a peak intensity of Is=0.03018 at around 2280 cm$^{-1}$ shifted toward the high wave number side from around 2250 cm$^{-1}$. The relationship between peak intensities of Is and Io was Is<Io.

Figure 7:
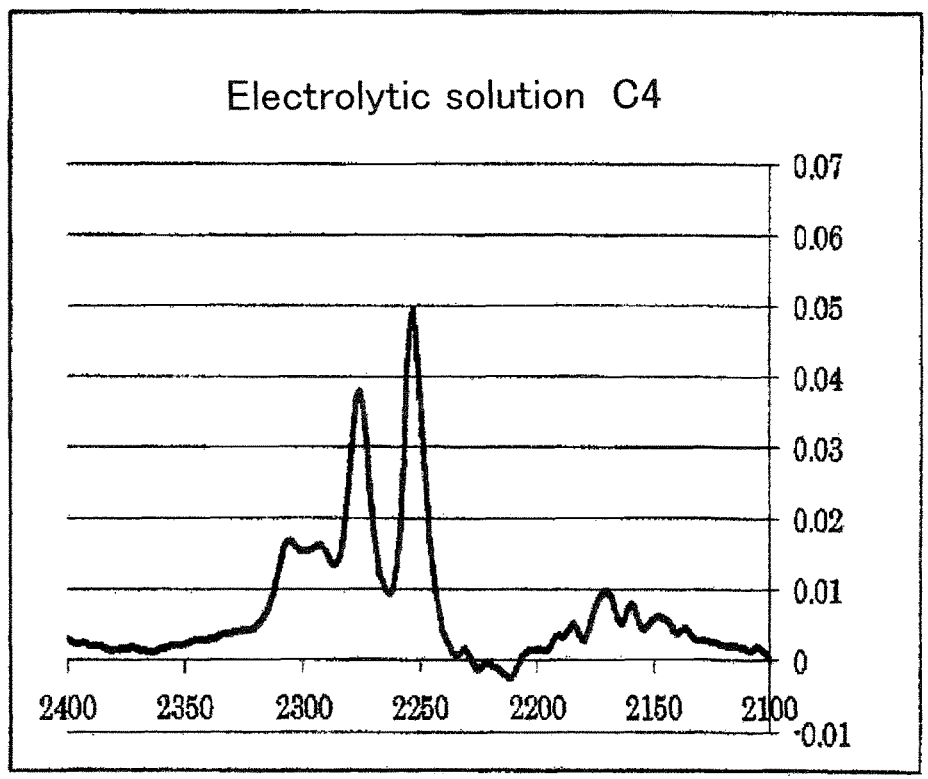
FIG. 7 is an IR spectrum of electrolytic solution C4.

In the IR spectrum of electrolytic solution C4 shown in FIG. 7, a characteristic peak derived from stretching vibration of a triple bond between C and N of acetonitrile was observed at a peak intensity of Io=0.04975 at around 2250 cm$^{-1}$ in a manner similar to FIG. 8. Additionally in the IR spectrum in FIG. 7, a characteristic peak derived from stretching vibration of a triple bond between C and N of acetonitrile was observed at a peak intensity of Is=0.03804 at around 2280 cm$^{-1}$ shifted toward the high wave number side from around 2250 cm$^{-1}$. The relationship between peak intensities of Is and Io was Is<Io.

Figure 17:
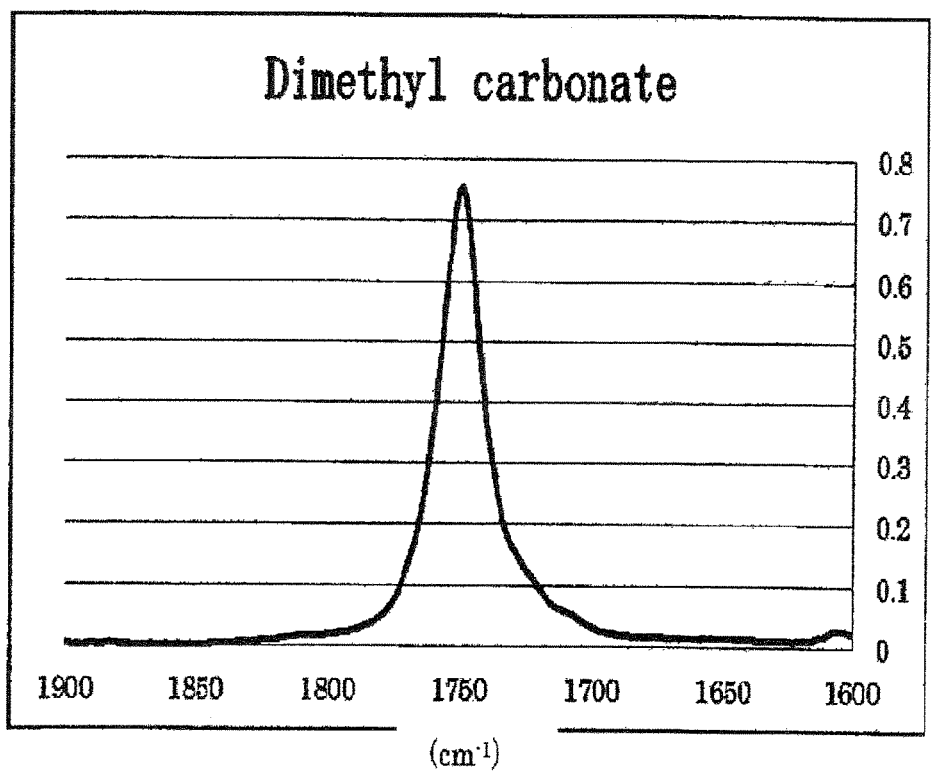
FIG. 17 is an IR spectrum of dimethyl carbonate.

At around 1750 cm$^{-1}$ in the IR spectrum of dimethyl carbonate shown in FIG. 17, a characteristic peak derived from stretching vibration of a double bond between C and O of dimethyl carbonate was observed. No particular peaks were observed at around 1750 cm$^{-1}$ in the IR spectrum of (FSO$_2$)$_2$NLi shown in FIG. 28.

Figure 11:
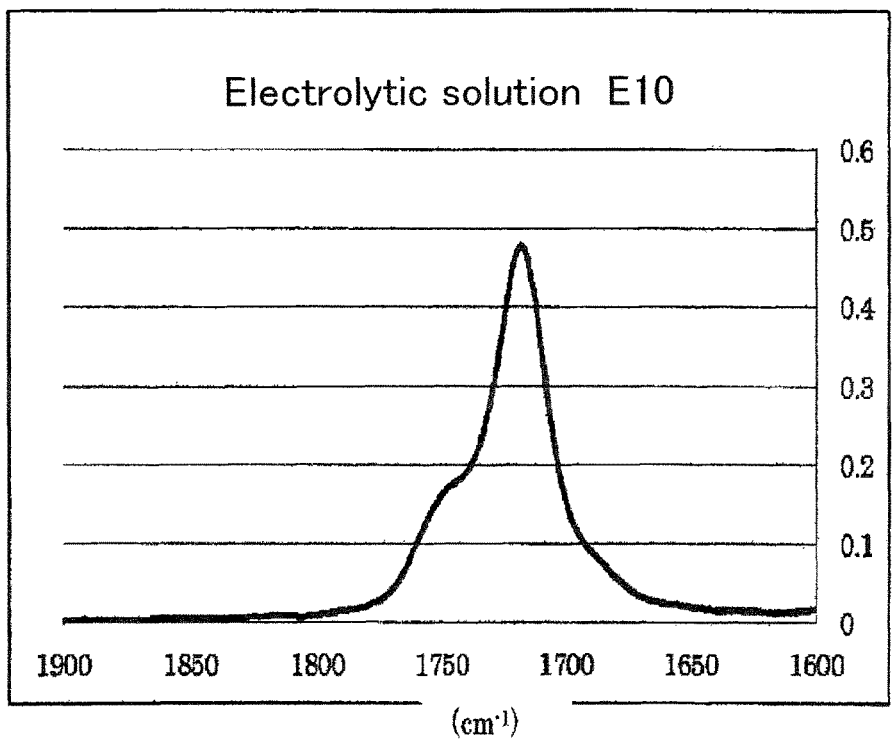
FIG. 11 is an IR spectrum of electrolytic solution E10.

In the IR spectrum of electrolytic solution E10 shown in FIG. 11, a characteristic peak derived from stretching vibration of a double bond between C and O of dimethyl carbonate was slightly (Io=0.16628) observed at around 1750 cm$^{-1}$. Additionally in the IR spectrum in FIG. 11, a characteristic peak derived from stretching vibration of a double bond between C and O of dimethyl carbonate was observed at a peak intensity of Is=0.48032 at around 1717 cm$^{-1}$ shifted toward the low wave number side from around 1750 cm$^{-1}$. The relationship between peak intensities of Is and Io was Is>Io and Is=2.89×Io.

Figure 12:
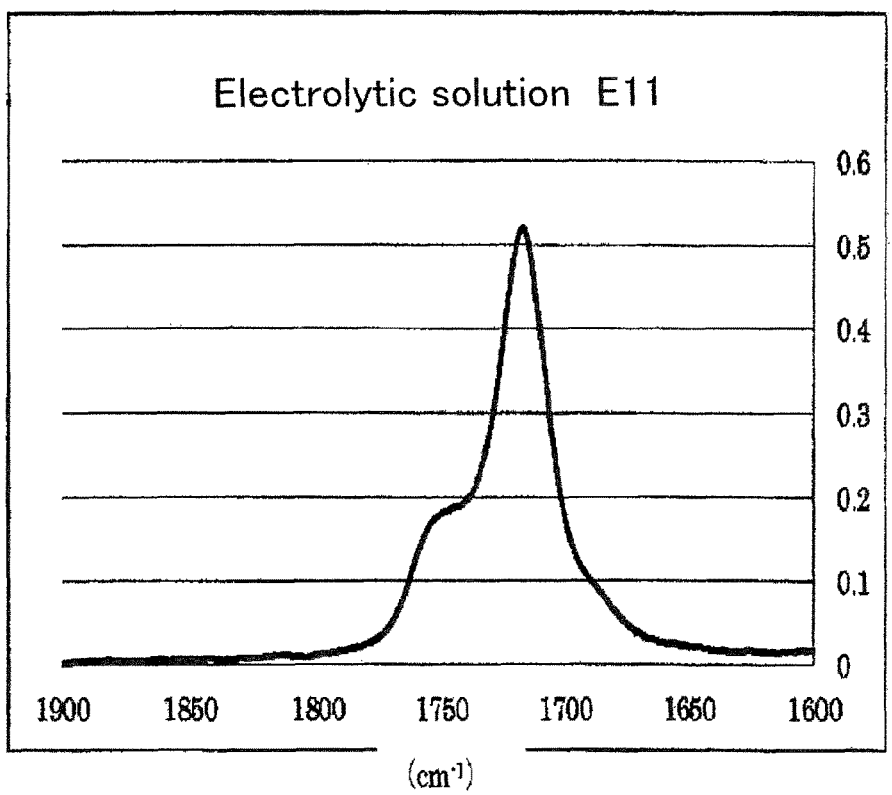
FIG. 12 is an IR spectrum of electrolytic solution E11.

In the IR spectrum of electrolytic solution E11 shown in FIG. 12, a characteristic peak derived from stretching vibration of a double bond between C and O of dimethyl carbonate was slightly (Io=0.18129) observed at around 1750 cm$^{-1}$. Additionally in the IR spectrum in FIG. 12, a characteristic peak derived from stretching vibration of a double bond between C and O of dimethyl carbonate was observed at a peak intensity of Is=0.52005 at around 1717 cm$^{-1}$ shifted toward the low wave number side from around 1750 cm$^{-1}$. The relationship between peak intensities of Is and Io was Is>Io and Is=2.87×Io.

Figure 13:
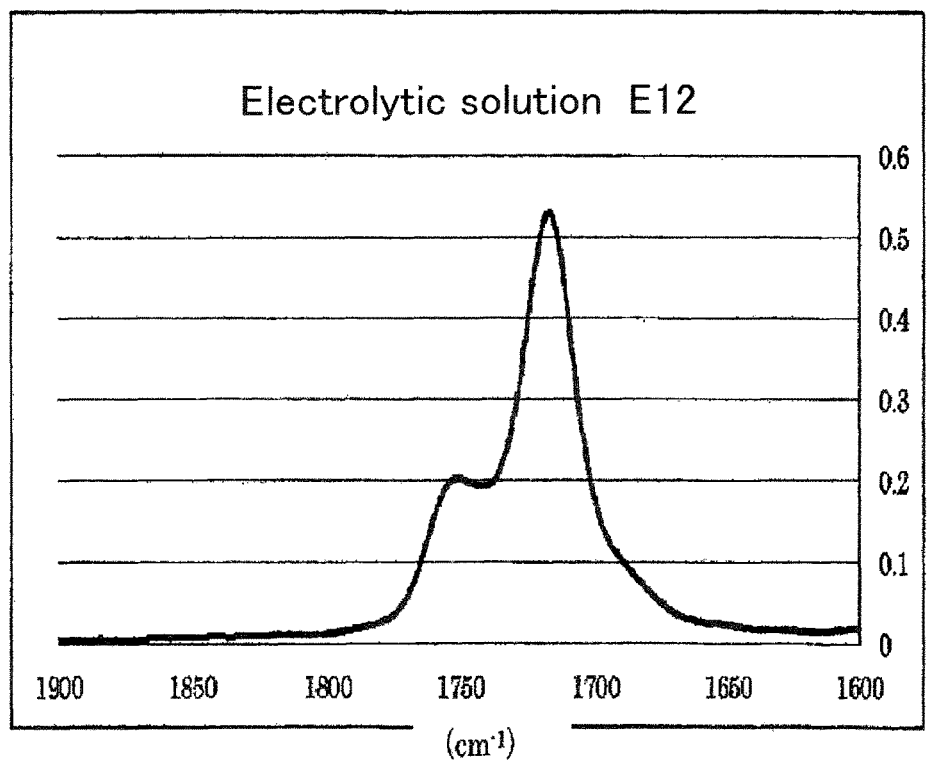
FIG. 13 is an IR spectrum of electrolytic solution E12.

In the IR spectrum of electrolytic solution E12 shown in FIG. 13, a characteristic peak derived from stretching vibration of a double bond between C and O of dimethyl carbonate was slightly (Io=0.20293) observed at around 1750 cm$^{-1}$. Additionally in the IR spectrum in FIG. 13, a characteristic peak derived from stretching vibration of a double bond between C and O of dimethyl carbonate was observed at a peak intensity of Is=0.53091 at around 1717 cm$^{-1}$ shifted toward the low wave number side from around 1750 cm$^{-1}$. The relationship between peak intensities of Is and Io was Is>Io and Is=2.62×Io.

Figure 14:
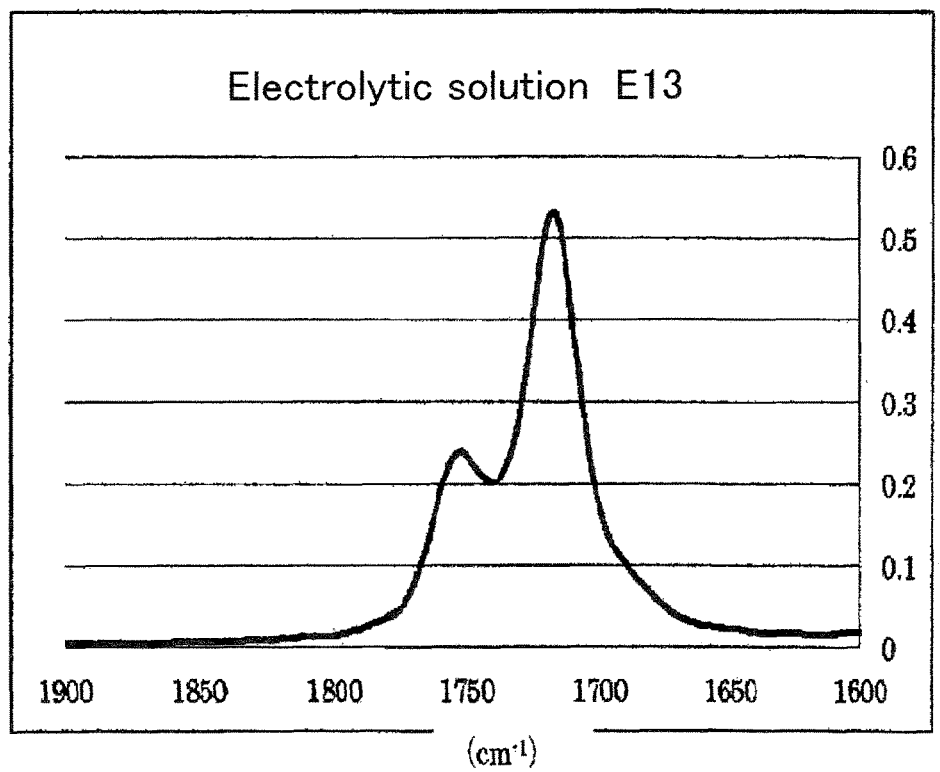
FIG. 14 is an IR spectrum of electrolytic solution E13.

In the IR spectrum of electrolytic solution E13 shown in FIG. 14, a characteristic peak derived from stretching vibration of a double bond between C and O of dimethyl carbonate was slightly (Io=0.23891) observed at around 1750 cm$^{-1}$. Additionally in the IR spectrum in FIG. 14, a characteristic peak derived from stretching vibration of a double bond between C and O of dimethyl carbonate was observed at a peak intensity of Is=0.53098 at around 1717 cm$^{-1}$ shifted toward the low wave number side from around 1750 cm$^{-1}$. The relationship between peak intensities of Is and Io was Is>Io and Is=2.22×Io.

Figure 15:
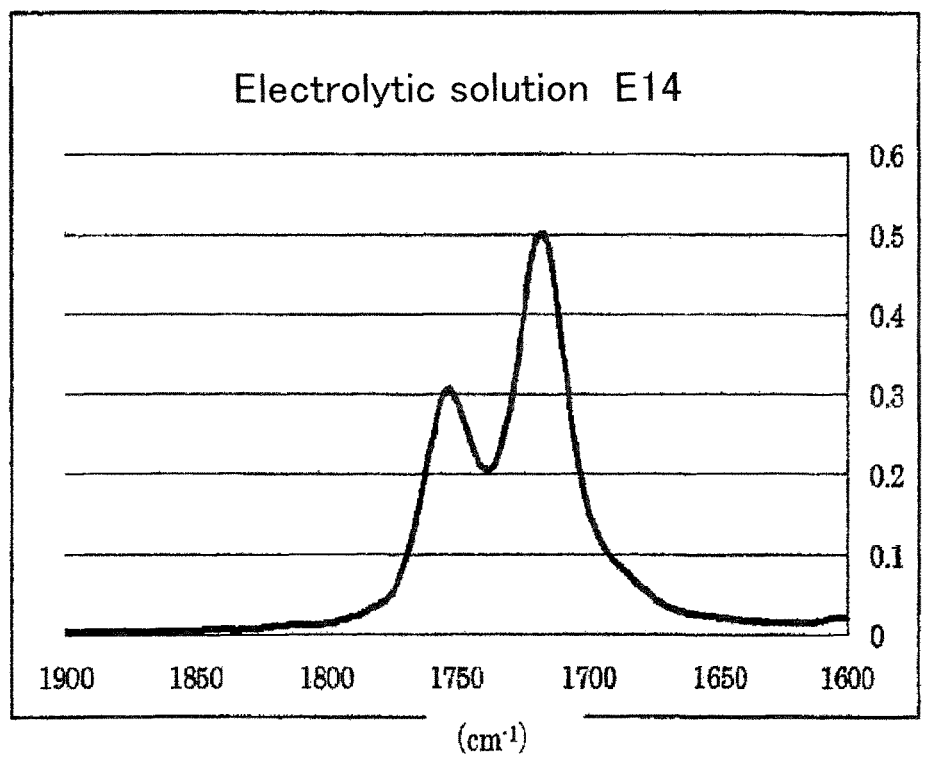
FIG. 15 is an IR spectrum of electrolytic solution E14.

In the IR spectrum of electrolytic solution E14 shown in FIG. 15, a characteristic peak derived from stretching vibration of a double bond between C and O of dimethyl carbonate was slightly (Io=0.30514) observed at around 1750 cm$^{-1}$. Additionally in the IR spectrum in FIG. 15, a characteristic peak derived from stretching vibration of a double bond between C and O of dimethyl carbonate was observed at a peak intensity of Is=0.50223 at around 1717 cm$^{-1}$ shifted toward the low wave number side from around 1750 cm$^{-1}$. The relationship between peak intensities of Is and Io was Is>Io and Is=1.65×Io.

Figure 16:
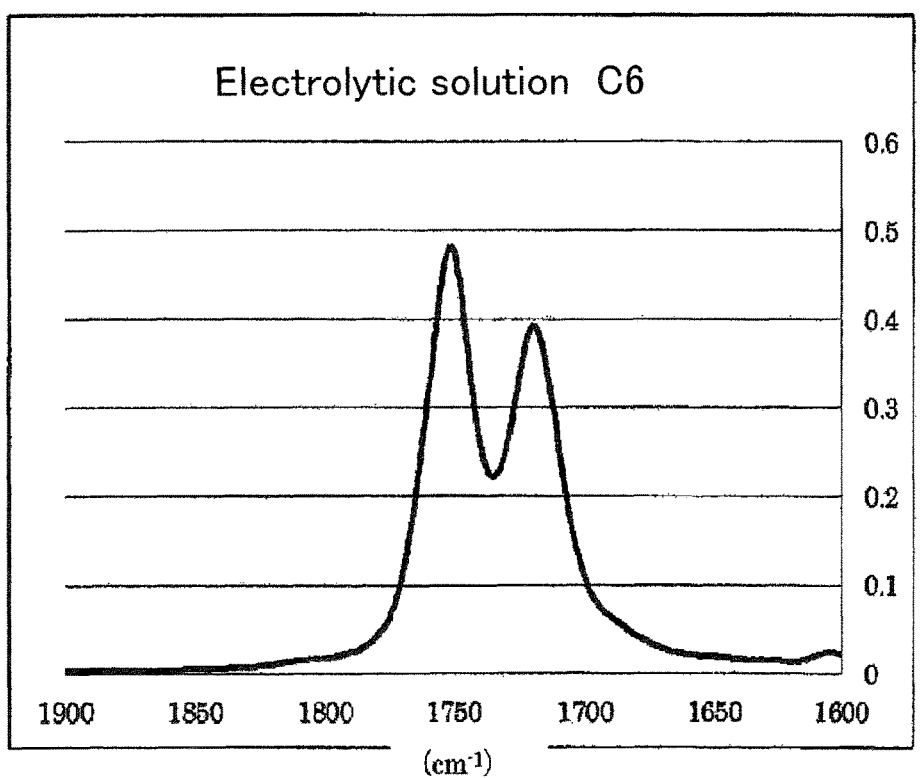
FIG. 16 is an IR spectrum of electrolytic solution C6.

In the IR spectrum of electrolytic solution C6 shown in FIG. 16, a characteristic peak derived from stretching vibration of a double bond between C and O of dimethyl carbonate was observed (1o=0.48204) at around 1750 cm$^{-1}$. Additionally in the IR spectrum in FIG. 16, a characteristic peak derived from stretching vibration of a double bond between C and O of dimethyl carbonate was observed at a peak intensity of Is=0.39244 at around 1717 cm$^{-1}$ shifted toward the low wave number side from around 1750 cm$^{-1}$. The relationship between peak intensities of Is and Io was Is<Io.

Figure 22:
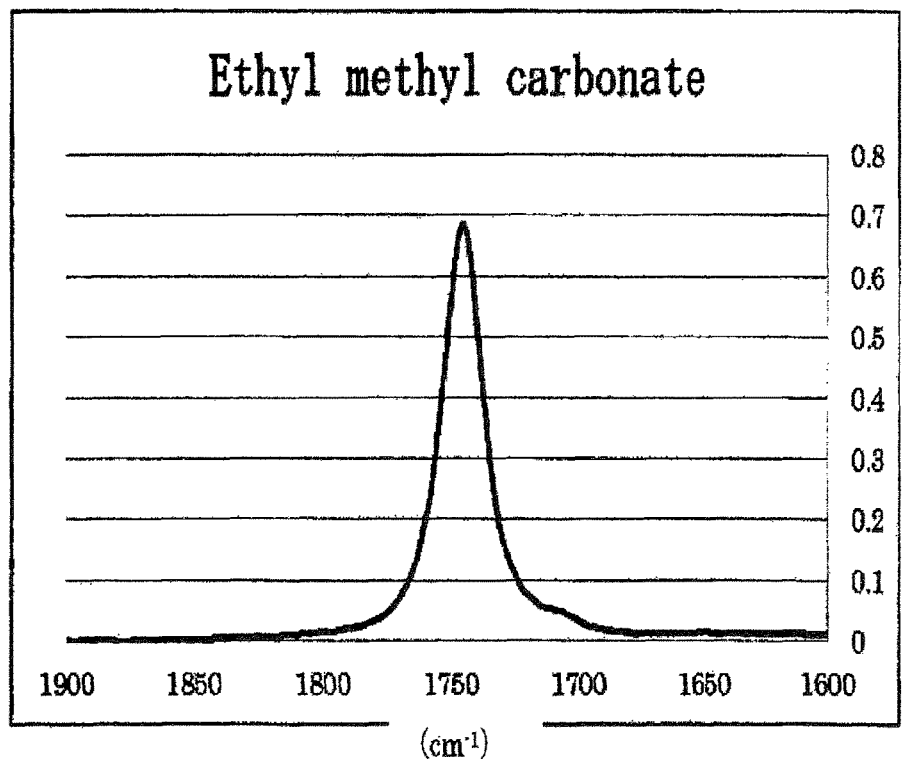
FIG. 22 is an IR spectrum of ethyl methyl carbonate.

At around 1745 cm$^{-1}$ in the IR spectrum of ethyl methyl carbonate shown in FIG. 22, a characteristic peak derived from stretching vibration of a double bond between C and O of ethyl methyl carbonate was observed.

Figure 18:
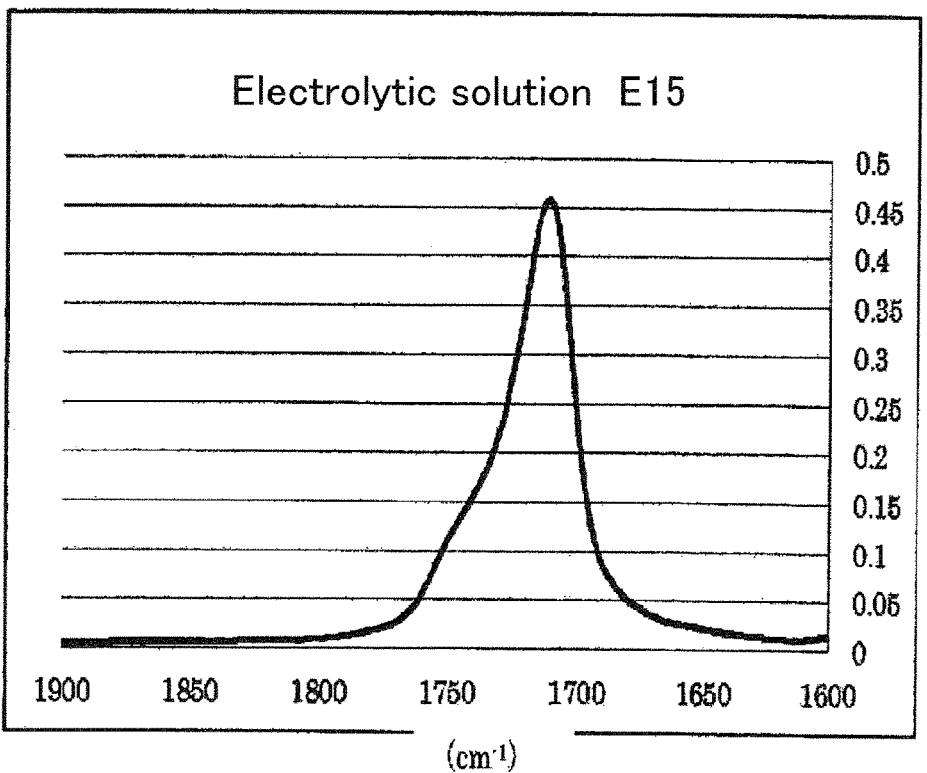
FIG. 18 is an IR spectrum of electrolytic solution E15.

In the IR spectrum of electrolytic solution E15 shown in FIG. 18, a characteristic peak derived from stretching vibration of a double bond between C and O of ethyl methyl carbonate was slightly (1o=0.13582) observed at around 1745 cm$^{-1}$. Additionally in the IR spectrum in FIG. 18, a characteristic peak derived from stretching vibration of a double bond between C and O of ethyl methyl carbonate was observed at a peak intensity of Is=0.45888 at around 1711 cm$^{-1}$ shifted toward the low wave number side from around 1745 cm$^{-1}$. The relationship between peak intensities of Is and Io was Is>Io and Is=3.38×Io.

Figure 19:
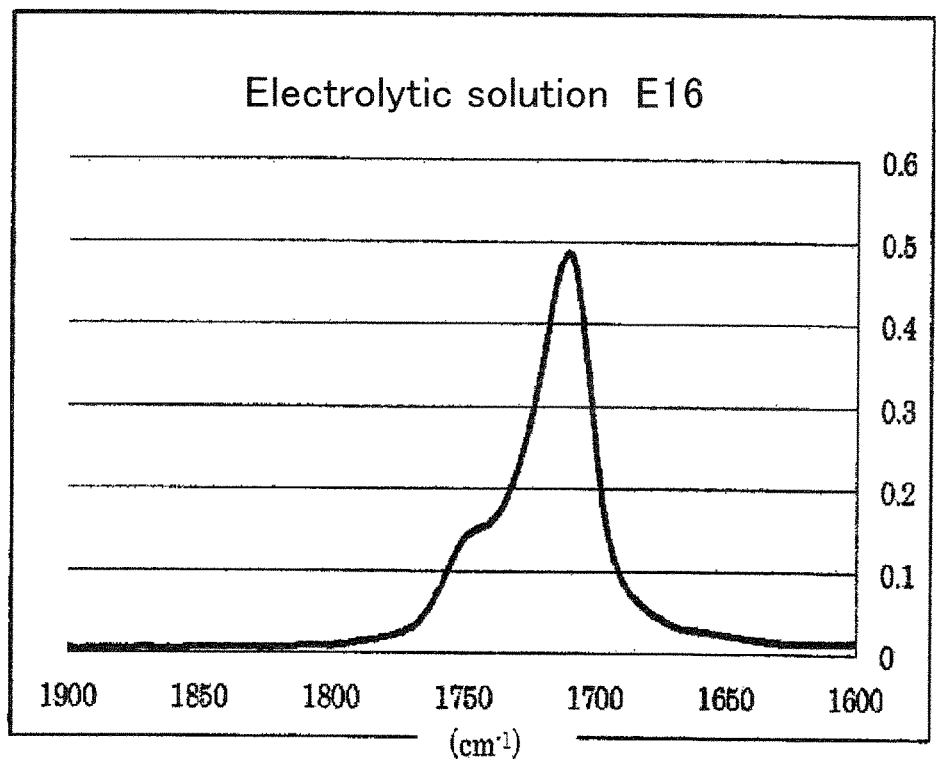
FIG. 19 is an IR spectrum of electrolytic solution E16.

In the IR spectrum of electrolytic solution E16 shown in FIG. 19, a characteristic peak derived from stretching vibration of a double bond between C and O of ethyl methyl carbonate was slightly (1o=0.15151) observed at around 1745 cm$^{-1}$. Additionally in the IR spectrum in FIG. 19, a characteristic peak derived from stretching vibration of a double bond between C and O of ethyl methyl carbonate was observed at a peak intensity of Is=0.48779 at around 1711 cm$^{-1}$ shifted toward the low wave number side from around 1745 cm$^{-1}$. The relationship between peak intensities of Is and Io was Is>Io and Is=3.22×Io.

Figure 20:
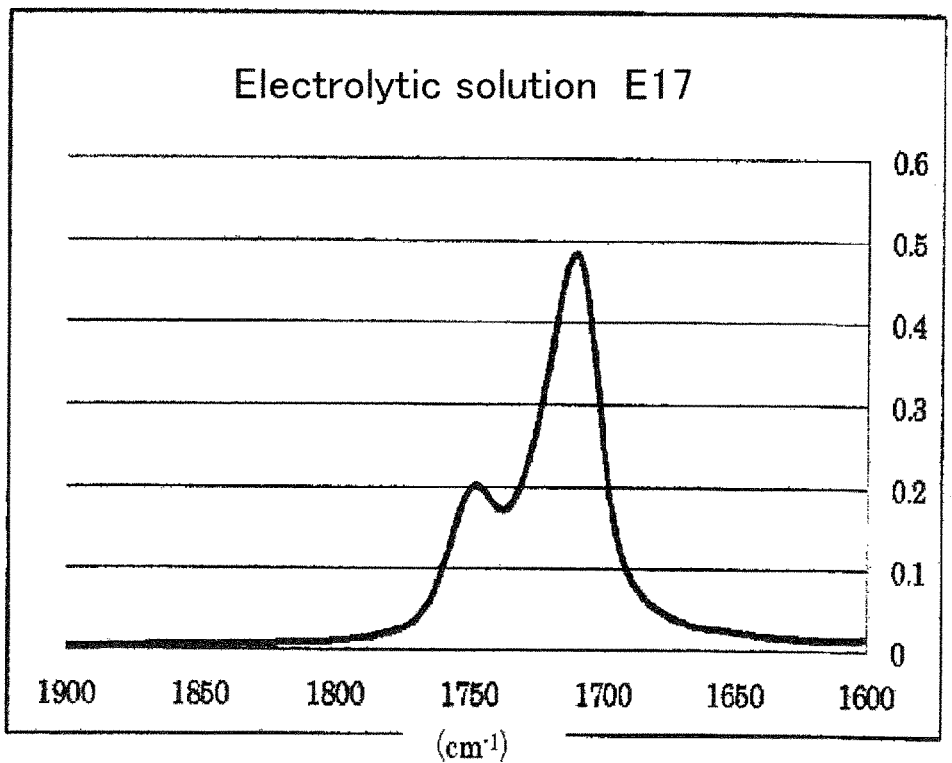
FIG. 20 is an IR spectrum of electrolytic solution E17.

In the IR spectrum of electrolytic solution E11 shown in FIG. 20, a characteristic peak derived from stretching vibration of a double bond between C and O of ethyl methyl carbonate was slightly (I0=0.20191) observed at around 1745 cm$^{-1}$. Additionally in the IR spectrum in FIG. 20, a characteristic peak derived from stretching vibration of a double bond between C and O of ethyl methyl carbonate was observed at a peak intensity of Is=0.48407 at around 1711 cm$^{-1}$ shifted toward the low wave number side from around 1745 cm$^{-1}$. The relationship between peak intensities of Is and Io was Is>Io and Is=2.40×Io.

Figure 21:
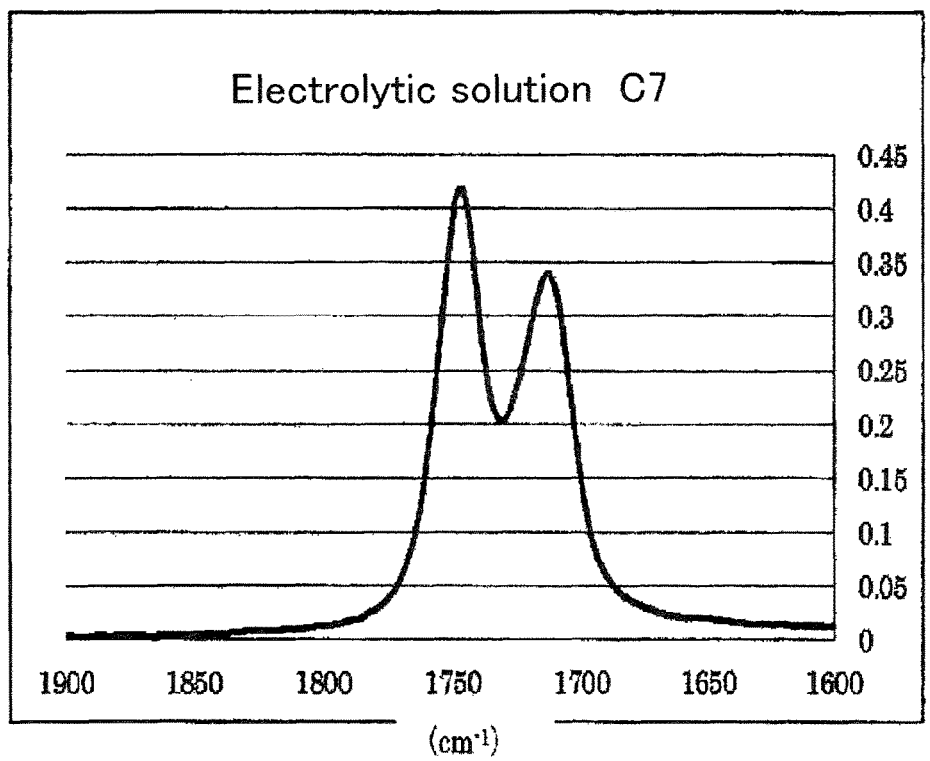
FIG. 21 is an IR spectrum of electrolytic solution C7.

In the IR spectrum of electrolytic solution C7 shown in FIG. 21, a characteristic peak derived from stretching vibration of a double bond between C and O of ethyl methyl carbonate was observed (Io=0.41907) at around 1745 cm$^{-1}$. Additionally in the IR spectrum in FIG. 21, a characteristic peak derived from stretching vibration of a double bond between C and O of ethyl methyl carbonate was observed at a peak intensity of Is=0.33929 at around 1711 cm$^{-1}$ shifted toward the low wave number side from around 1745 cm$^{-1}$. The relationship between peak intensities of Is and Io was Is<Io.

Figure 27:
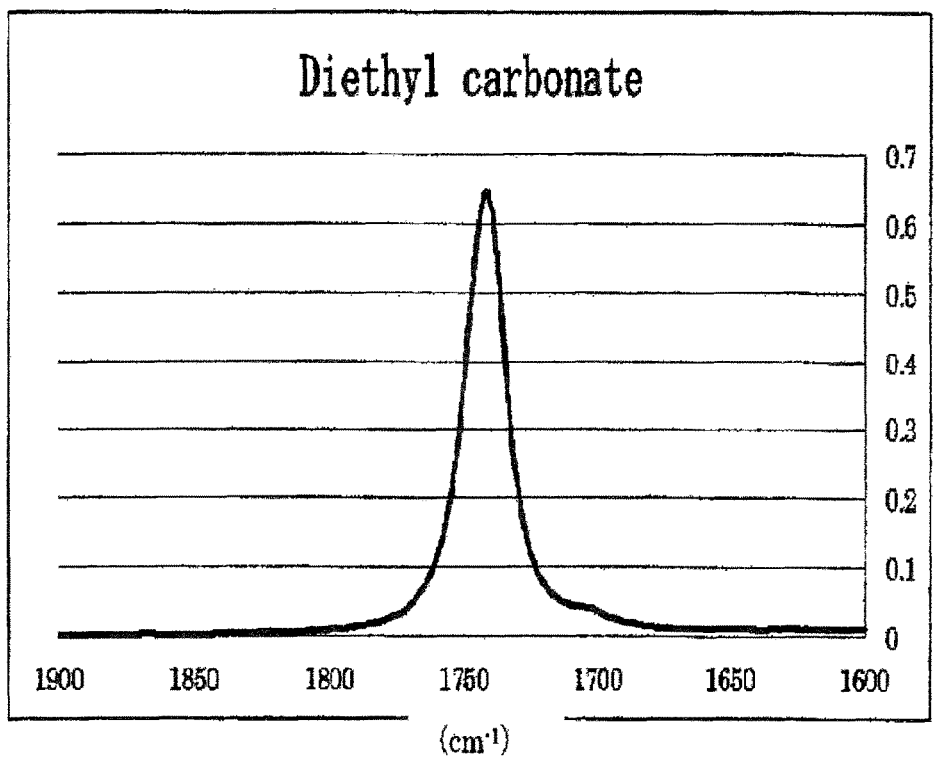
FIG. 27 is an IR spectrum of diethyl carbonate.
Figure 28:
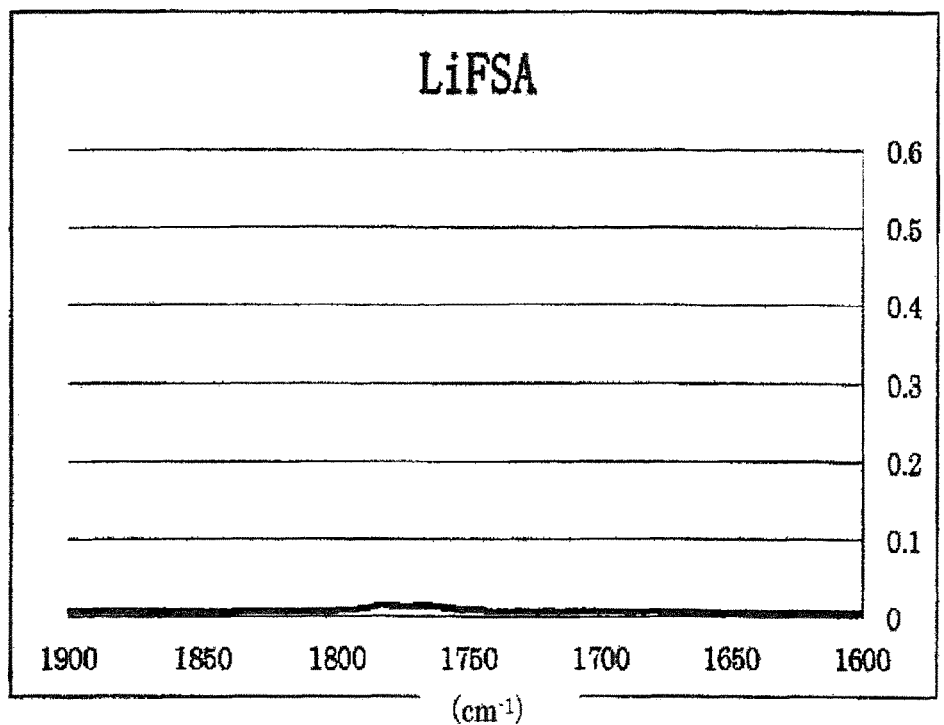
FIG. 28 is an IR spectrum of $(FSO_2)_2NLi$ (1900 to 1600 $cm^{-1}$)

At around 1742 cm$^{-1}$ in the IR spectrum of diethyl carbonate shown in FIG. 27, a characteristic peak derived from stretching vibration of a double bond between C and O of diethyl carbonate was observed.

Figure 23:
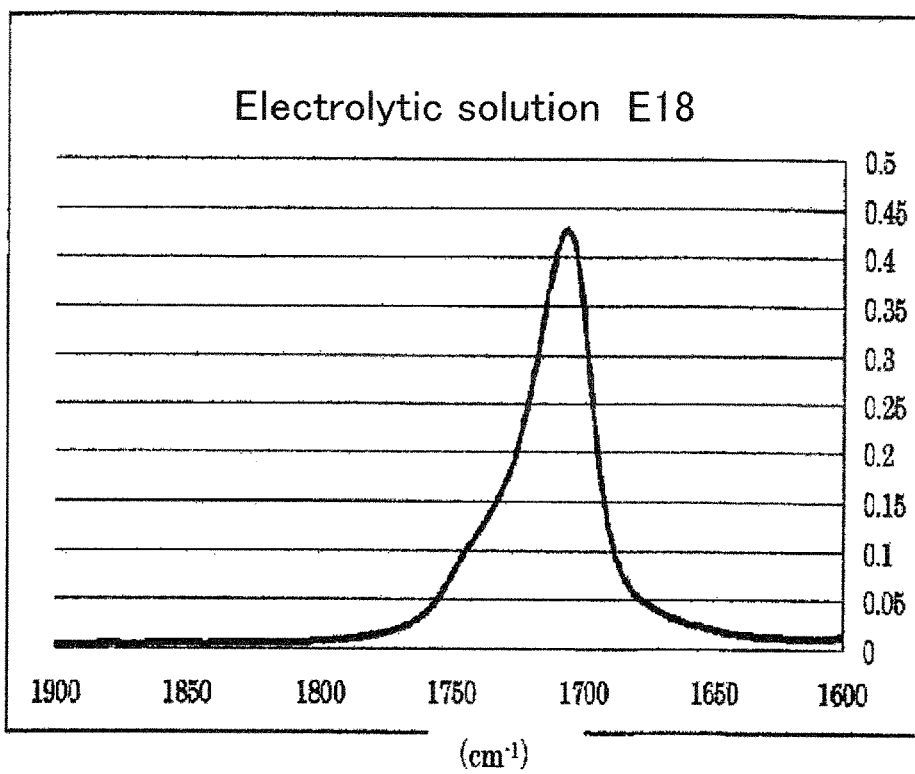
FIG. 23 is an IR spectrum of electrolytic solution E18.

In the IR spectrum of electrolytic solution E18 shown in FIG. 23, a characteristic peak derived from stretching vibration of a double bond between C and O of diethyl carbonate was slightly (Io=0.11202) observed at around 1742 cm$^{-1}$. Additionally in the IR spectrum in FIG. 23, a characteristic peak derived from stretching vibration of a double bond between C and O of diethyl carbonate was observed at a peak intensity of Is=0.42925 at around 1706 cm$^{-1}$ shifted toward the low wave number side from around 1742 cm$^{-1}$. The relationship between peak intensities of Is and Io was Is>Io and Is=3.83×Io.

Figure 24:
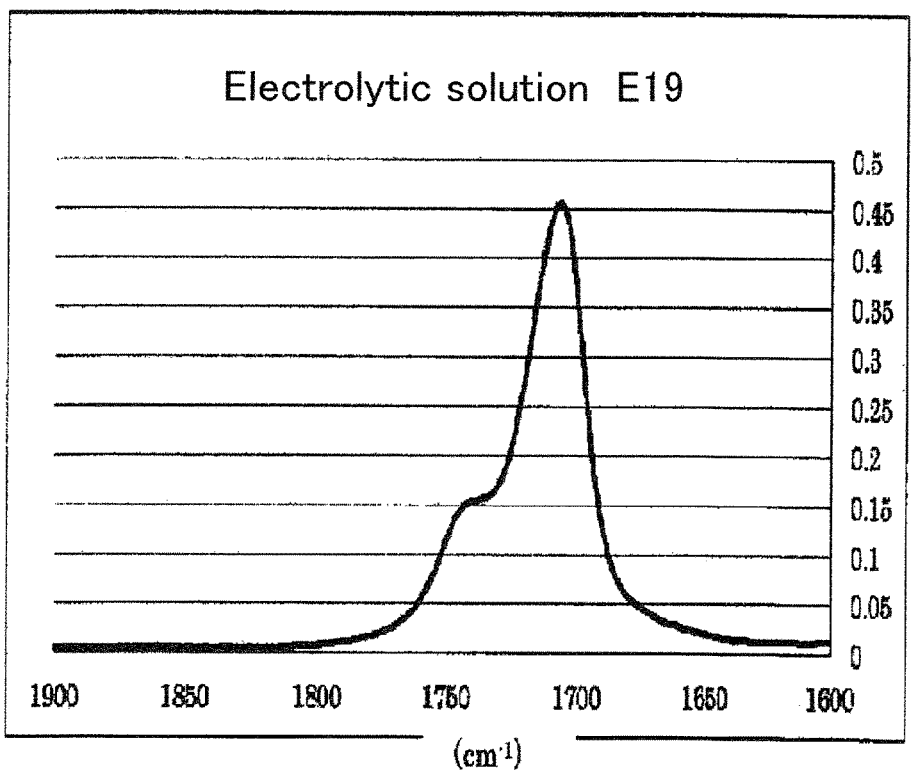
FIG. 24 is an IR spectrum of electrolytic solution E19.

In the IR spectrum of electrolytic solution E19 shown in FIG. 24, a characteristic peak derived from stretching vibration of a double bond between C and O of diethyl carbonate was slightly (Io=0.15231) observed at around 1742 cm$^{-1}$. Additionally in the IR spectrum in FIG. 24, a characteristic peak derived from stretching vibration of a double bond between C and O of diethyl carbonate was observed at a peak intensity of Is=0.45679 at around 1706 cm$^{-1}$ shifted toward the low wave number side from around 1742 cm$^{-1}$. The relationship between peak intensities of Is and Io was Is>Io and Is=3.00×Io.

Figure 25:
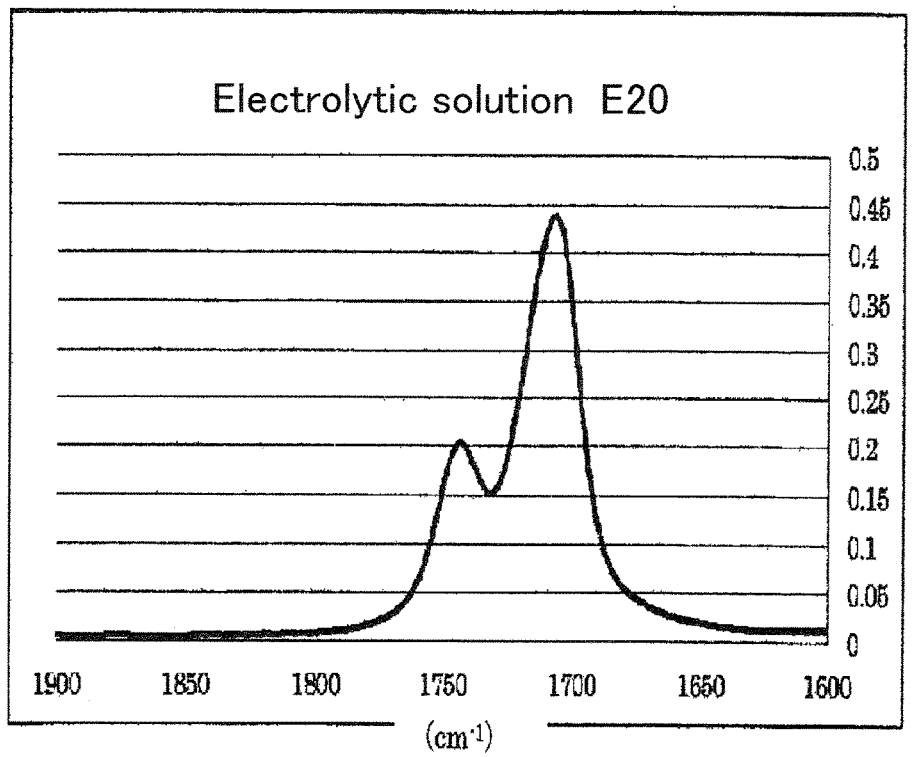
FIG. 25 is an IR spectrum of electrolytic solution E20.

In the IR spectrum of electrolytic solution E20 shown in FIG. 25, a characteristic peak derived from stretching vibration of a double bond between C and O of diethyl carbonate was slightly (Io=0.20337) observed at around 1742 cm$^{-1}$. Additionally in the IR spectrum in FIG. 25, a characteristic peak derived from stretching vibration of a double bond between C and O of diethyl carbonate was observed at a peak intensity of Is=0.43841 at around 1706 cm$^{-1}$ shifted toward the low wave number side from around 1742 cm$^{-1}$. The relationship between peak intensities of Is and Io was Is>Io and Is=2.16×Io.

Figure 26:
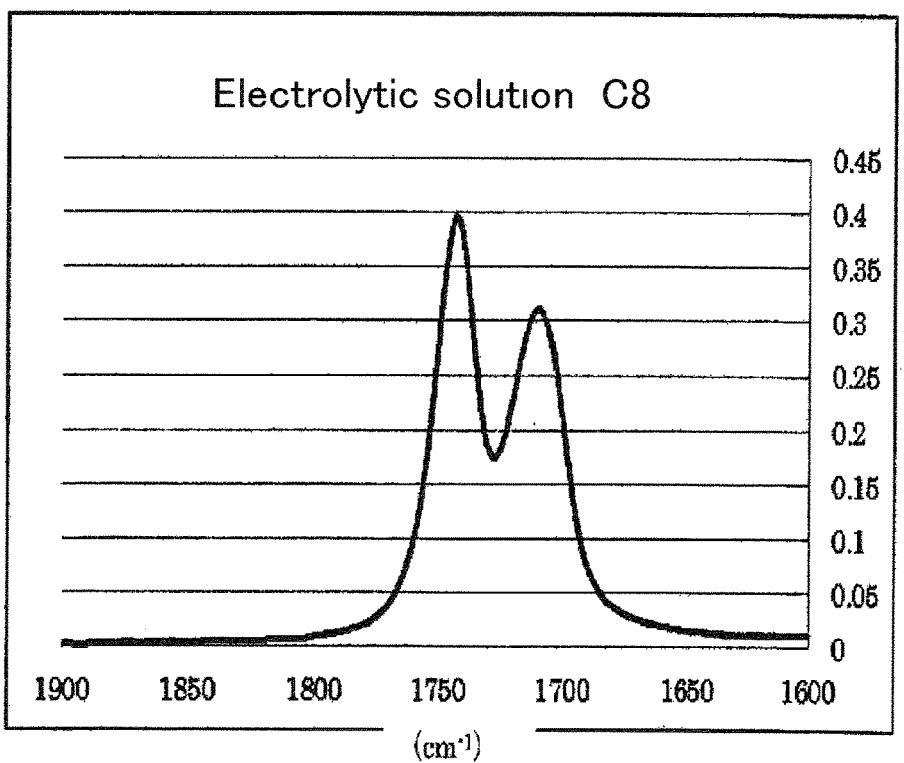
FIG. 26 is an IR spectrum of electrolytic solution C8.

In the IR spectrum of electrolytic solution C8 shown in FIG. 26, a characteristic peak derived from stretching vibration of a double bond between C and O of diethyl carbonate was observed (Io=0.39636) at around 1742 cm$^{-1}$. Additionally in the IR spectrum in FIG. 26, a characteristic peak derived from stretching vibration of a double bond between C and O of diethyl carbonate was observed at a peak intensity of Is=0.31129 at around 1709 cm$^{-1}$ shifted toward the low wave number side from around 1742 cm$^{-1}$. The relationship between peak intensities of Is and Io was Is<Io.

Evaluation Example 2: Ionic Conductivity

Ionic conductivities of electrolytic solutions E1, E2, E4 to E6, E8, E10, E12, E15, E18, and E21 were measured using the following conditions. The results are shown in Table 4.

Ionic Conductivity Measuring Conditions

Under an Ar atmosphere, an electrolytic solution was sealed in a glass cell that has a platinum electrode and whose cell constant is known, and impedance thereof was measured at 30° C., 1 kHz. Ionic conductivity was calculated based on the result of measuring impedance. As a measurement instrument, Solartron 147055BEC (Solartron Analytical) was used.

TABLE 4

| | Lithium salt | Organic solvent | Lithium salt concentration (mol/L) | Ionic conductivity (mS/cm) |
|---|---|---|---|---|
| Electrolytic solution E1 | LiTFSA | DME | 3.2 | 2.4 |
| Electrolytic solution E2 | LiTFSA | DME | 2.8 | 4.4 |
| Electrolytic solution E4 | LiTFSA | AN | 4.2 | 1.0 |
| Electrolytic solution E5 | LiFSA | DME | 3.6 | 7.2 |
| Electrolytic solution E6 | LiFSA | DME | 4.0 | 7.1 |
| Electrolytic solution E8 | LiFSA | AN | 4.5 | 9.7 |
| Electrolytic solution E10 | LiFSA | DMC | 3.9 | 2.3 |
| Electrolytic solution E12 | LiFSA | DMC | 2.9 | 4.6 |
| Electrolytic solution E15 | LiFSA | EMC | 3.4 | 1.8 |
| Electrolytic solution E18 | LiFSA | DEC | 3.0 | 1.4 |
| Electrolytic solution E21 | LiFSA | AN | 5.0 | 7.5 |

Electrolytic solutions E1, E2, E4 to E6, E8, E10, E12, E15, E18, and E21 all displayed ionic conductivity. Thus, the electrolytic solutions of the present invention are understood to be all capable of functioning as electrolytic solutions of various batteries.

Evaluation Example 3: Viscosity

Viscosities of electrolytic solutions E1, E2, E4 to E6, E8, E10, E12, E15, E18, E21, C1 to C4, and C6 to C8 were measured using the following conditions. The results are shown in Table 5.

Viscosity Measuring Conditions

Under an Ar atmosphere, an electrolytic solution was sealed in a test cell, and viscosity thereof was measured under a condition of 30° C. by using a falling ball viscometer (Lovis 2000 M manufactured by Anton Paar GmbH).

TABLE 5

|  | Lithium salt | Organic solvent | Lithium salt concentration (mol/L) | Viscosity (mPa·s) |
|---|---|---|---|---|
| Electrolytic solution E1 | LiTFSA | DME | 3.2 | 36.6 |
| Electrolytic solution E2 | LiTFSA | DME | 2.8 | 31.6 |
| Electrolytic solution E4 | LiTFSA | AN | 4.2 | 138 |
| Electrolytic solution E5 | LiFSA | DME | 3.6 | 25.1 |
| Electrolytic solution E6 | LiFSA | DME | 4.0 | 30.3 |
| Electrolytic solution E8 | LiFSA | AN | 4.5 | 23.8 |
| Electrolytic solution E10 | LiFSA | DMC | 3.9 | 34.2 |
| Electrolytic solution E12 | LiFSA | DMC | 2.9 | 17.6 |
| Electrolytic solution E15 | LiFSA | EMC | 3.4 | 29.7 |
| Electrolytic solution E18 | LiFSA | DEC | 3.0 | 23.2 |
| Electrolytic solution E21 | LiFSA | AN | 5.0 | 31.5 |
| Electrolytic solution C1 | LiTFSA | DME | 1.0 | 1.3 |
| Electrolytic solution C2 | LiTFSA | AN | 1.0 | 0.75 |
| Electrolytic solution C3 | LiFSA | DME | 1.0 | 1.2 |
| Electrolytic solution C4 | LiFSA | AN | 1.0 | 0.74 |
| Electrolytic solution C6 | LiFSA | DMC | 1.1 | 1.38 |
| Electrolytic solution C7 | LiFSA | EMC | 1.1 | 1.67 |
| Electrolytic solution C8 | LiFSA | DEC | 1.1 | 2.05 |

When compared to the viscosities of electrolytic solutions C1 to C4 and C6 to C8, the viscosities of electrolytic solutions E1, E2, E4 to E6, E8, E10, E12, E15, E18, and E21 were significantly higher. Thus, with a battery using the electrolytic solution of the present invention, even if the battery is damaged, leakage of the electrolytic solution is suppressed.

Evaluation Example 4: Volatility

Volatilities of electrolytic solutions E2, E4, E8, E10, E12, C1, C2, C4, and C6 were measured using the following method.

Approximately 10 mg of an electrolytic solution was placed in a pan made from aluminum, and the pan was disposed in a thermogravimetry measuring device (SDT600 manufactured by TA Instruments) to measure weight change of the electrolytic solution at room temperature. Volatilization rate was calculated through differentiation of weight change (mass %) by time. Among the obtained volatilization rates, largest values were selected and are shown in Table 6.

TABLE 6

|  | Lithium salt | Organic solvent | Lithium salt concentration (mol/L) | Maximum volatilization rate (mass %/min.) |
|---|---|---|---|---|
| Electrolytic solution E2 | LiTFSA | DME | 2.8 | 0.4 |
| Electrolytic solution E4 | LiTFSA | AN | 4.2 | 2.1 |
| Electrolytic solution E8 | LiFSA | AN | 4.5 | 0.6 |
| Electrolytic solution E10 | LiFSA | DMC | 3.9 | 0.1 |
| Electrolytic solution E12 | LiFSA | DMC | 2.9 | 1.3 |
| Electrolytic solution C1 | LiTFSA | DME | 1.0 | 9.6 |
| Electrolytic solution C2 | LiTFSA | AN | 1.0 | 13.8 |
| Electrolytic solution C4 | LiFSA | AN | 1.0 | 16.3 |
| Electrolytic solution C6 | LiFSA | DMC | 1.0 | 6.1 |

Maximum volatilization rates of electrolytic solutions E2, E4, E8, E10, and E12 were significantly smaller than maximum volatilization rates of electrolytic solutions C1, C2, C4, and C6. Thus, even if a battery using the electrolytic solution of the present invention is damaged, rapid volatilization of the organic solvent outside the battery is suppressed since the volatilization rate of the electrolytic solution is small.

Evaluation Example 5: Combustibility

Combustibility of electrolytic solutions E4 and C2 was tested using the following method.

Three drops of an electrolytic solution were dropped on a glass filter by using a pipette to have the electrolytic solution retained by the glass filter. The glass filter was held by a pair of tweezers, and the glass filter was brought in contact with a flame.

Electrolytic solution E4 did not ignite even when being brought in contact with a flame for 15 seconds. On the other hand, electrolytic solution C2 burned out in a little over 5 seconds.

Thus, the electrolytic solution of the present invention was confirmed to be unlikely to combust.

Evaluation Example 6: Rate Characteristics

Reference Example 1

A half-cell using electrolytic solution E8 was produced in the following manner.

90 parts by mass of graphite which is an active material and whose mean particle diameter is 10 μm was mixed with 10 parts by mass of polyvinyl idene fluoride which is a binding agent. The mixture was dispersed in a proper amount of N-methyl-2-pyrrolidone to create a slurry. As the current collector, a copper foil having a thickness of 20 μm was prepared. The slurry was applied in a film form on the surface of the copper foil by using a doctor blade. The copper foil on which the slurry was applied was dried to remove N-methyl-2-pyrrolidone, and then the copper foil was pressed to obtain a joined object. The obtained joined object was heated and dried in a vacuum dryer for 6 hours at 120° C. to obtain a copper foil having an active material layer formed thereon. This was used as a working electrode. Metal Li was used as a counter electrode.

The working electrode, the counter electrode, a separator (Whatman glass fiber filter paper manufactured by GE Healthcare Japan Corp.) interposed therebetween and having a thickness of 400 µm, and electrolytic solution E8 were housed in a battery case (CR2032 type coin cell case manufactured by Hohsen Corp.) to form a half-cell. This was used as a half-cell of Reference Example 1.

Reference Example 2

A half-cell of Reference Example 2 was produced using a method similar to that in Reference Example 1 except for using electrolytic solution C5 as the electrolytic solution.

Rate characteristics of half-cells of Reference Examples 1 and 2 were tested using the following method.

With respect to the half-cells, at 0.1C, 0.2C, 0.5C, 1C, and 2C rates (1C refers to a current value required for fully charging or discharging a battery in 1 hour under a constant current), charging and then discharging were performed, and the capacity (discharge capacity) of the working electrode was measured at each rate. In the description here, the counter electrode was regarded as the negative electrode and the working electrode was regarded as the positive electrode. With respect to the capacity of the working electrode at 0.1C rate, ratios of capacities (rate characteristics) at other rates were calculated. The results are shown in Table 7.

TABLE 7

| | Reference Example 1 | Reference Example 2 |
| --- | --- | --- |
| 0.1 C Capacity (mAh/g) | 334 | 330 |
| 0.2 C Capacity/0.1 C Capacity | 0.983 | 0.966 |
| 0.5 C Capacity/0.1 C capacity | 0.946 | 0.767 |
| 1 C Capacity/0.1 C Capacity | 0.868 | 0.498 |
| 2 C Capacity/0.1 C Capacity | 0.471 | 0.177 |

When compared to the half-cell of Reference Example 2, the half-cell of Reference Example 1 showed suppression of the reduction in capacity and excellent rate characteristics at all the rates of 0.2C, 0.5C, 1C, and 2C. Thus, the secondary battery using the electrolytic solution of the present invention was confirmed to show excellent rate characteristics.

Figure 29:
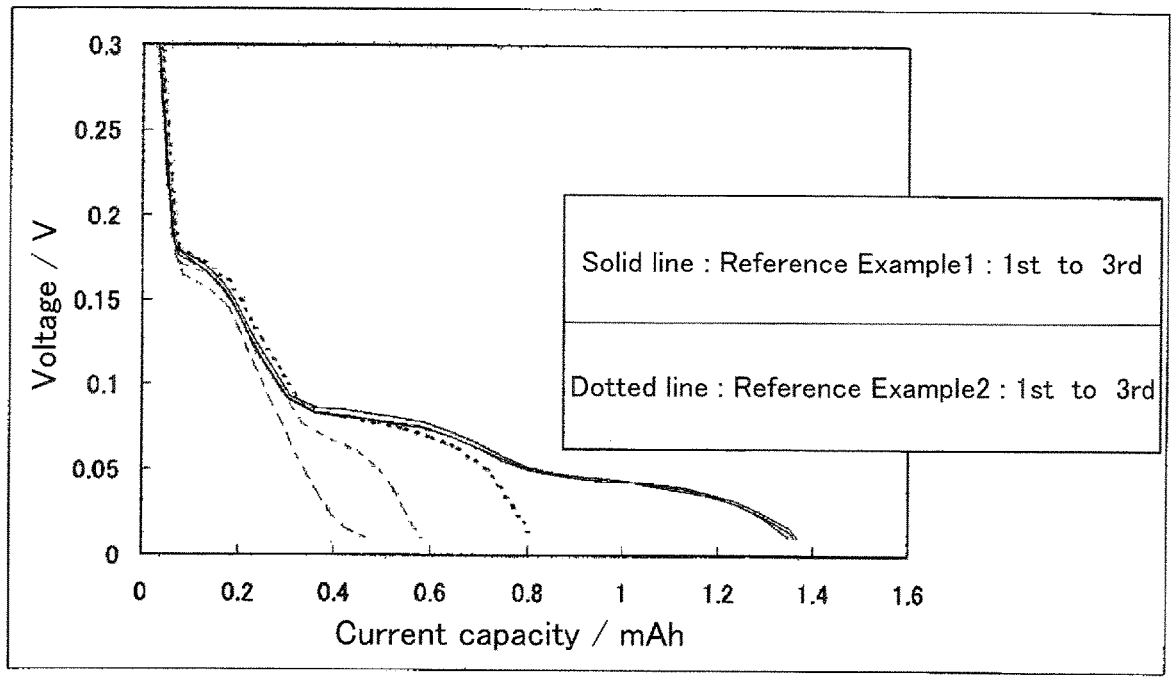
FIG. 29 shows a result of responsivity against repeated rapid charging and discharging in Evaluation Example 7.

Evaluation Example 7: Responsivity with Respect to Repeated Rapid Charging and Discharging The changes in capacity and voltage were observed when charging/discharging was repeated three times at 1C rate using the half-cells of Reference Examples 1 and 2. The results are shown in FIG. 29.

Associated with repeated charging and discharging, the half-cell of Reference Example 2 tended to show greater polarization when current was passed therethrough at 1C rate, and capacity obtained from 2 V to 0.01 V rapidly decreased. On the other hand, the half-cell of Reference Example 1 hardly displayed increase or decrease of polarization, as confirmed from the manner three curves overlap in FIG. 29 even when charging and discharging were repeated, and had maintained its capacity suitably. A conceivable reason why polarization had increased in the half-cell of Reference Example 2 is the inability of the electrolytic solution to supply sufficient amount of Li to a reaction interface with an electrode because of Li concentration unevenness generated in the electrolytic solution when charging and discharging were repeated rapidly, i.e., uneven distribution of Li concentration in the electrolytic solution. In the half-cell of Reference Example 1, using the electrolytic solution of the present invention having a high Li concentration is thought to have enabled suppress ion of uneven distribution of Li concentration of the electrolytic solution. Thus, the secondary battery using the electrolytic solution of the present invention was confirmed to show excellent responsivity with respect to rapid charging and discharging.

Evaluation Example 8: Li Transference Number

Li transference numbers of electrolytic solutions E2, E8, C4, and C5 were measured using the following conditions. The results are shown in Table 8A.

<Li Transference Number Measuring Conditions>

An NMR tube including electrolytic solution E2, E8, C4, or C5 was placed in an PFG-NMR device (ECA-500, JEOL Ltd.), and diffusion coefficient of Li ions and anions in each of the electrolytic solutions was measured on $^7$Li and $^{19}$F as targets at a room temperature of 30° C. while altering a magnetic field pulse width and using spin echo method. The Li transference number was calculated from the following formula.

Li transference number=(Li ionic diffusion coefficient)/(Li ionic diffusion coefficient+anion diffusion coefficient)

TABLE 8A

| | Lithium salt | Organic solvent | Lithium salt concentration (mol/L) | Li transference number |
| --- | --- | --- | --- | --- |
| Electrolytic solution E2 | LiTFSA | DME | 2.8 | 0.52 |
| Electrolytic solution E8 | LiFSA | AN | 4.5 | 0.50 |
| Electrolytic solution C4 | LiFSA | AN | 1.0 | 0.42 |
| Electrolytic solution C5 | LiPF$_6$ | EC/DEC | 1.0 | 0.40 |

When compared to the Li transference numbers of electrolytic solutions C4 and C5, the Li transference numbers of electrolytic solutions E2 and E8 were significantly higher. Here, Li ionic conductivity of an electrolytic solution is calculated by multiplying ionic conductivity (total ion conductivity) of the electrolytic solution by the Li transference number. As a result, when compared to a conventional electrolytic solution having the same level of ionic conductivity, the electrolytic solution of the present invention shows a high transportation rate of lithium ion (cation).

In addition, the Li transference number was measured by altering the measuring temperature for electrolytic solution E8. 30° C., 10° C., −10° C., and −30° C. were used as the measuring temperature. The results are shown in Table 8B.

TABLE 8B

| Measuring temperature (° C.) | Li transference number |
| --- | --- |
| 30 | 0.50 |
| 10 | 0.50 |
| −10 | 0.50 |
| −30 | 0.52 |

Based on the results in Table 8B, the electrolytic solution of the present invention is understood as to maintain a suitable Li transference number regardless of the temperature. The electrolytic solution of the present invention is regarded as to maintain a liquid state even at a low temperature.

Example 1

A lithium ion secondary battery of Example 1 using electrolytic solution E8 was produced in the following manner.

94 parts by mass of a lithium containing metal oxide that has a layered rock salt structure and is represented by $LiNi_{5/10}Co_{2/10}Mn_{3/10}O_2$, which is a positive electrode active material, 3 parts by mass of acetylene black, which is a conductive additive, and 3 parts by mass of polyvinylidene fluoride, which is a binding agent, were mixed. The mixture was dispersed in a proper amount of N-methyl-2-pyrrolidone to create a slurry. As the positive electrode current collector, an aluminum foil (JIS A1000 series) having a thickness of 20 µm was prepared. The slurry was applied in a film form on the surface of the aluminum foil by using a doctor blade. The aluminum foil on which the slurry was applied was dried for 20 minutes at 80° C. to remove N-methyl-2-pyrrolidone through volatilization. Then, the aluminum foil was pressed to obtain a joined object. The obtained joined object was heated and dried in a vacuum dryer for 6 hours at 120° C. to obtain an aluminum foil having the positive electrode active material layer formed thereon. This was used as the positive electrode. The weight per area of the positive electrode at this moment was 11 mg/cm$^2$.

98 parts by mass of natural graphite, which is a negative electrode active material, and 1 part by mass of a styrene butadiene rubber and 1 part by mass of carboxymethyl cellulose, which are binding agents, were mixed. The mixture was dispersed in a proper amount of ion exchanged water to create a slurry. As the negative electrode current collector, a copper foil having a thickness of 20 µm was prepared. The slurry was applied in a film form on the surface of the copper foil by using a doctor blade. The copper foil on which the slurry was applied was dried to remove water, and then the copper foil was pressed to obtain a joined object. The obtained joined object was heated and dried in a vacuum dryer for 6 hours at 100° C. to obtain a copper foil having the negative electrode active material layer formed thereon. This was used as the negative electrode. The weight per area of the negative electrode at this moment was 8 mg/cm$^2$.

As the separator, a cellulose filter paper (Toyo Roshi Kaisha, Ltd., thickness of 260 µm) was prepared.

An electrode assembly was formed by sandwiching the separator between the positive electrode and the negative electrode. The electrode assembly was covered with a set of two sheets of a laminate film. The laminate film was formed into a bag-like shape by having three sides thereof sealed, and electrolytic solution E8 was poured in the laminate film. Four sides were sealed airtight by sealing the remaining one side to obtain a lithium ion secondary battery in which the electrode assembly and the electrolytic solution were sealed. This battery was used as the lithium ion secondary battery of Example 1.

Example 2

A lithium ion secondary battery of Example 2 was produced in a manner similar to the lithium ion secondary battery of Example 1, except for using electrolytic solution E4 instead of electrolytic solution E8.

Comparative Example 1

A lithium ion secondary battery of Comparative Example 1 was produced in a manner similar to Example 1, except for using electrolytic solution C5 instead of electrolytic solution E8.

Evaluation Example 9: Thermal Stability

Thermal stability of an electrolytic solution against a charged-state positive electrode of the lithium ion secondary batteries of Example 1 and Comparative Example 1 was evaluated using the following method.

Figure 30:
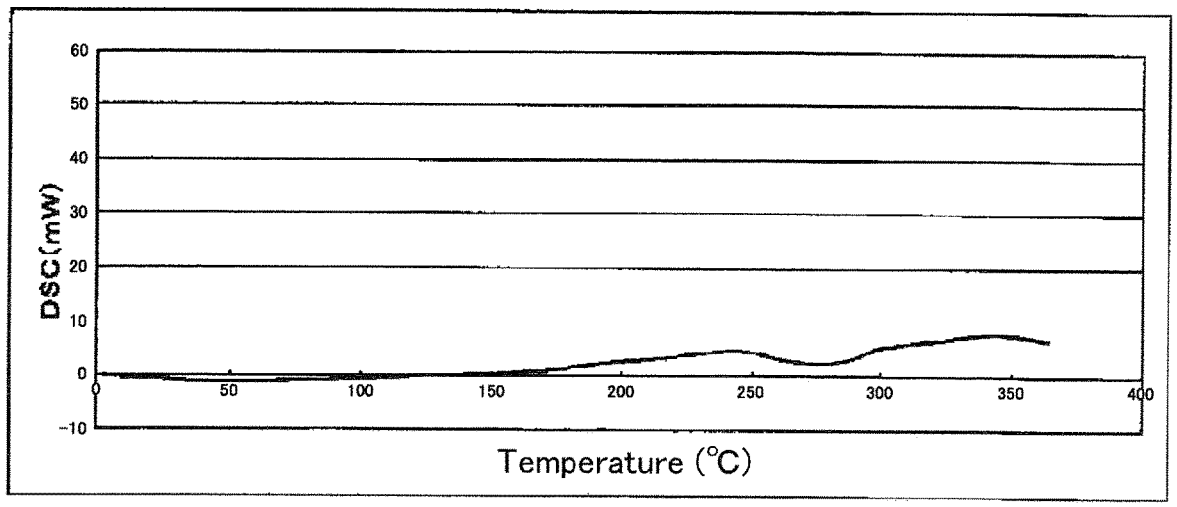
FIG. 30 is a DSC chart of a lithium ion secondary battery of Example 1 in Evaluation Example 9.

A lithium ion secondary battery was fully charged under constant current and constant voltage conditions with a charge cutoff voltage of 4.2 V. The lithium ion secondary battery was disassembled after being fully charged, and the positive electrode thereof was removed. 3 mg of the positive electrode and 1.8 µL of an electrolytic solution were placed in a stainless steel pan, and the pan was sealed. Differential scanning calorimetry analysis was performed using the sealed pan under a nitrogen atmosphere at a temperature increase rate of 20° C./min., and a DSC curve was observed. As a differential scanning calorimeter, Rigaku DSC8230 was used. FIG. 30 shows a DSC chart obtained when the electrolytic solution and the charged-state positive electrode of the lithium ion secondary battery of Example 1 were placed together, and FIG. 31 shows a DSC chart obtained when the electrolytic solution and the charged-state positive electrode of the lithium ion secondary battery of Comparative Example 1 were placed together.

Figure 31:
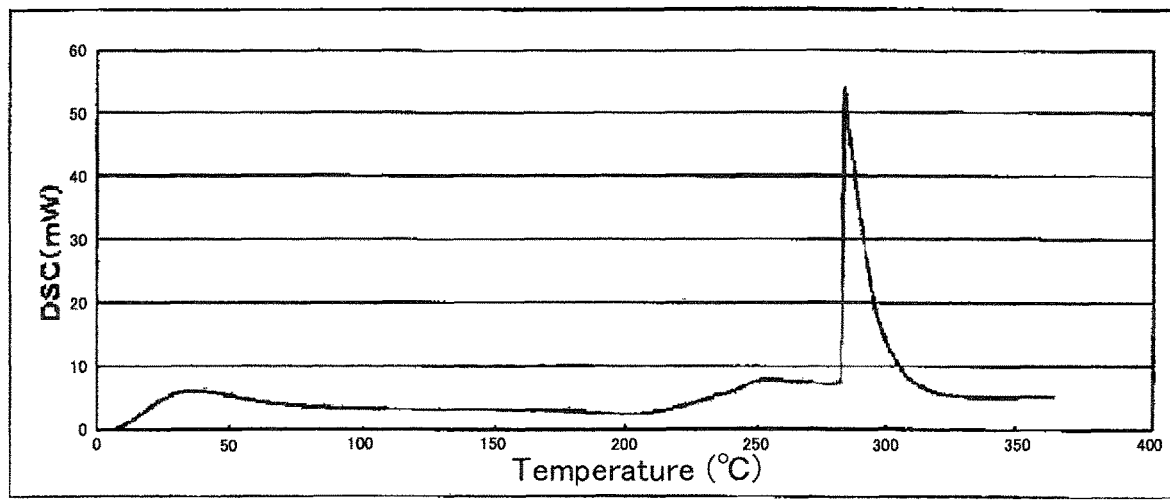
FIG. 31 is a DSC chart of a lithium ion secondary battery of Comparative Example 1 in Evaluation Example 9.

As obvious from the results of FIGS. 30 and 31, although endothermic/exothermic peaks were hardly observed in the DSC curve obtained when the electrolytic solution and the charged-state positive electrode of the lithium ion secondary battery of Example 1 were placed together, an exothermic peak was observed at around 300° C. in the DSC curve obtained when the electrolytic solution and the charged-state positive electrode of the lithium ion secondary battery of Comparative Example 1 were placed together. The exothermic peak is estimated to be generated as a result of a reaction between the positive electrode active material and the electrolytic solution.

Based on these results, when compared to a lithium ion secondary battery using a conventional electrolytic solution, the lithium ion secondary battery using the electrolytic solution of the present invention is understood as having excellent thermal stability since reactivity between the positive electrode active material and the electrolytic solution is low.

Evaluation Example 10: Confirmation of Elution of Al

Example 12

A half-cell using electrolytic solution E8 was produced in the following manner.

An aluminum foil (JIS A1000 series) having a thickness of 20 µm was used as the working electrode, and metal Li was used as the counter electrode. As the separator, Whatman glass fiber filter paper that is manufactured by GE Healthcare Japan Corp., that has a thickness of 400 µm, and whose stock number is 1825-055 was used.

The working electrode, the counter electrode, the separator, and electrolytic solution E8 were housed in a battery case (CR2032 type coin cell case manufactured by Hohsen Corp.) to form a half-cell. This was used as a half-cell of Example 12.

Comparative Example 7

A half-cell of Comparative Example 7 was produced similarly to those of Example 12, except for using a SUS foil having a thickness of 20 μm as the working electrode.

Figure 32:
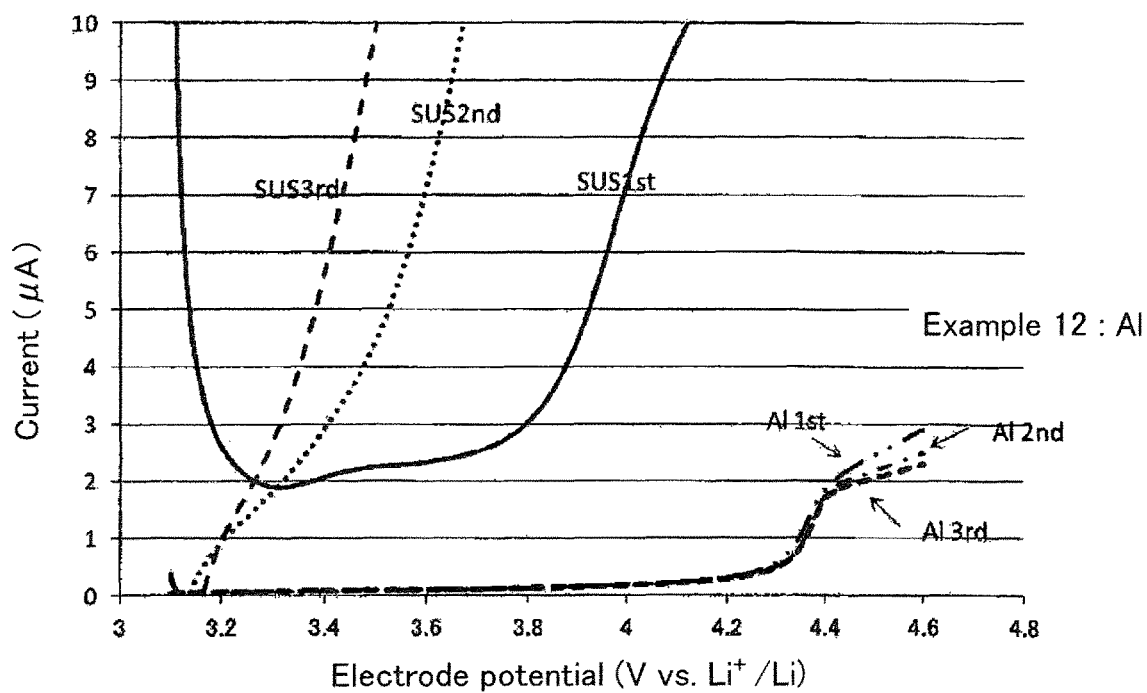
FIG. 32 is a graph showing the relationship between electrode potential and current in half-cells of Example 12 and Comparative Example 7.

The changes in current and electrode potential were observed when linear sweep voltammetry (abbreviated name: LSV) measurement was performed on the half-cells of Example 12 and Comparative Example 7 repeatedly for ten times in a range of 3.1 V to 4.6 V (vs. Li reference) at a rate of 1 mV/s. FIG. 32 is a graph showing the relationship between current and electrode potential after the first, second, and third charging and discharging of the half-cells of Example 12 and Comparative Example 7.

In FIG. 32, a large current was confirmed at around 4.0 V in Comparative Example 7 in which the working electrode was SUS. On the other hand, in Example 12 in which the working electrode was Al, current was hardly confirmed at 4.0 V, and, although the current slightly increased at 4.3 V for a moment, a large increase was not observed thereafter up to 4.6 V.

In addition, in Comparative Example 7 in which the working electrode was SUS, the amount of current increased as the number of repeats increased, whereas, in Example 12 in which the working electrode was Al, the amount of current reduced and became steady through repeating.

Based on the results described above, the secondary battery using the electrolytic solution of the present invention is thought not to experience elution of Al even at a high potential. Although the reason why elution of Al does not occur is unclear, solubility of Al with respect to the electrolytic solution of the present invention is speculated to be low when compared to a conventional electrolytic solution since the electrolytic solution of the present invention is different from the conventional electrolytic solution regarding the types and existing environment of the metal salt and the organic solvent, and the concentration of the metal salt.

In addition, the secondary battery using the electrolytic solution of the present invention was revealed to show increased current at a high potential when SUS is used as the current collector for positive electrode. Thus, using Al and not SUS for the current collector was revealed to be preferable in the secondary battery using the electrolytic solution of the present invention.

Evaluation Example 11: Second Confirmation of Elution of Al

The lithium ion secondary batteries of Examples 1 and 2 and Comparative Example 1 were subjected to 100 repeats of charging and discharging at a rate of 1C in a usage voltage range of 3 V to 4.2 V, and were disassembled after 100 times of charging and discharging to have the negative electrodes removed therefrom. The amount of Al eluted from the positive electrode to the electrolytic solution and deposited on the surface of the negative electrode was measured using an ICP (high frequency inductively coupled plasma) emission spectrophotometer. The results of the measurement are shown in Table 9. Al amount (%) in Table 9 shows the mass of Al per 1 g of the negative electrode active material layer in %. Al amount (1 g/sheet) represents the mass (μg) of Al per single sheet of the negative electrode active material layer, and was calculated from a calculation formula of: Al amount (%)/100×mass of a single sheet of each negative electrode active material layer=Al amount (μg/sheet).

TABLE 9

|  | Al amount (%) | Al amount (μg/sheet) |
|---|---|---|
| Example 1 | 0.00480 | 11.183 |
| Example 2 | 0.00585 | 13.634 |
| Comparative Example 1 | 0.03276 | 76.331 |

The amount of Al deposited on the negative electrode surface was significantly less in the lithium ion secondary batteries of Examples 1 and 2 than in the lithium ion secondary battery of Comparative Example 1. From this, elution of Al from the current collector of the positive electrode was revealed to be suppressed more in the lithium ion secondary batteries of Examples 1 and 2 using the electrolytic solution of the present invention than in the lithium ion secondary battery of Comparative Example 1 using a conventional electrolytic solution.

Evaluation Example 12: Surface Analysis of Al Current Collector

The lithium ion secondary batteries of Examples 1 and 2 were subjected to 100 repeats of charging and discharging at a rate of 1C in a usage voltage range of 3 V to 4.2 V, and were disassembled after 100 times of charging and discharging. The aluminum foils which are the positive electrode current collectors were each removed and the surfaces of the aluminum foils were rinsed using dimethyl carbonate.

After the rinsing, surface analysis using X-ray photoelectron spectroscopy (XPS) was performed on the surfaces of the aluminum foils of the lithium ion secondary batteries of Examples 1 and 2 while etching was performed thereon through Ar sputtering. The results of surface analysis of the aluminum foils after charging and discharging the lithium ion secondary batteries of Examples 1 and 2 are shown in FIGS. 33 and 34.

Figure 33:
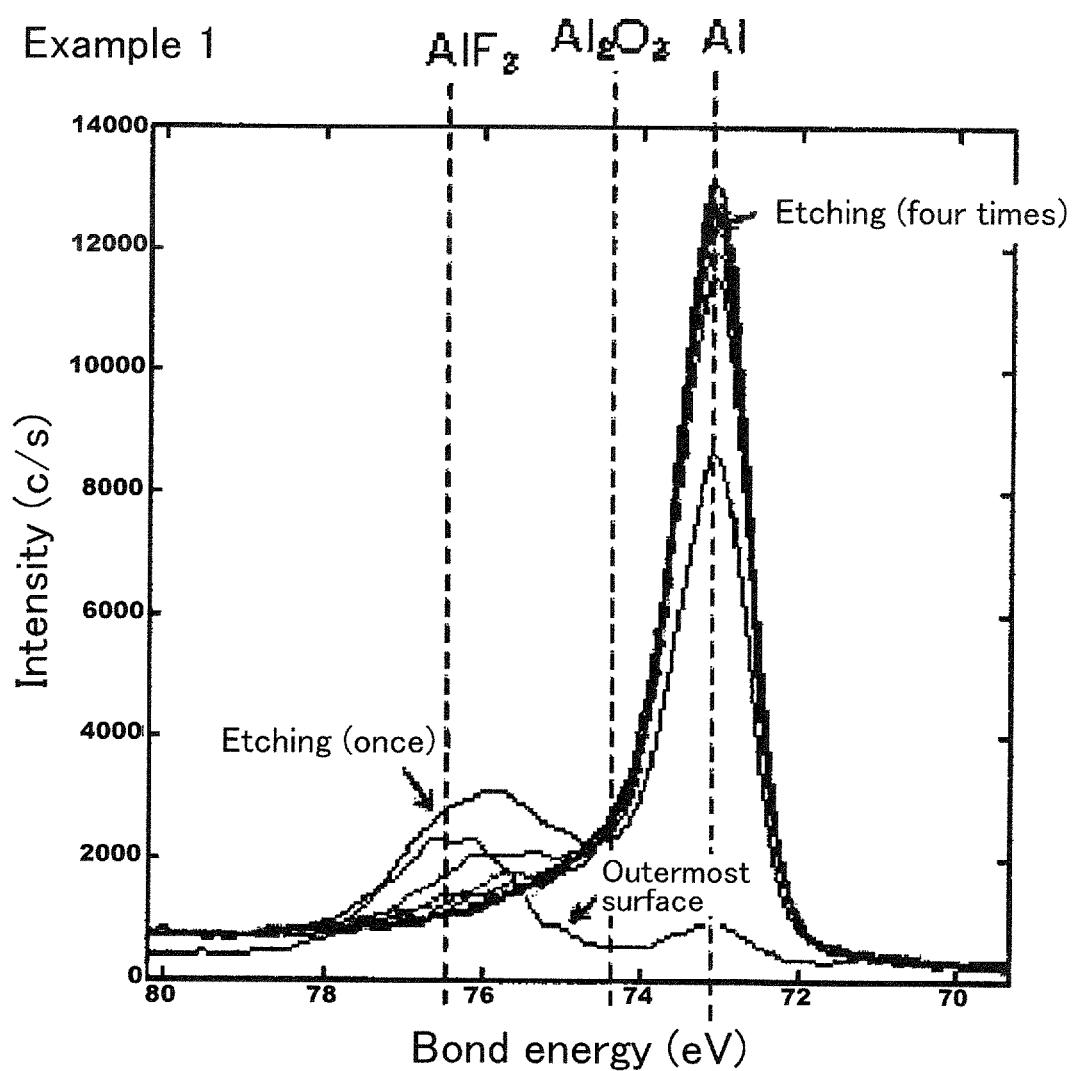
FIG. 33 is a graph showing a result of XPS surface analysis of an aluminum current collector of the lithium ion secondary battery of Example 1.
Figure 34:
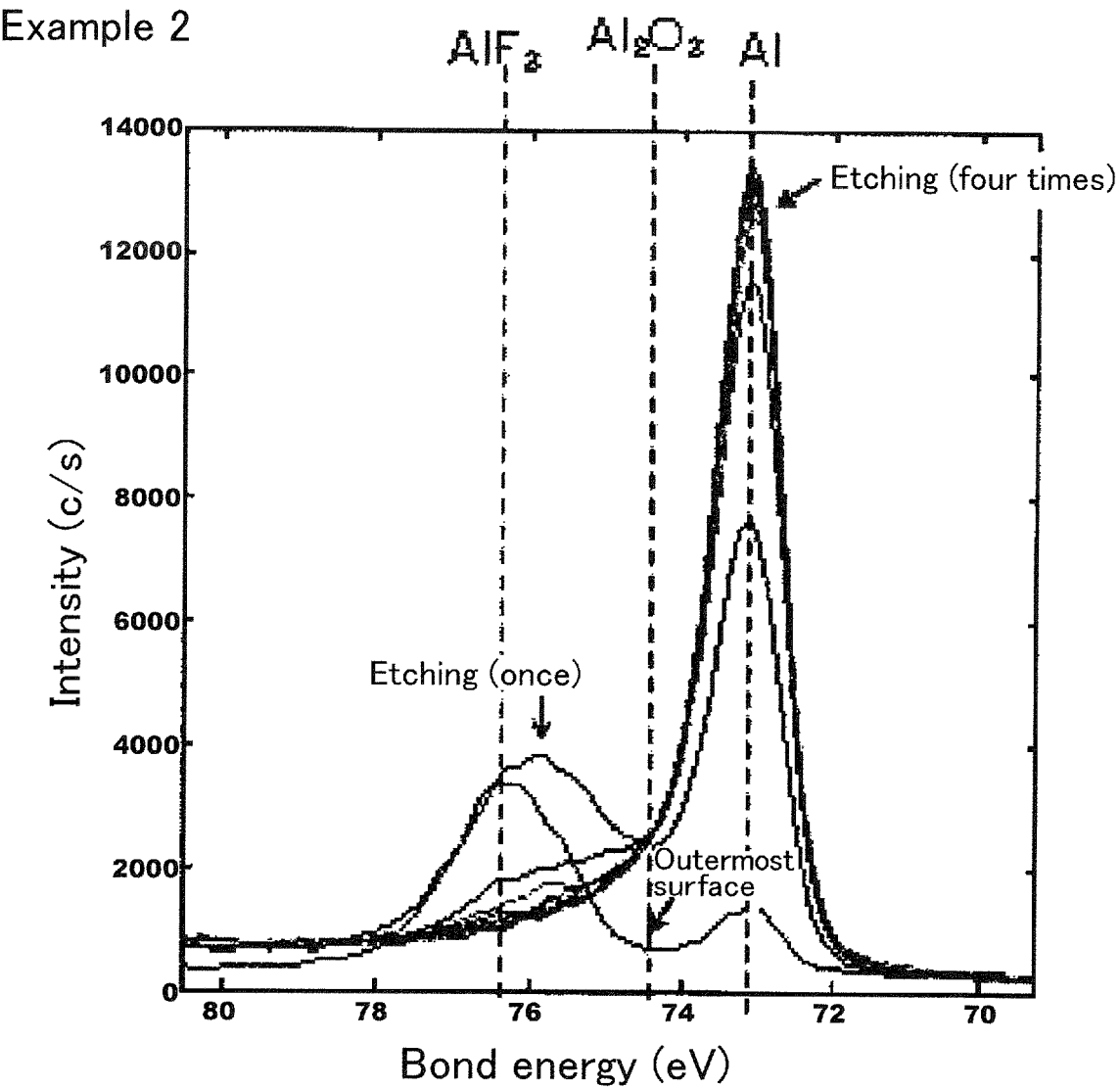
FIG. 34 is a graph showing a result of XPS surface analysis of an aluminum current collector of a lithium ion secondary battery of Example 2.
Figure 35:
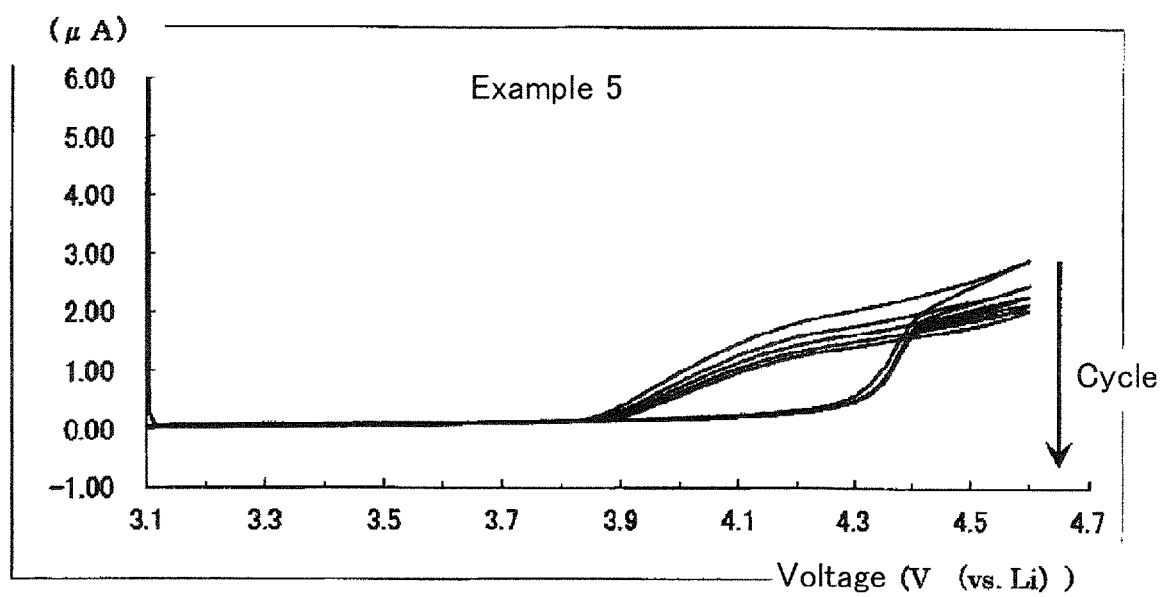
FIG. 35 is a graph showing the relationship between potential (3.1 to 4.6 V) and response current in a half-cell of Example 5.
Figure 36:
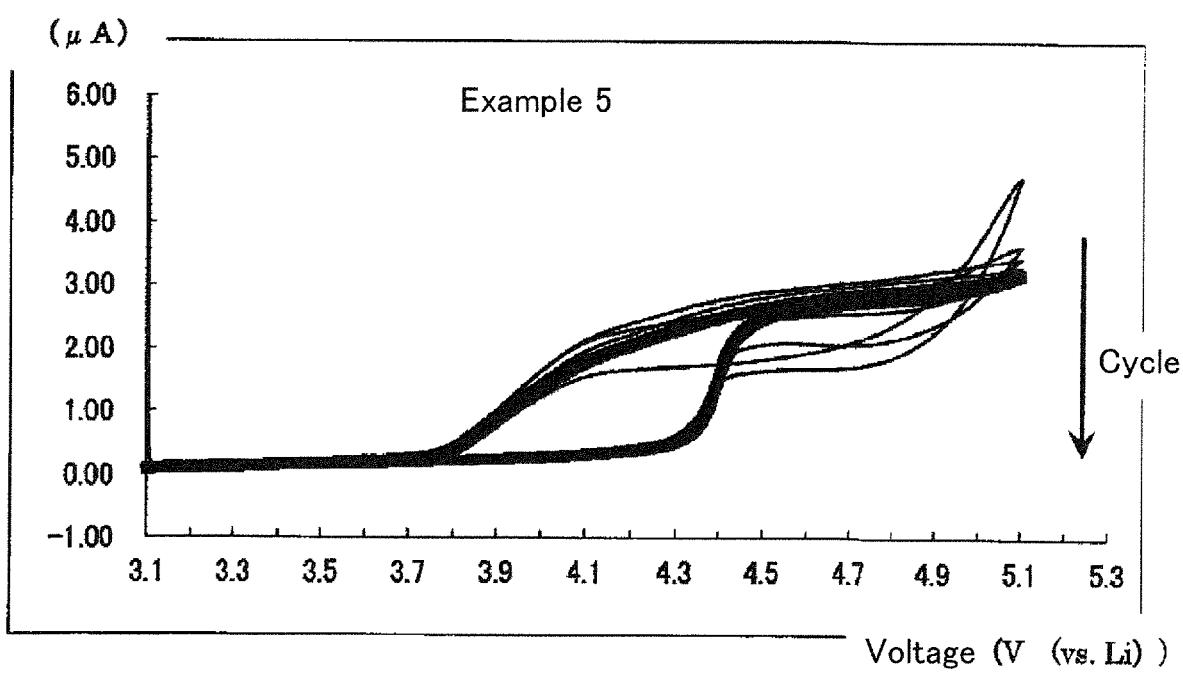
FIG. 36 is a graph showing the relationship between potential (3.1 to 5.1 V) and response current in the half-cell of Example 5.
Figure 37:
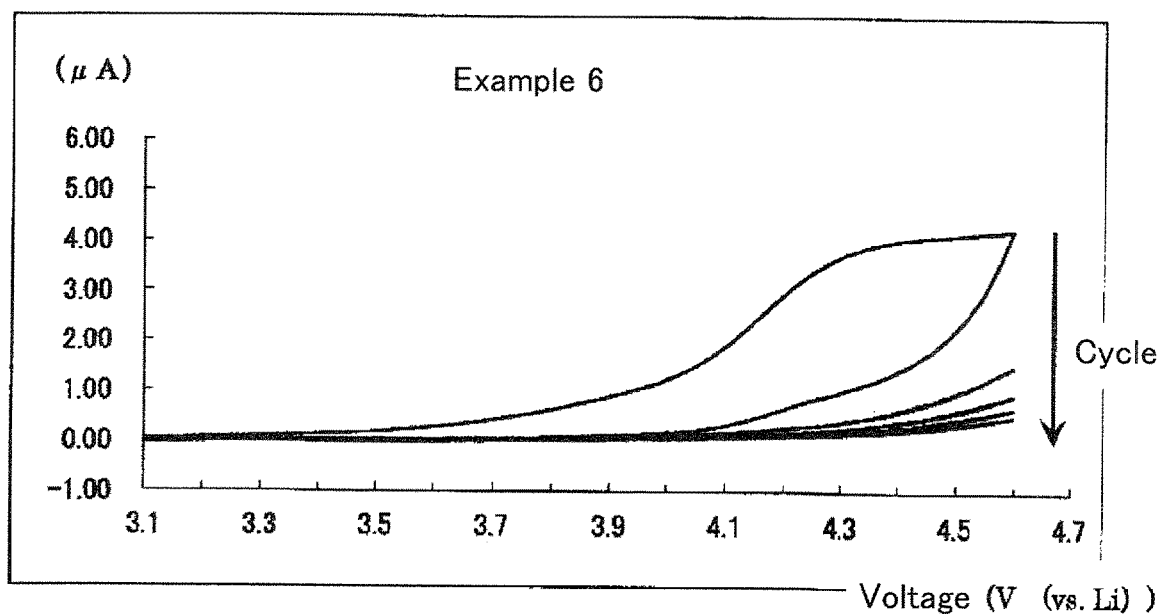
FIG. 37 is a graph showing the relationship between potential (3.1 to 4.6 V) and response current in a half-cell of Example 6.
Figure 38:
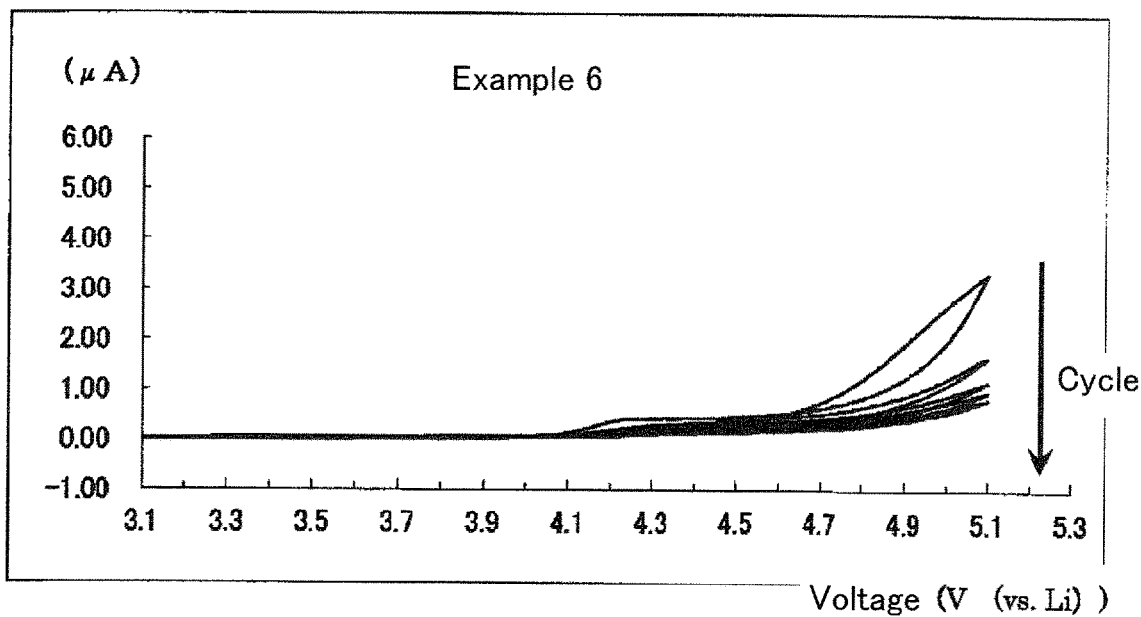
FIG. 38 is a graph showing the relationship between potential (3.1 to 5.1 V) and response current in the half-cell of Example 6.
Figure 39:
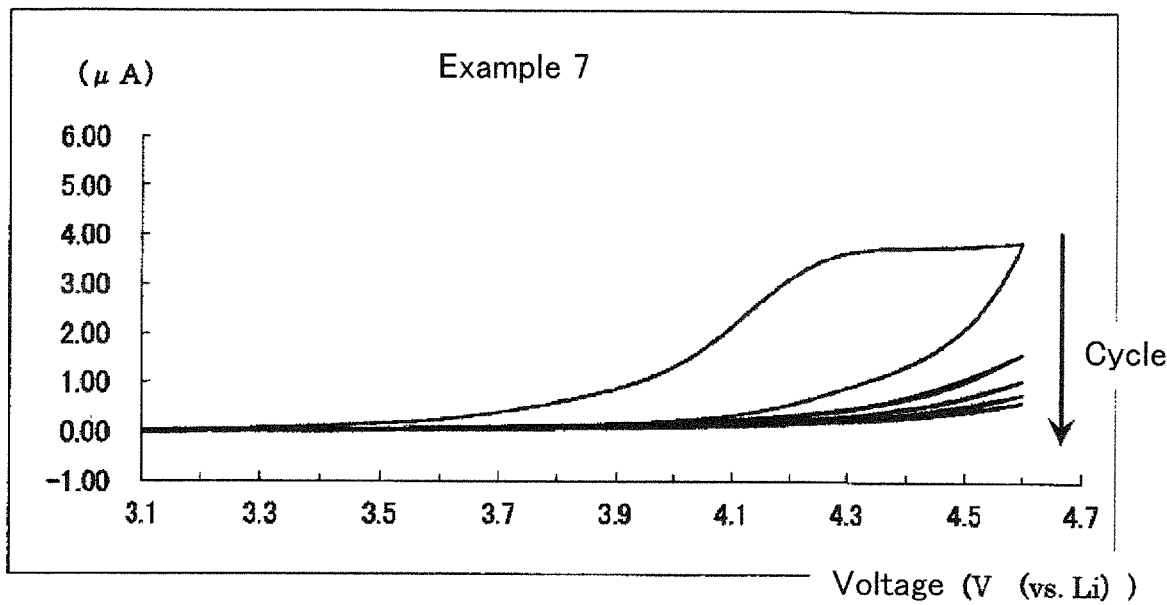
FIG. 39 is a graph showing the relationship between potential (3.1 to 4.6 V) and response current in a half-cell of Example 7.
Figure 40:
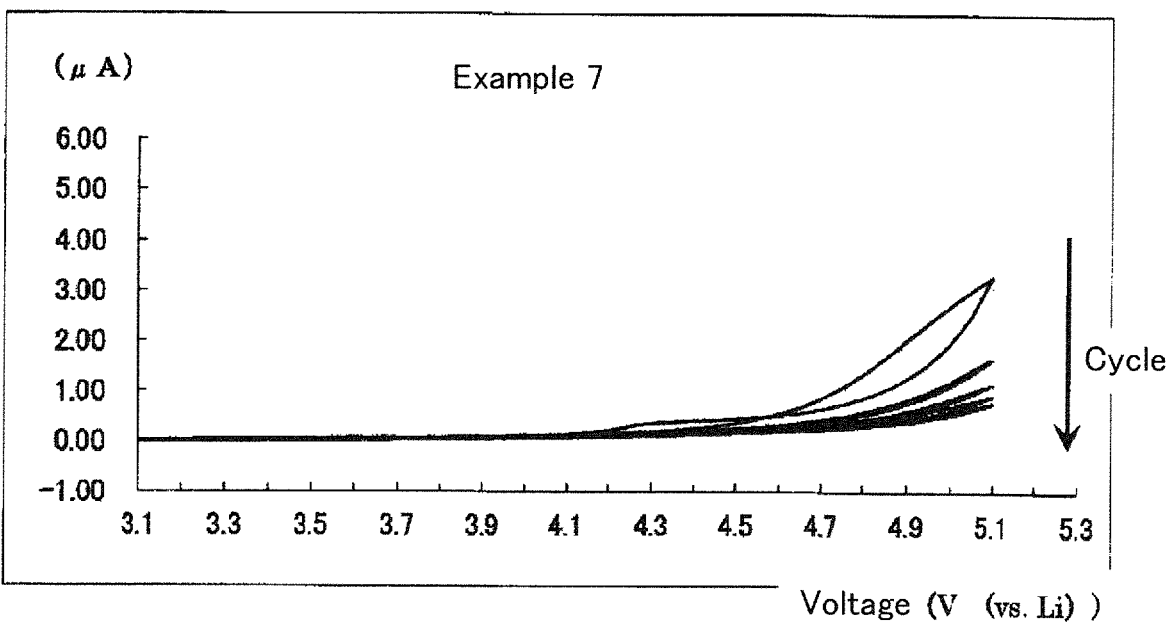
FIG. 40 is a graph showing the relationship between potential (3.1 to 5.1 V) and response current in the half-cell of Example 7.
Figure 41:
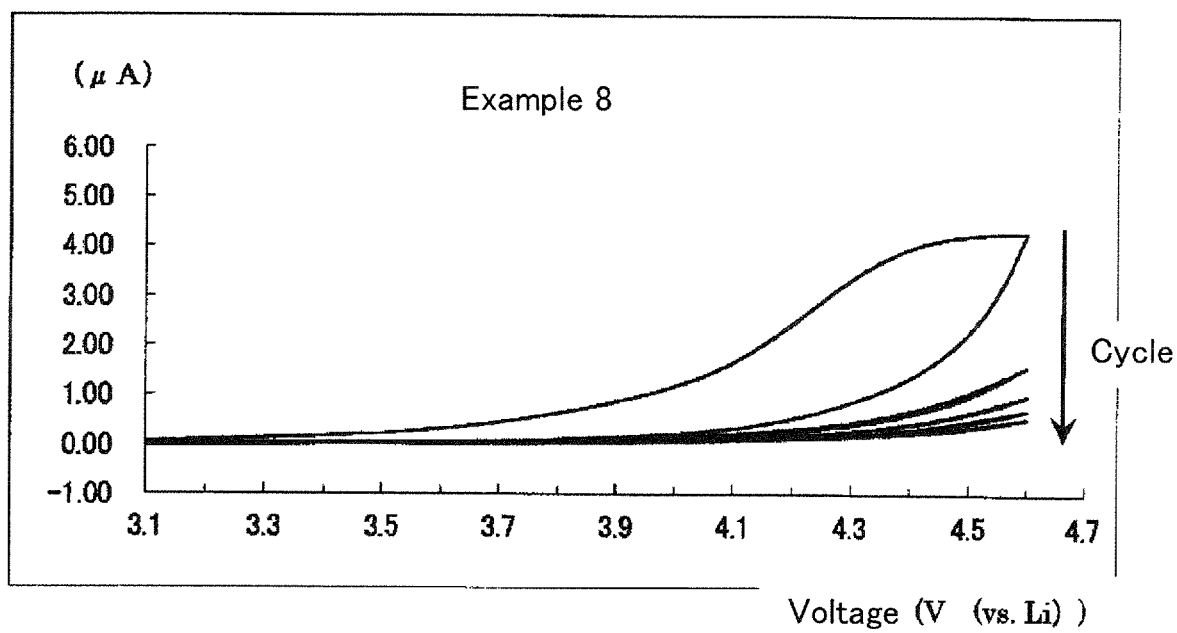
FIG. 41 is a graph showing the relationship between potential (3.1 to 4.6 V) and response current in a half-cell of Example 8.
Figure 42:
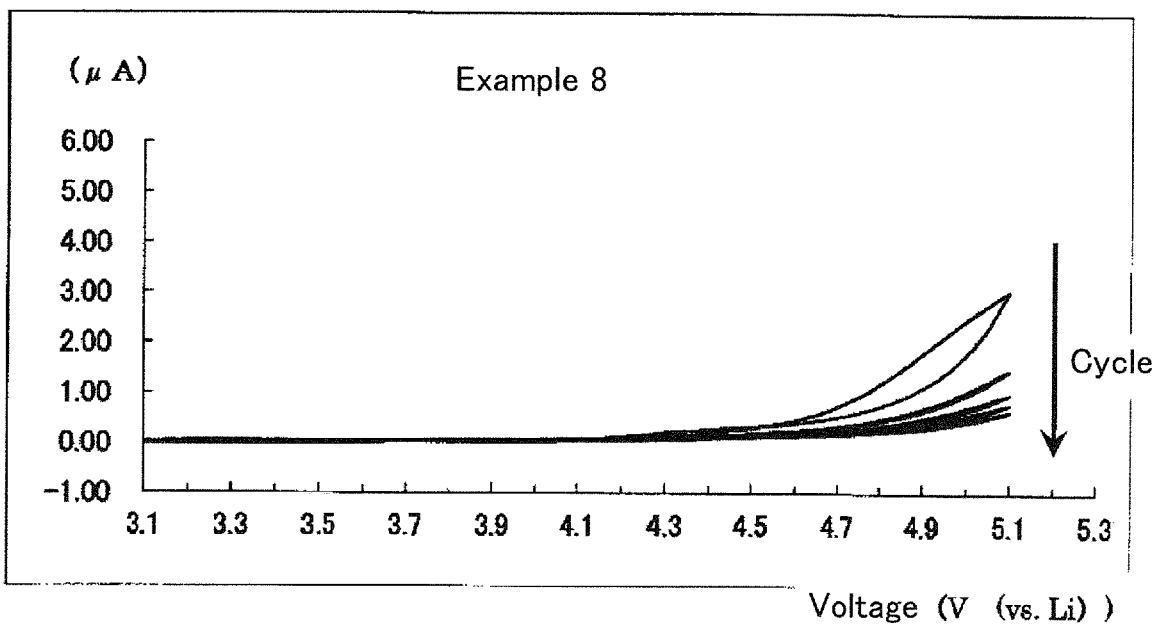
FIG. 42 is a graph showing the relationship between potential (3.1 to 5.1 V) and response current in the half-cell of Example 8.

When FIGS. 33 and 34 are compared, the results of surface analysis of the aluminum foils, which are the positive electrode current collectors, after charging and discharging the lithium ion secondary batteries of Examples 1 and 2 were almost the same, and whereby the following is determined. At the surfaces of the aluminum foils, the chemical state of Al on the outermost surface was $AlF_3$. When etching was performed in the depth direction, peaks for Al, O, and F were detected. This revealed that a composite state of Al—F bonds and Al—O bonds was located at parts reached after one to three times of etching from the surface. After further etching, peaks for O and F disappeared and only a peak for Al was observed from the fourth time of etching (a depth of approximately 25 nm calculated based on $SiO_2$). In XPS measurement data, $AlF_3$ was observed at Al peak position 76.3 eV, pure Al was observed at Al peak position 73 eV, and the composite state of Al—F bonds and Al—O bonds was observed at Al peak position 74 eV to 76.3 eV. Dashed lines shown in FIGS. 33 and 34 show respective peak positions representative for $AlF_3$, Al, and $Al_2O_3$.

Based on the results above, on the surfaces of the aluminum foils of the lithium ion secondary batteries of the present invention after charging and discharging, a layer of Al—F bonds (speculated to be $AlF_3$) and a layer in which Al—F bonds (speculated to be $AlF_3$) and Al—O bonds (speculated to be $Al_2O_3$) coexist were confirmed to be formed in a thickness of approximately 25 nm in the depth direction.

Thus, in the lithium ion secondary batteries of the present invention, also when the electrolytic solution of the present invention is used, a passive film including Al—F bonds (speculated to be $AlF_3$) was revealed to be formed on the outermost surfaces of the aluminum foils after charging and discharging.

Based on the results from Evaluation Examples 10 to 12, in the lithium ion secondary battery obtained by combining the electrolytic solution of the present invention and the positive electrode current collector formed of aluminum or an aluminum alloy, a passive film was revealed to be formed on the surface of the positive electrode current collector through charging and discharging, and elution of Al from the positive electrode current collector was revealed to be suppressed even in a high potential state.

Evaluation Example 13: Lithium Ion Secondary Battery Output Characteristics Evaluation I (Output Characteristics Evaluation at 0° C., SOC 20%)

Output characteristics of the lithium ion secondary batteries of Example 1 and Comparative Example 1 described above were evaluated. The used evaluation conditions were: state of charge (SOC) of 20%, 0° C., usage voltage range of 3 V to 4.2 V, and capacity of 13.5 mAh. SOC 20% at 0° C. is in a range in which output characteristics are unlikely to be exerted such as, for example, when used in a cold room. Evaluation of output characteristics of the lithium ion secondary batteries of Example 1 and Comparative Example 1 was performed three times each for 2-second output and 5-second output. Evaluation results of output characteristics are shown in Table 10. In Table 10, "2-second output" refers to an output outputted at 2 seconds after the start of discharging, and "5-second output" refers to an output outputted at 5 seconds after the start of discharging.

As shown in Table 10, the output of the lithium ion secondary battery of Example 1 at 0° C., SOC 20% was 1.2 to 1.3 times higher than the output of the lithium ion secondary battery of Comparative Example 1.

(Output Characteristics Evaluation at 25° C., SOC 20%)

Output characteristics of the lithium ion batteries of Example 1 and Comparative Example 1 were evaluated at conditions of: state of charge (SOC) of 20%, 25° C., usage voltage range of 3 V to 4.2 V, and capacity of 13.5 mAh. Evaluation of output characteristics of the lithium ion secondary batteries of Example 1 and Comparative Example 1 was performed three times each for 2-second output and 5-second output. Evaluation results are shown in Table 10.

As shown in Table 10, the output of the lithium ion secondary battery of Example 1 at 25° C., SOC 20% was 1.2 to 1.3 times higher than the output of the lithium ion secondary battery of Comparative Example 1.

(Effect of Temperature on Output Characteristics)

The effect of temperature during measurement on output characteristics of the lithium ion secondary batteries of Example 1 and Comparative Example 1 described above was also investigated. Measurements were performed at 0° C. and 25° C., and the used evaluation conditions were: state of charge (SOC) of 20%, usage voltage range of 3 V to 4.2 V, and capacity of 13.5 mAh for the measurements at both temperatures. A ratio (0° C. output/25° C. output) of an output at 0° C. with respect to an output at 25° C. was calculated. The results are shown in Table 10.

As shown in Table 10, the ratios (0° C. output/25° C. output) of the output at 0° C. with respect to the output at 25° C. for 2-second output and 5-second output in the lithium ion secondary battery of Example 1 were the same levels as those of the lithium ion secondary battery of Comparative Example 1. Thus, the lithium ion secondary battery of Example 1 was revealed to be capable of suppressing decrease in output at a low temperature at the same level as the lithium ion secondary battery of Comparative Example 1.

(Evaluation of Rate Capacity Characteristics)

Rate capacity characteristics of the lithium ion secondary batteries of Example 1 and Comparative Example 1 were evaluated. The capacity of each battery was adjusted to be 160 mAh/g. Regarding the evaluation conditions, at 0.1C, 0.2C, 0.5C, 1C, and 2C rates, charging and then discharging were performed, and the capacity (discharge capacity) of the positive electrode was measured at each rate. Discharge capacity after performing a 0.1C-discharge and a 1C-discharge is shown in Table 10. The discharge capacity shown in Table 10 is a calculated value of capacity per positive electrode mass.

As shown in Table 10, although 0.1C-discharge capacity was not greatly different between the lithium ion secondary battery of Example 1 and the lithium ion secondary battery of Comparative Example 1, 1C-discharge capacity was larger in the lithium ion secondary battery of Example 1 than in the lithium ion secondary battery of Comparative Example 1.

TABLE 10

| Battery | | | Example 1 | Comparative Example 1 |
|---|---|---|---|---|
| Electrolytic solution | | | Electrolytic solution E8 | Electrolytic solution C5 |
| Positive electrode current collector | | | Al | Al |
| SOC20%, 0° C. | 2-second output | (mW) | 121.7 | 98.1 |
| | | | 123.9 | 98.5 |
| | | | 119.8 | 99.2 |
| | 5-second output | (mW) | 98.4 | 75.1 |
| | | | 101.0 | 75.7 |
| | | | 96.3 | 76.5 |
| SOC20%, 25° C. | 2-second output | (mW) | 458.9 | 371.4 |
| | | | 471.3 | 372.4 |
| | | | 466.8 | 370.8 |
| | 5-second output | (mW) | 374.1 | 290.4 |
| | | | 387.6 | 292.7 |
| | | | 382.0 | 285.4 |
| 0° C. output/ 25° C. output | 2-second output | (mW) | 0.26 | 0.27 |
| | 5-second output | (mW) | 0.26 | 0.26 |
| 0.1 C discharge capacity (mAh/g) | | | 158.3 | 158.2 |
| 1 C discharge capacity (mAh/g) | | | 137.5 | 125.0 |

Evaluation Example 14: Input-Output Characteristics of Lithium Ion Secondary Battery Lithium Ion Secondary Battery of Example 3

A lithium ion secondary battery of Example 3 was produced in a manner similar to the lithium ion secondary battery of Example 1, except for using, as the separator, a nonwoven fabric made from cellulose and having a thickness of 20 μm.

Lithium Ion Secondary Battery of Example 4

A lithium ion secondary battery of Example 4 was produced in a manner similar to the lithium ion secondary battery of Example 3, except for using a negative electrode produced in the following manner.

90 parts by mass of natural graphite, which is a negative electrode active material, and 10 parts by mass of polyvinylidene fluoride, which is a binding agent, were mixed. The mixture was dispersed in a proper amount of ion exchanged water to create a slurry. As the negative electrode current collector, a copper foil having a thickness of 20 μm was prepared. The slurry was applied in a film form on the surface of the copper foil by using a doctor blade. The copper foil on which the slurry was applied was dried to remove water, and then the copper foil was pressed to obtain a joined object. The obtained joined object was heated and dried in a vacuum dryer for 6 hours at 120° C. to obtain a copper foil having the negative electrode active material layer formed thereon. This was used as the negative electrode.

Lithium Ion Secondary Battery of Comparative Example 2

A lithium ion secondary battery of Comparative Example 2 was produced in a manner similar to the lithium ion secondary battery of Example 3, except for using electrolytic solution C5 instead of electrolytic solution E8.

Lithium Ion Secondary Battery of Comparative Example 3

A lithium ion secondary battery of Comparative Example 3 was produced in a manner similar to the lithium ion secondary battery of Example 4, except for using electrolytic solution C5 instead of electrolytic solution E8.

Output characteristics of the lithium ion secondary batteries of Examples 3 and 4 and Comparative Examples 2 and 3 were evaluated using the following conditions.

(1) Input Characteristics Evaluation at 0° C. or 25° C., SOC 80%

The used evaluation conditions were: state of charge (SOC) of 80%, 0° C. or 25° C., usage voltage range of 3 V to 4.2 V, and capacity of 13.5 mAh. Evaluation of input characteristics of each of the batteries was performed three times each for 2-second input and 5-second input.

In addition, based on the volume of each of the batteries, battery output density (W/L) at 25° C. in 2-second input was calculated.

Evaluation results of input characteristics are shown in Table 11. In Table 11, "2-second input" refers to an input inputted at 2 seconds after the start of charging, and "5-second input" refers to an input inputted at 5 seconds after the start of charging.

As shown in Table 11, regardless of the difference in temperature, the input of the lithium ion secondary battery of Example 3 was significantly higher than the input of the lithium ion secondary battery of Comparative Example 2. Similarly, the input of the lithium ion secondary battery of Example 4 was significantly higher than the input of the lithium ion secondary battery of Comparative Example 3.

In addition, the battery input density of the lithium ion secondary battery of Example 3 was significantly higher than the battery input density of the lithium ion secondary battery of Comparative Example 2. Similarly, the battery input density of the lithium ion secondary battery of Example 4 was significantly higher than the battery input density of the lithium ion secondary battery of Comparative Example 3.

(2) Output Characteristics Evaluation at 0° C. or 25° C. and SOC 20%

The used evaluation conditions were: state of charge (SOC) of 200, 0° C. or 25° C., usage voltage range of 3 V to 4.2 V, and capacity of 13.5 mAh. SOC 20% at 0° C. is in a range in which output characteristics are unlikely to be exerted such as, for example, when used in a cold room. Evaluation of output characteristics of each of the batteries was performed three times each for 2-second output and 5-second output.

In addition, based on the volume of each of the batteries, battery output density (W/L) at 25° C. in 2-second output was calculated.

Evaluation results of the output characteristics are shown in Table 11. In Table 11, "2-second output" refers to an output outputted at 2 seconds after the start of discharging, and "5-second output" refers to an output outputted at 5 seconds after the start of discharging.

As shown in Table 11, regardless of the difference in temperature, the output of the lithium ion secondary battery of Example 3 was significantly higher than the output of the lithium ion secondary battery of Comparative Example 2. Similarly, the output of the lithium ion secondary battery of Example 4 was significantly higher than the output of the lithium ion secondary battery of Comparative Example 3.

In addition, the battery output density of the lithium ion secondary battery of Example 3 was significantly higher than the battery output density of the lithium ion secondary battery of Comparative Example 2. Similarly, the battery output density of the lithium ion secondary battery of Example 4 was significantly higher than the battery output denSity of the lithium ion secondary battery of Comparative Example 3.

TABLE 11

| | | Example 3 | Comparative Example 2 | Example 4 | Comparative Example 3 |
|---|---|---|---|---|---|
| Electrolytic solution | | Electrolytic solution E8 | Electrolytic solution C5 | Electrolytic solution E8 | Electrolytic solution C5 |
| Positive electrode current collector | | Al | Al | Al | Al |
| SOC80%, 25° C. | 2-second input (mW) | 1285.1 | 732.2 | 1113.6 | 756.9 |
| | 5-second input (mW) | 1004.2 | 602.2 | 858.2 | 614.2 |
| SOC80%, 0° C. | 2-second input (mW) | 498.5 | 232.3 | 423.2 | 218.3 |
| | 5-second input (mW) | 408.4 | 206.8 | 348.6 | 191.2 |

TABLE 11-continued

|  |  | Example 3 | Comparative Example 2 | Example 4 | Comparative Example 3 |
|---|---|---|---|---|---|
| SOC20%, 25° C. | 2-second output (mW) | 924.6 | 493.5 | 1079.3 | 696.0 |
|  | 5-second output (mW) | 899.6 | 425.9 | 1057.3 | 659.9 |
| SOC20%, 0° C. | 2-second output (mW) | 305.2 | 175.3 | 354.8 | 207.5 |
|  | 5-second output (mW) | 291.7 | 165.6 | 347.1 | 202.1 |
| Battery input density (W/L): SOC80%, 25° C. |  | 6255.0 | 3563.9 | 3762.1 | 2558.4 |
| Battery output density (W/L): SOC20%, 25° C. |  | 4497.4 | 2399.6 | 3647.1 | 2352.6 |

Based on the results from Evaluation Examples 13 and 14, in the lithium ion secondary battery of the present invention obtained by combining the electrolytic solution of the present invention and the positive electrode current collector formed of aluminum or an aluminum alloy, the input-output characteristics were revealed to be superior to that of a lithium ion secondary battery using a conventional electrolytic solution.

Evaluation Example 15: Low Temperature Test

Electrolytic solutions E10, E12, E15, and E18 were each placed in a container, and the container was filled with inert gas and sealed. These solutions were stored in a –30° C. freezer for two days. Each of the electrolytic solutions after storage was observed. All of the electrolytic solutions maintained a liquid state without solidifying, and depositing of salts was also not observed.

Example 5

A half-cell using electrolytic solution E8 was produced in the following manner.

An aluminum foil (JIS A1000 series) having a diameter of 13.82 mm and an area of 1.5 cm² was used as the working electrode. Metal Li was used as the counter electrode. As the separator, Whatman glass fiber filter paper manufactured by GE Healthcare Japan Corp., was used.

The working electrode, the counter electrode, the separator, and electrolytic solution E8 were housed in a battery case (CR2032 type coin cell case manufactured by Hohsen Corp.) to form a half-cell. This was used as a half-cell of Example 5.

Example 6

A half-cell of Example 6 was produced similarly to the half-cell of Example 5, except for using electrolytic solution E10 instead of electrolytic solution E8.

Example 7

A half-cell of Example 7 was produced similarly to the half-cell of Example 5, except for using electrolytic solution E15 instead of electrolytic solution E8.

Example 8

A half-cell of Example 8 was produced similarly to the half-cell of Example 5, except for using electrolytic solution E18 instead of electrolytic solution E8.

Example 9

A half-cell of Example 9 was produced similarly to the half-cell of Example 5, except for using electrolytic solution E12 instead of electrolytic solution E8.

Comparative Example 4

A half-cell of Comparative Example 4 was produced similarly to the half-cell of Example 5, except for using electrolytic solution C5 instead of electrolytic solution E8.

Comparative Example 5

A half-cell of Comparative Example 5 was produced similarly to the half-cell of Example 5, except for using electrolytic solution C6 instead of electrolytic solution E8.

Evaluation Example 16: Cyclic Voltammetry Evaluation Using Al Working Electrode

With respect to the half-cells of Examples 5 to 8 and Comparative Example 4, 5 cycles of cyclic voltammetry evaluation were performed with a condition of 1 mV/s in a range of 3.1 V to 4.6 V. Then, with respect to the half-cells of Examples 5 to 8, 5 cycles of cyclic voltammetry evaluation were performed with a condition of 1 mV/s in a range of 3.1 V to 5.1 V.

In addition, with respect to the half-cells of Examples 6 and 9 and Comparative Example 5, 10 cycles of cyclic voltammetry evaluation were performed with a condition of 1 mV/s in a range of 3.0 V to 4.5 V, and then 10 cycles of cyclic voltammetry evaluation were performed with a condition of 1 mV/s in a range of 3.0 V to 5.0 V.

FIGS. 35 to 43 show graphs showing the relationship between potential and response current in the half-cells of Examples 5 to 8 and Comparative Example 4. In addition, FIGS. 44 to 49 show graphs showing the relationship between potential and response current in the half-cells of Examples 6 and 9 and Comparative Example 5.

Figure 43:
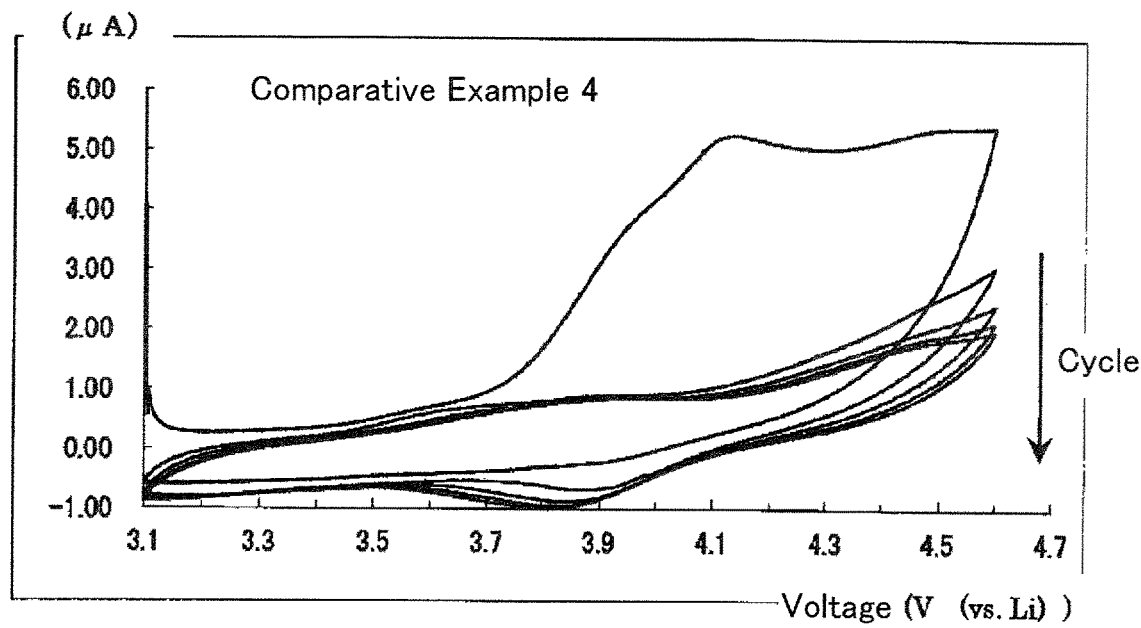
FIG. 43 is a graph showing the relationship between potential (3.1 to 4.6 V) and response current in a half-cell of Comparative Example 4.
Figure 44:
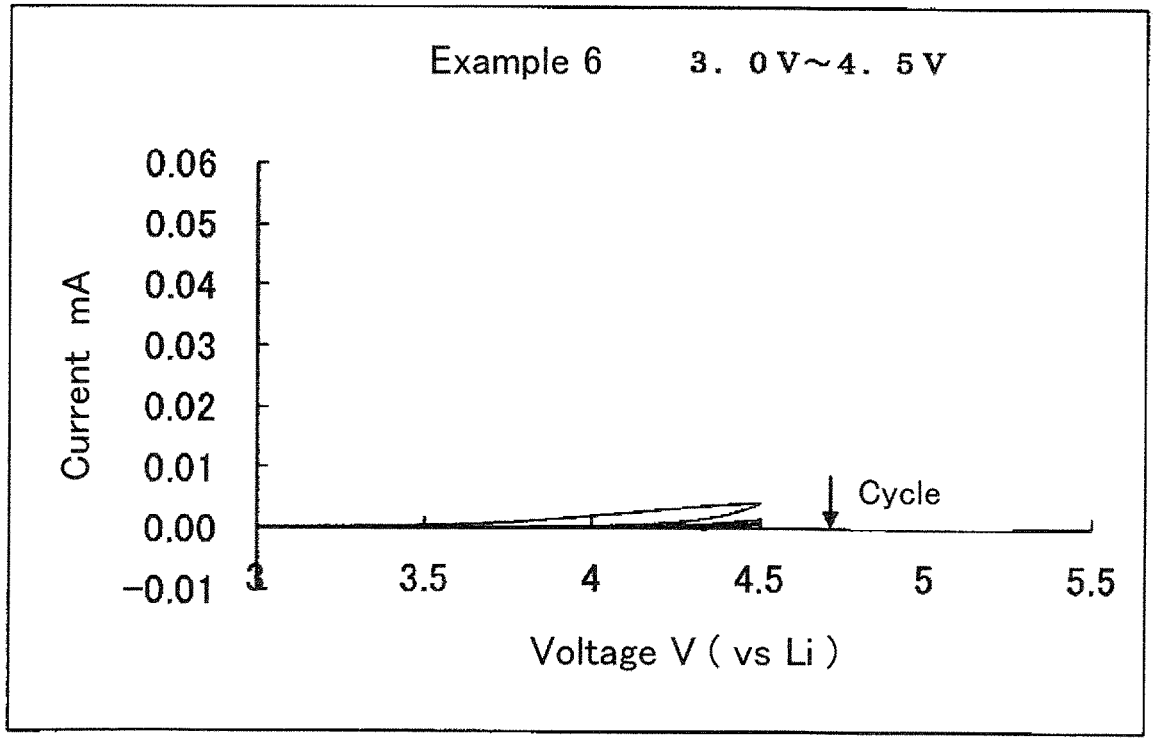
FIG. 44 is a graph showing the relationship between potential (3.0 to 4.5 V) and response current in the half-cell of Example 6.
Figure 45:
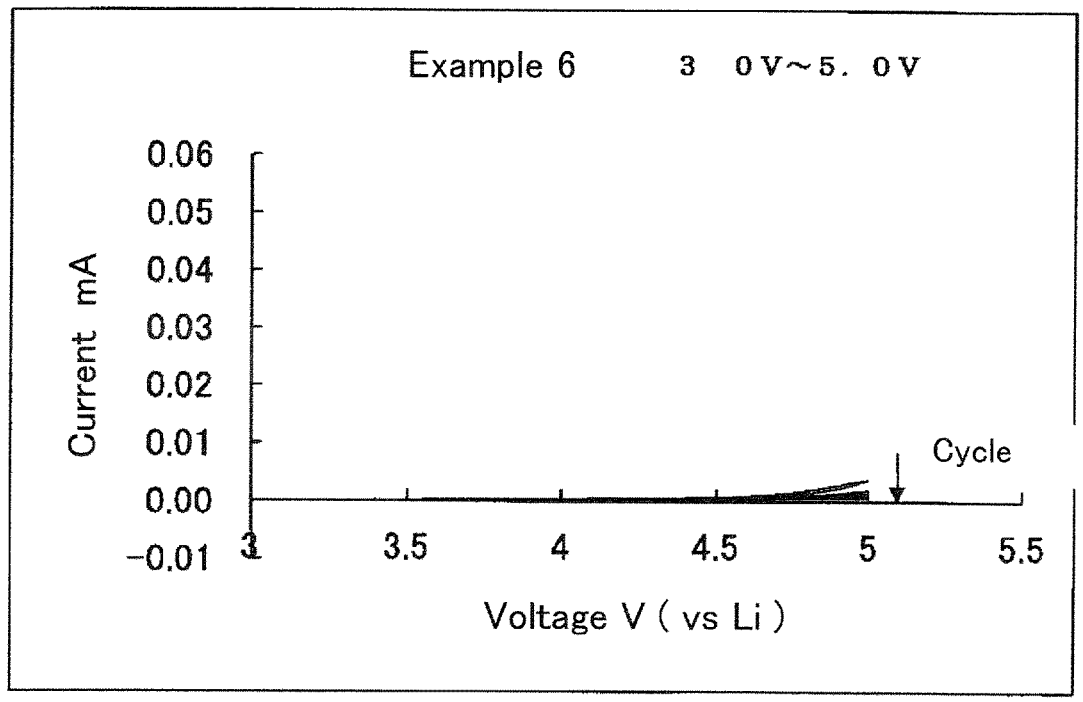
FIG. 45 is a graph showing the relationship between potential (3.0 to 5.0 V) and response current in the half-cell of Example 6.
Figure 46:
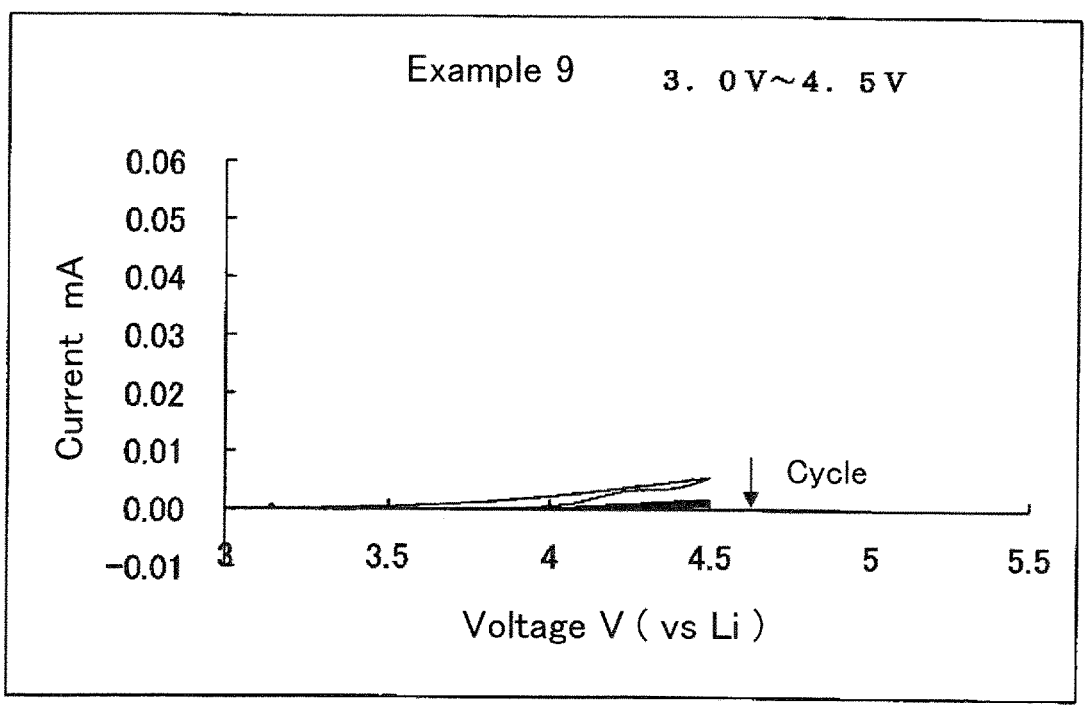
FIG. 46 is a graph showing the relationship between potential (3.0 to 4.5 V) and response current in a half-cell of Example 9.
Figure 47:
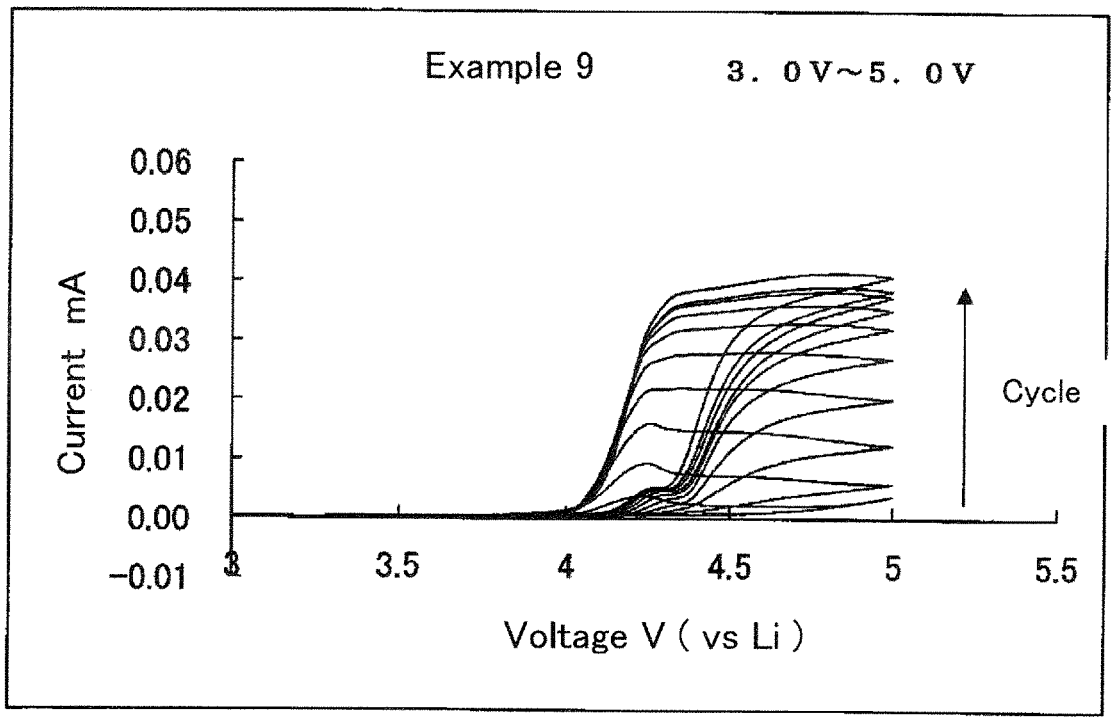
FIG. 47 is a graph showing the relationship between potential (3.0 to 5.0 V) and response current in the half-cell of Example 9.
Figure 48:
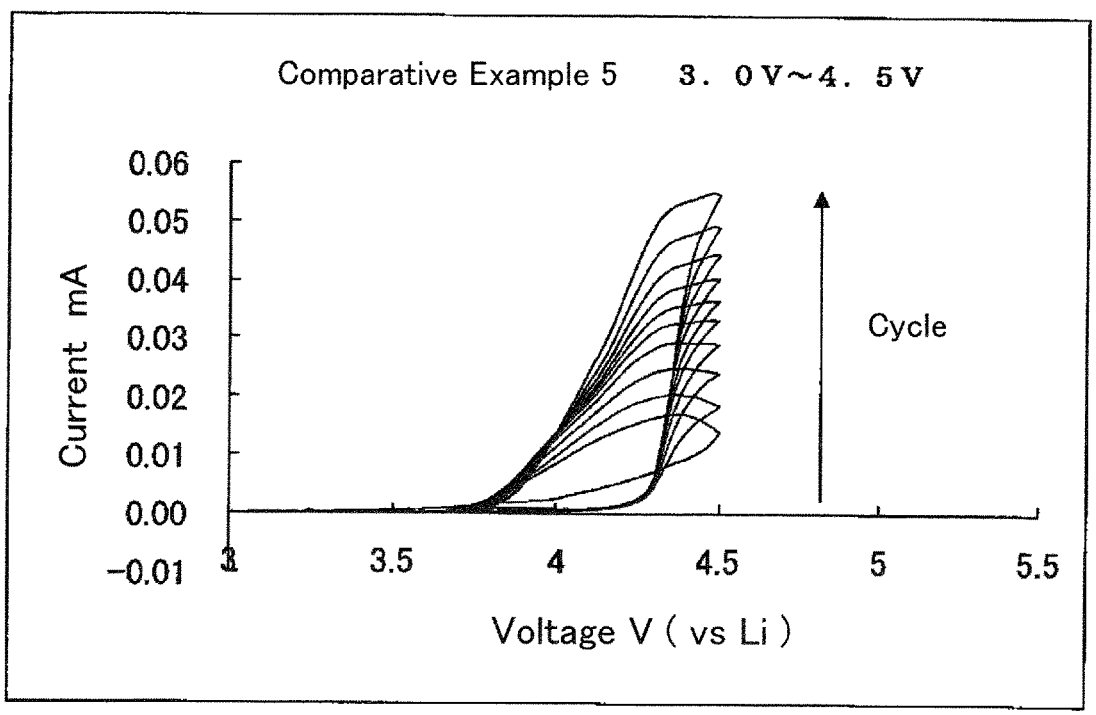
FIG. 48 is a graph showing the relationship between potential (3.0 to 4.5 V) and response current in a half-cell of Comparative Example 5.
Figure 49:
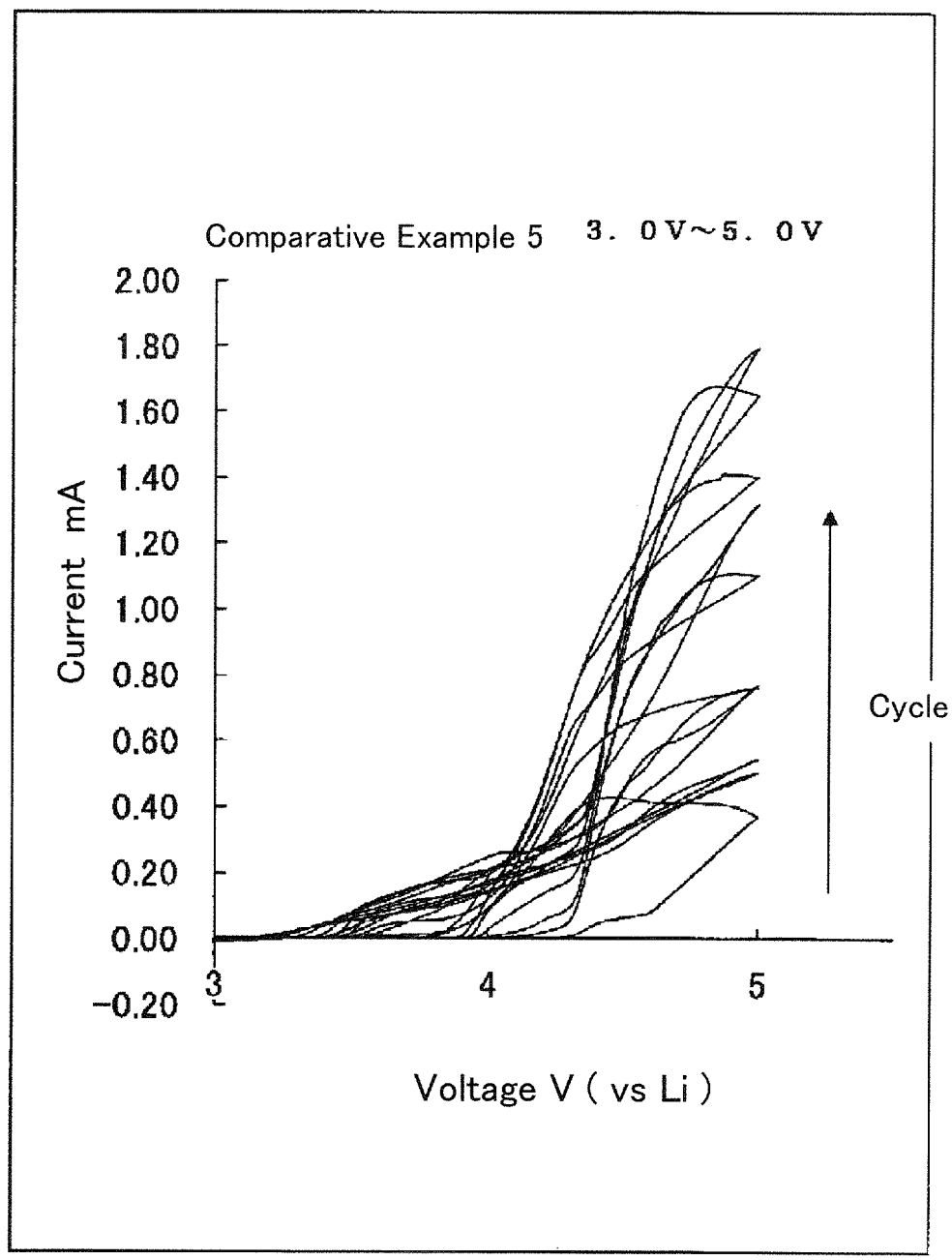
FIG. 49 is a graph showing the relationship between potential (3.0 to 5.0 V) and response current in the half-cell of Comparative Example 5.

From FIG. 43, with the half-cell of Comparative Example 4, current is understood to be flowing in a range of 3.1 V to 4.6 V during and after the second cycle, and the current is understood to have been increased as the potential became higher. In addition, from FIGS. 48 and 49, also with the half-cell of Comparative Example 5, current flowed in a range of 3.0 V to 4.5 V during and after the second cycle, and current increased as the potential became higher. This current is estimated to be a current resulting from oxidation of Al, generated through corrosion of aluminum of the working electrode.

On the other hand, from FIGS. 35 to 42, with the half-cells of Examples 5 to 8, almost no current is understood as to flow in a range of 3.1 V to 4.6 V during and after the second cycle. Although a slight increase in current was observed associated with an increase in potential in a range equal to or higher than 4.3 V, the amount of current reduced to become steady as the cycle was repeated. Particularly in the half-cells of Examples 6 to 8, a significant increase in current was not observed up to a high potential of 5.1 V, and a reduction in the amount of current associated with repeated cycles was observed.

In addition, from FIGS. 44 to 47, similarly with the half-cells of Examples 6 and 9, almost no current is understood as to flow in a range of 3.0 V to 4.5 V during and after the second cycle. In particular, during and after the third cycle, almost no increase in current was observed until reaching 4.5 V. Although an increase in current was observed beyond a high potential of 4.5 V in the half-cell of Example 9, the value was much smaller when compared to a current value beyond 4.5 V in the half-cell of Comparative Example 5. In the half-cell of Example 6, almost no increase in current was observed beyond 4.5 V up to 5.0 V, and a reduction in the amount of current associated with repeated cycles was observed.

From the results of cyclic voltammetry evaluation, corrosiveness of electrolytic solutions E8, E10, E12, E15 and E18 with respect to aluminum is considered to be low even at a high potential condition exceeding 5 V. Thus, electrolytic solutions E8, E10, E12, E15 and E18 are considered as electrolytic solutions suitable for a battery using aluminum as a current collector or the like.

Evaluation Example 17: Lithium Ion Secondary Battery Output Characteristics Evaluation II Review of Weight Per Area Example 10

A lithium ion secondary battery of Example 10 was produced in a manner similar to the lithium ion secondary battery of Example 3, except for setting the weight per area of the positive electrode to 5.5 mg/cm$^2$ and setting the weight per area of the negative electrode to 4 mg/cm$^2$.

Comparative Example 6

A lithium ion secondary battery of Comparative Example 6 was produced in a manner similar to the lithium ion secondary battery of Comparative Example 2, except for setting the weight per area of the positive electrode to 5.5 mg/cm$^2$ and setting the weight per area of the negative electrode to 4 mg/cm$^2$.

Input-output characteristics of the lithium ion secondary batteries of Example 10 and Comparative Example 6 were evaluated using the following conditions.

(Input-Output Characteristics Evaluation at: 25° C., SOC 80%; −10° C., SOC 30%; and −30° C., SOC 30%)

The used evaluation conditions were: state of charge (SOC) of 80%, 25° C., usage voltage range of 3 V to 4.2 V, capacity of 13.5 mAh, and 5-second input; and state of charge (SOC) of 30%, −10° C. or −30° C., usage voltage range of 3 V to 4.2 V, capacity of 13.5 mAh, and 2-second output. Here, −10° C. or −30° C. is in a range in which output characteristics are unlikely to be exerted such as when used in a low temperature environment.

Evaluation results of the input-output characteristics are shown in Table 12. In Table 12, "5-second input" refers to an input inputted at 5 seconds after the start of charging, and "2-second output" refers to an output outputted at 2 seconds after the start of discharging.

As shown in Table 12, regardless of the difference in temperature, input and output of the lithium ion secondary battery of Example 10 were also significantly higher even with a lithium ion secondary battery having a low weight per area when compared to input and output of the lithium ion secondary battery of Comparative Example 6.

TABLE 12

|  | Example 10 | Comparative Example 6 |
|---|---|---|
| Electrolytic solution | Electrolytic solution E8 | Electrolytic solution C5 |
| −30° C. SOC30% 2-second output (mW) | 85 | 45 |
| −10° C. SOC30% 2-second output (mW) | 329 | 161 |
| 25° C. SOC80% 5-second input (mW) | 890 | 684 |

Evaluation Example 18: Raman Spectrum Measurement

Raman spectrum measurement was performed on electrolytic solutions E8, E21, C4, E10, E12, E14, and C6 using the following conditions. FIGS. 50 to 56 each show a Raman spectrum in which a peak derived from an anion portion of a metal salt of an electrolytic solution was observed. In each of the figures, the horizontal axis represents wave number (cm$^{-1}$) and the vertical axis represents scattering intensity.

Raman Spectrum Measurement Conditions
Device: Laser Raman spectrometer (NRS series, JASCO Corp.)
Laser wavelength: 532 nm The electrolytic solutions were each sealed in a quartz cell under an inert gas atmosphere and subjected to the measurement.

Figure 50:
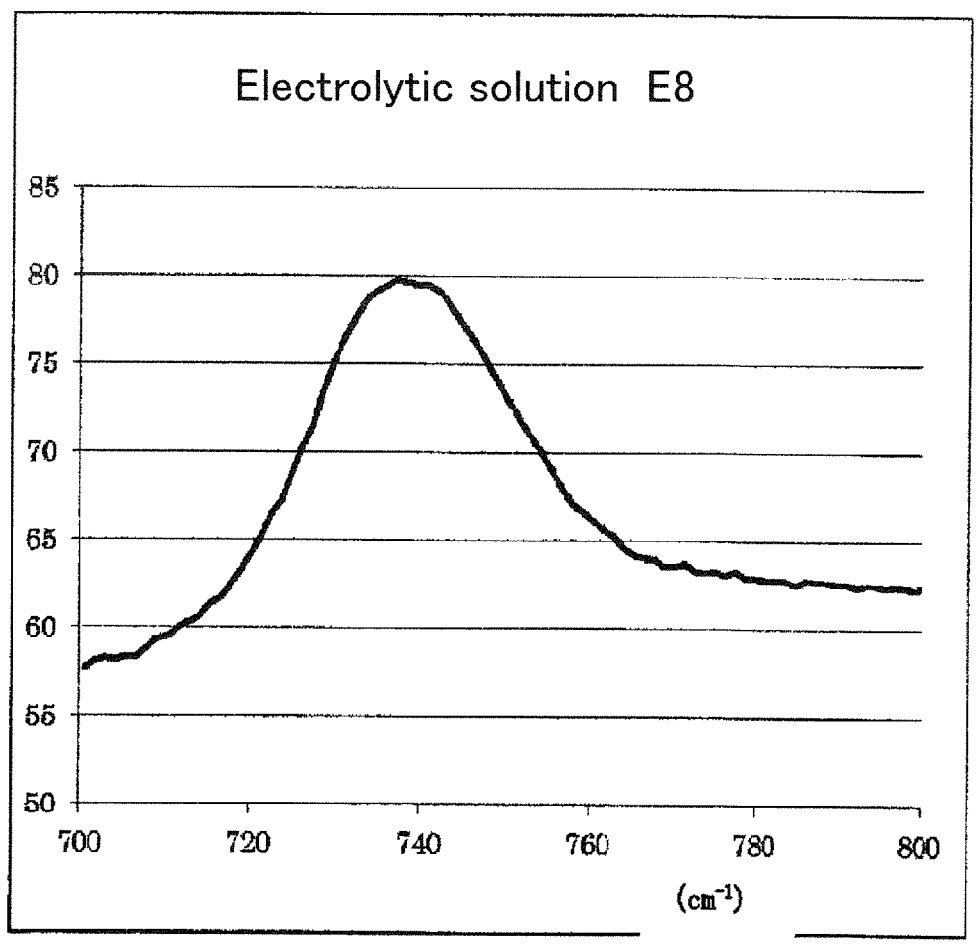
FIG. 50 is a Raman spectrum of electrolytic solution E8.
Figure 51:
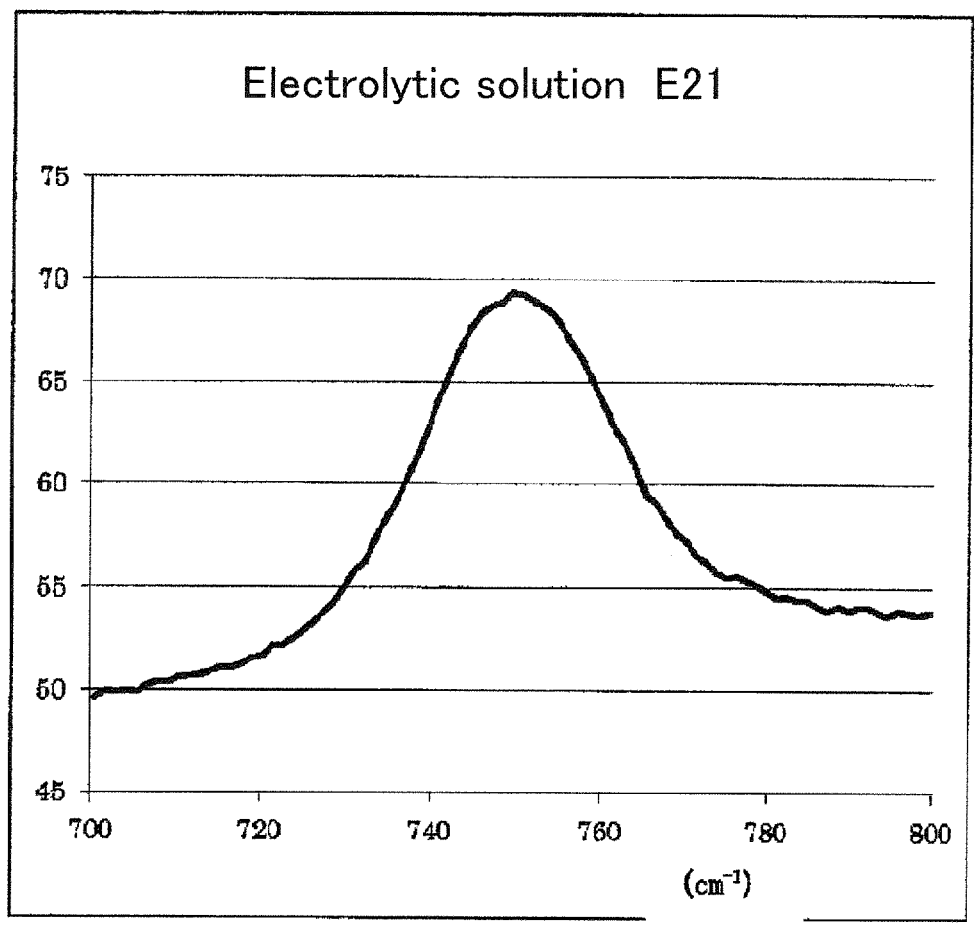
FIG. 51 is a Raman spectrum of electrolytic solution E21.
Figure 52:
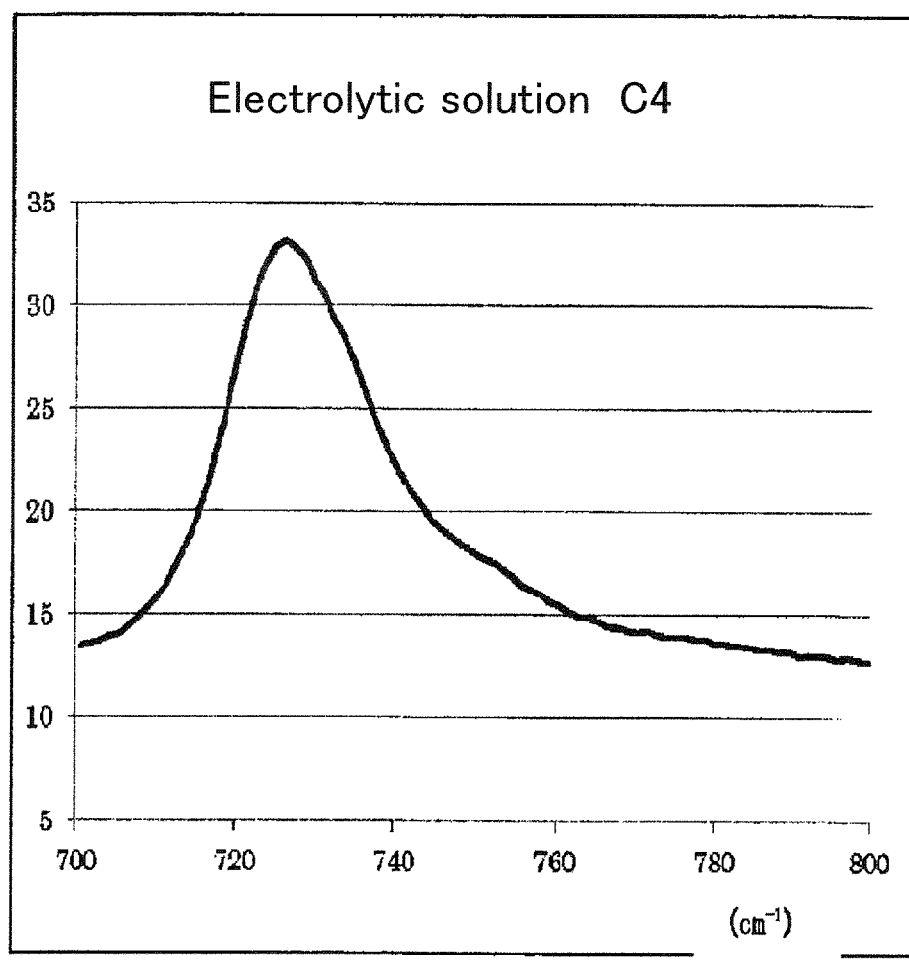
FIG. 52 is a Raman spectrum of electrolytic solution C4.
Figure 53:
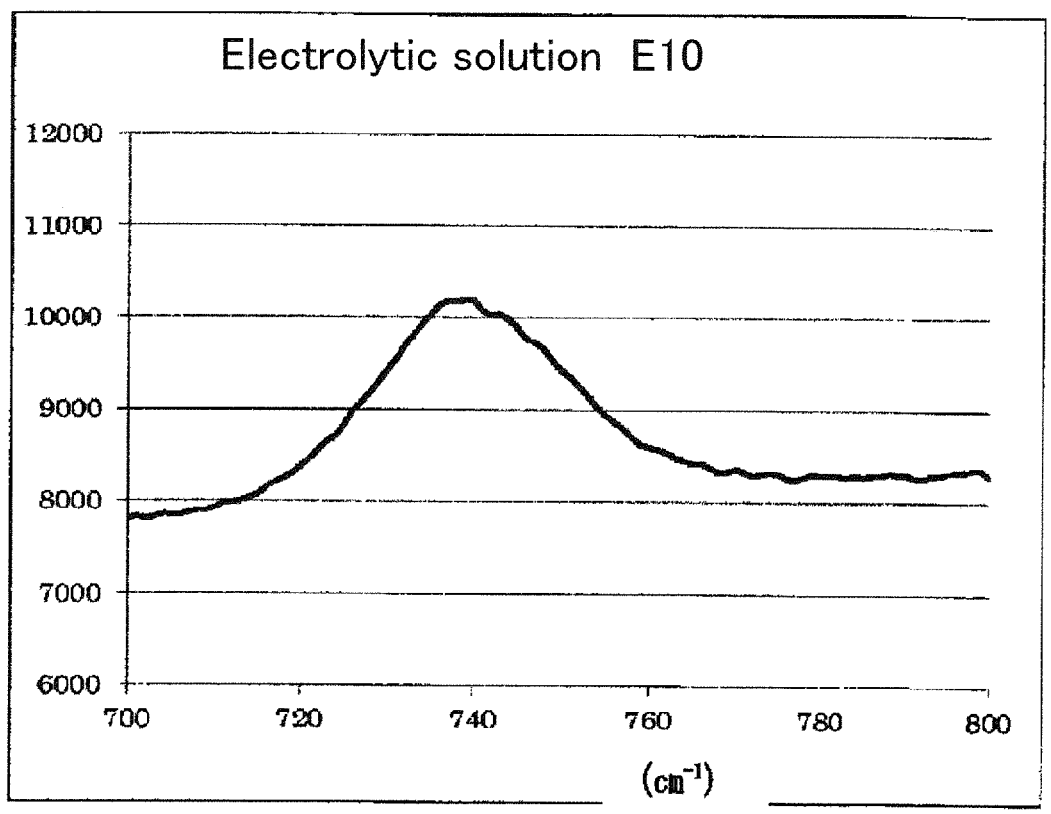
FIG. 53 is a Raman spectrum of electrolytic solution E10.
Figure 54:
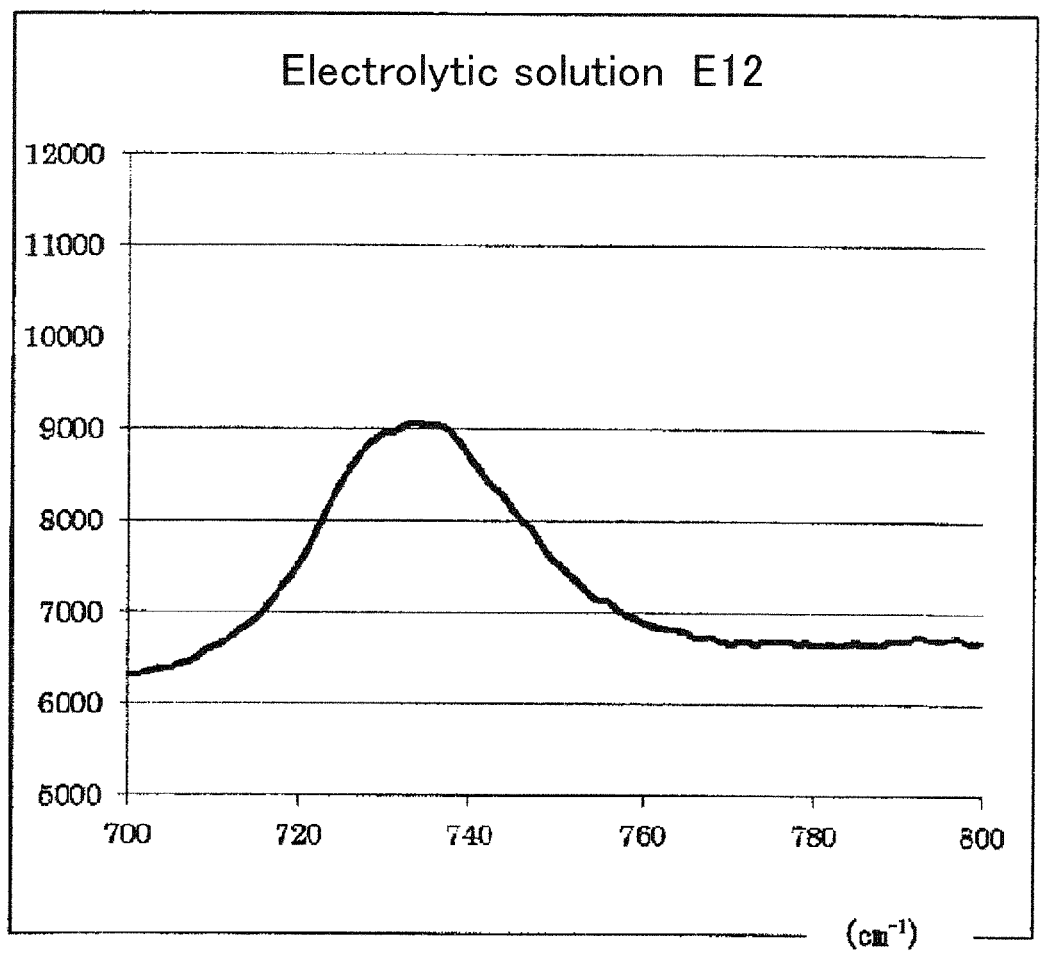
FIG. 54 is a Raman spectrum of electrolytic solution E12.
Figure 55:
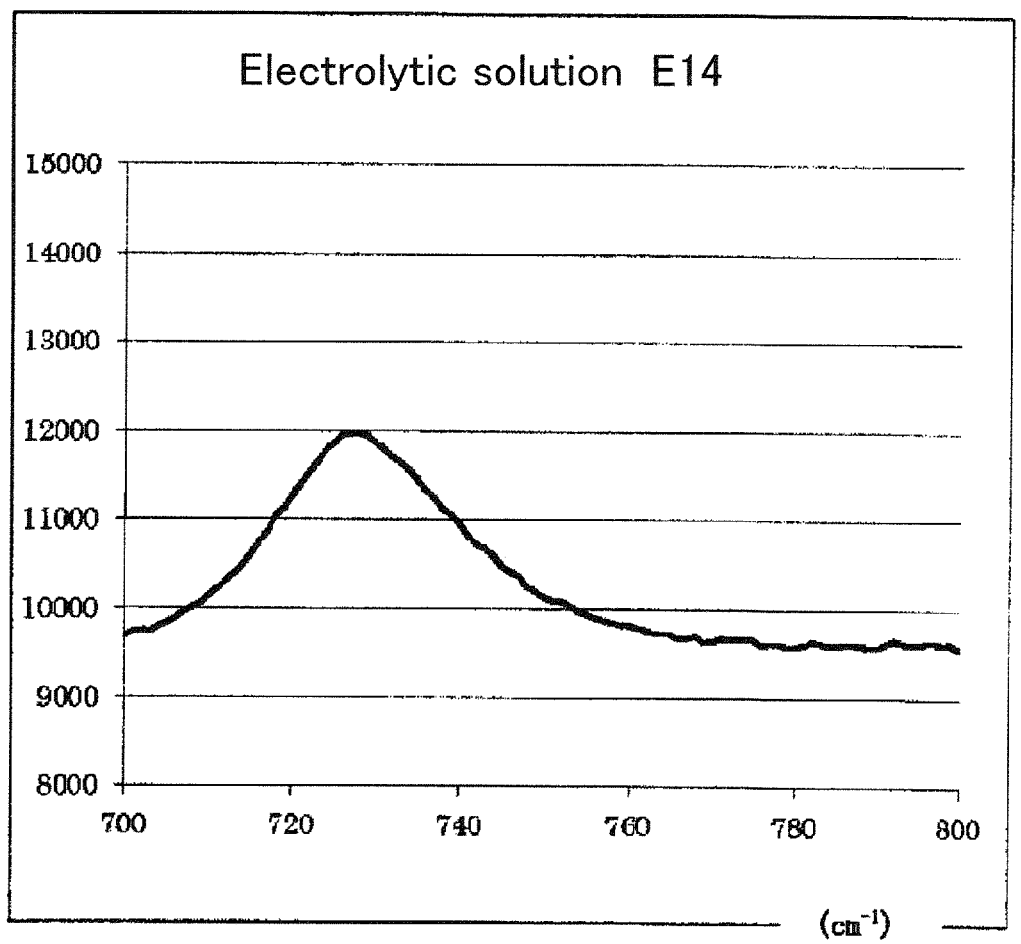
FIG. 55 is a Raman spectrum of electrolytic solution E14.
Figure 56:
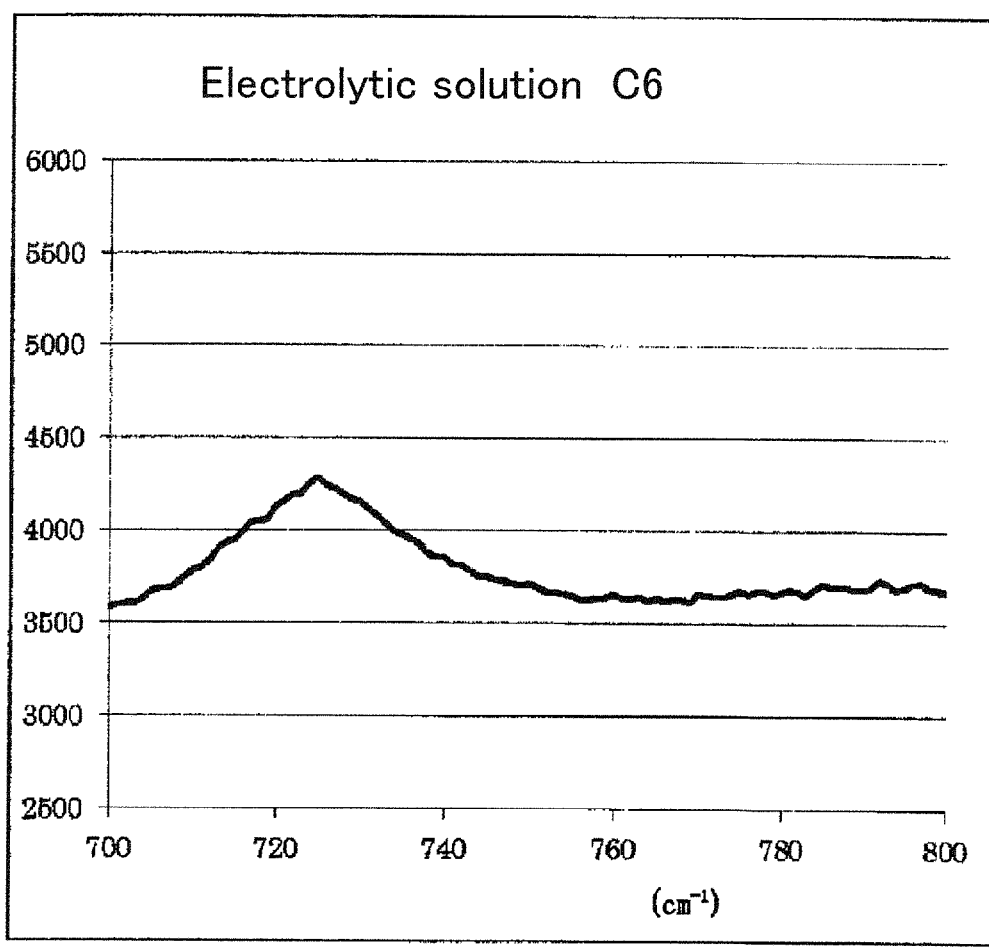
FIG. 56 is a Raman spectrum of electrolytic solution C6.

In electrolytic solutions E8, E21, and C4 shown in FIGS. 50 to 52, at 700 to 800 cm$^{-1}$ in the Raman spectra, characteristic peaks derived from $(FSO_2)_2N$ of LiFSA dissolved in acetonitrile were observed. Here, based on FIGS. 50 to 52, the peak is understood as to shift toward the high wave number side associated with an increase in the concentration of LiFSA. As the concentration of the electrolytic solution becomes higher, $(FSO_2)_2N$ corresponding to the anion of a salt is speculated to enter a state of interacting with more Li. In other words, Li and an anion are speculated to mainly form an SSIP (Solvent-separated ion pairs) state at a low concentration, and mainly form a CIP (Contact ion pairs) state or an AGG (aggregate) state as the concentration becomes higher. A change in the state is thought to have been observed as a peak shift in the Raman spectrum.

In electrolytic solutions E10, E12, E14, and C6 shown in FIGS. 53 to 56, at 700 to 800 cm$^{-1}$ in the Raman spectra, characteristic peaks derived from $(FSO_2)_2N$ of LiFSA dissolved in dimethyl carbonate were observed. Here, based on FIGS. 53 to 56, the peak is understood as to shift toward the high wave number side associated with an increase in the concentration of LiFSA. As thought in the previous paragraph, this phenomenon is considered as a result of $(FSO_2)_2N$ corresponding to the anion of a salt entering a state of interacting with Li as the concentration of the electrolytic solution became higher, and such a change in the state being observed as a peak shift in the Raman spectrum.

Evaluation Example 19: Capacity Retention Rate Measurement

Example 11

A lithium ion secondary battery of Example 11 was produced in a manner similar to the lithium ion secondary battery of Example 1, except for using electrolytic solution E10 as the electrolytic solution of the lithium ion secondary battery.

Figure 57:
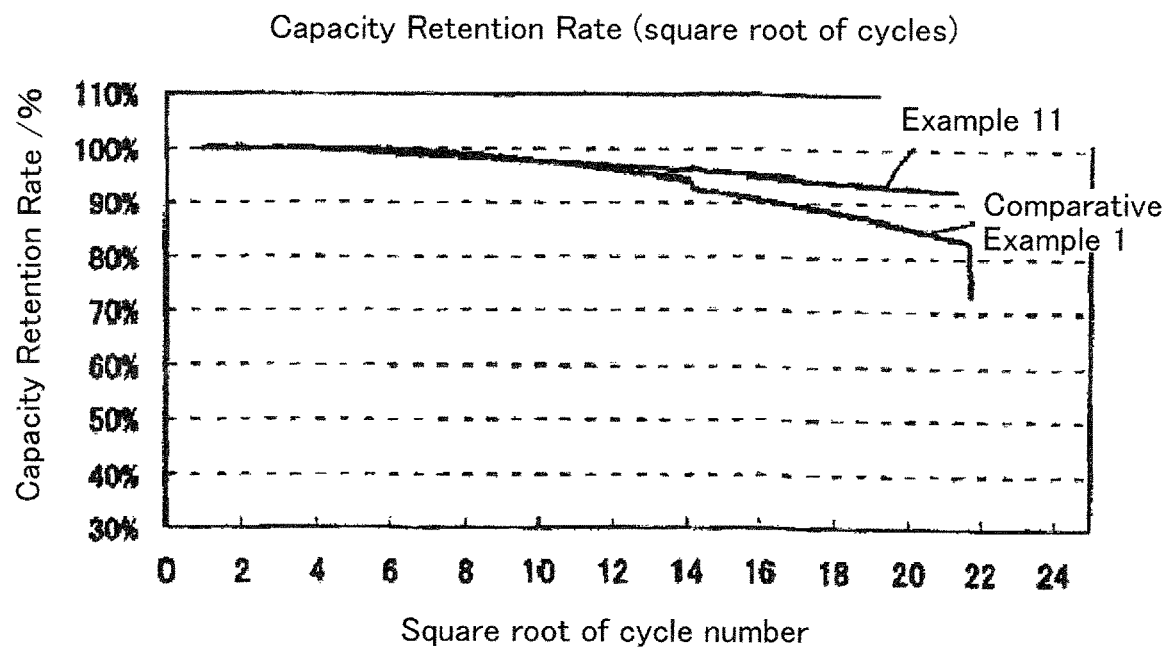
FIG. 57 is a graph showing the relationship between the square root of cycle number and discharge capacity retention rate when a cycle test was performed on lithium ion secondary batteries of Example 11 and Comparative Example 1.

By using the lithium ion secondary battery of Example 11 and the lithium ion secondary battery of Comparative Example 1, cycle of charging to 4.1 V under a condition of CC charging of 1C at a temperature 25° C., pausing for 1 minute, discharging to 3.0 V with CC discharging of 1C, and pausing for 1 minute, was repeated for 500 cycles as a cycle test. Discharge capacity retention rate was measured at each of the cycles, and the results are shown in FIG. 57. The discharge capacity retention rate at the 500-th cycle is shown in Table 13. The discharge capacity retention rate is a value represented as percentage ((Discharge capacity at each cycle)/(First discharge capacity)×100) of a value obtained by dividing a discharge capacity at each cycle by the first discharge capacity.

As shown in Table 13 and FIG. 57, the lithium ion secondary battery of Example 11 had improved cycle life when compared to the lithium ion secondary battery of Comparative Example 1.

TABLE 13

|  | Electrolytic solution | 500-Cycle capacity retention rate |
|---|---|---|
| Example 11 | Electrolytic solution E10 | 92% |
| Comparative Example 1 | Electrolytic solution C5 | 82% |

Evaluation Example 20: Confirmation of Elution of Ni, Mn, and Co

In Evaluation Example 20, the lithium ion secondary batteries of Example 11 and Comparative Example 1, after the cycle test in which capacity retention rate was measured, were disassembled, and respective negative electrodes were taken out. Respective amounts of Ni, Mn, and Co deposited on the surface of the negative electrodes were measured using an ICP (high frequency inductively coupled plasma) emission spectrophotometer. The measurement results are shown in Table 14. The amounts of Ni, Mn, and Co (%) in Table 14 show, in %, respective mass of Ni, Mn, and Co per 1 g of the respective negative electrode active material layers. The amounts of Ni, Mn, and Co (µg/sheet) show respective mass (µg) of Ni, Mn, and Co per single sheet of the respective negative electrode active material layers, and were calculated from a calculation formula of: amount of Ni, Mn, and Co (%)/100×mass of single sheet of each negative electrode active material layer=amount of Ni, Mn, and Co (µg/sheet).

TABLE 14

|  | Mn | | Co | | Ni | |
|---|---|---|---|---|---|---|
|  | wt % | µg/sheet | wt % | µg/sheet | wt % | µg/sheet |
| Example 11 | <0.002 | <0.4 | <0.002 | <0.5 | <0.01 | <2 |
| Comparative Example 1 | 0.001 | 3.9 | 0.005 | 1.7 | 0.02 | 6 |

In Table 14, "<" represents being not higher than a quantification lower limit.

Ni, Co, and Mn that were deposited on the surface of the negative electrodes are speculated to have been eluted from the positive electrodes to the electrolytic solutions and deposited to the negative electrodes. Based on the results of Table 14, elution of metal was revealed to be small in the lithium ion secondary battery of Example 11 even after the cycle test of 500 cycles.

Evaluation Example 21: Rate Characteristics at Low Temperature

Reference Example 3

90 parts by mass of graphite which is an active material and whose mean particle diameter is 10 µm was mixed with 10 parts by mass of polyvinylidene fluoride which is a binding agent. The mixture was dispersed in a proper amount of N-methyl-2-pyrrolidone to create a slurry. As a current collector, a copper foil having a thickness of 20 µm was prepared. The slurry was applied in a film form on the surface of the copper foil by using a doctor blade. The copper foil on which the slurry was applied was dried to remove N-methyl-2-pyrrolidone, and then the copper foil was pressed to obtain a joined object. The obtained joined object was heated and dried in a vacuum dryer for 6 hours at 120° C. to obtain a copper foil having the active material layer formed thereon. This was used as the working electrode.

Metal Li was used as the counter electrode.

The working electrode, the counter electrode, a separator (Whatman glass fiber filter paper manufactured by GE Healthcare Japan Corp.) interposed therebetween and having a thickness of 400 µm, and electrolytic solution E21 were housed in a battery case (CR2032 type coin cell case manufactured by Hohsen Corp.) to form a half-cell. This was used as a half-cell of Reference Example 3.

Reference Example 4

A half-cell of Reference Example 4 was obtained using a method similar that for the half-cell of Reference Example 3, except for using electrolytic solution C5 as the electrolytic solution.

By using the half-cells of Reference Examples 3 and 4, rate characteristics at −20° C. were evaluated in the following manner. The results are shown in FIGS. 58 and 59.

(1) Current is supplied in a direction that causes occlusion of lithium to the negative electrode (evaluation electrode).
(2) Voltage range: From 2 V down to 0.01 V (v.s. Li/Li$^+$).
(3) Rate: 0.02C, 0.05C, 0.1C, 0.2C, and 0.5C (stop current after reaching 0.01 V).

1C represents a current value required for fully charging or discharging a battery in 1 hour under constant current.

Figure 58:
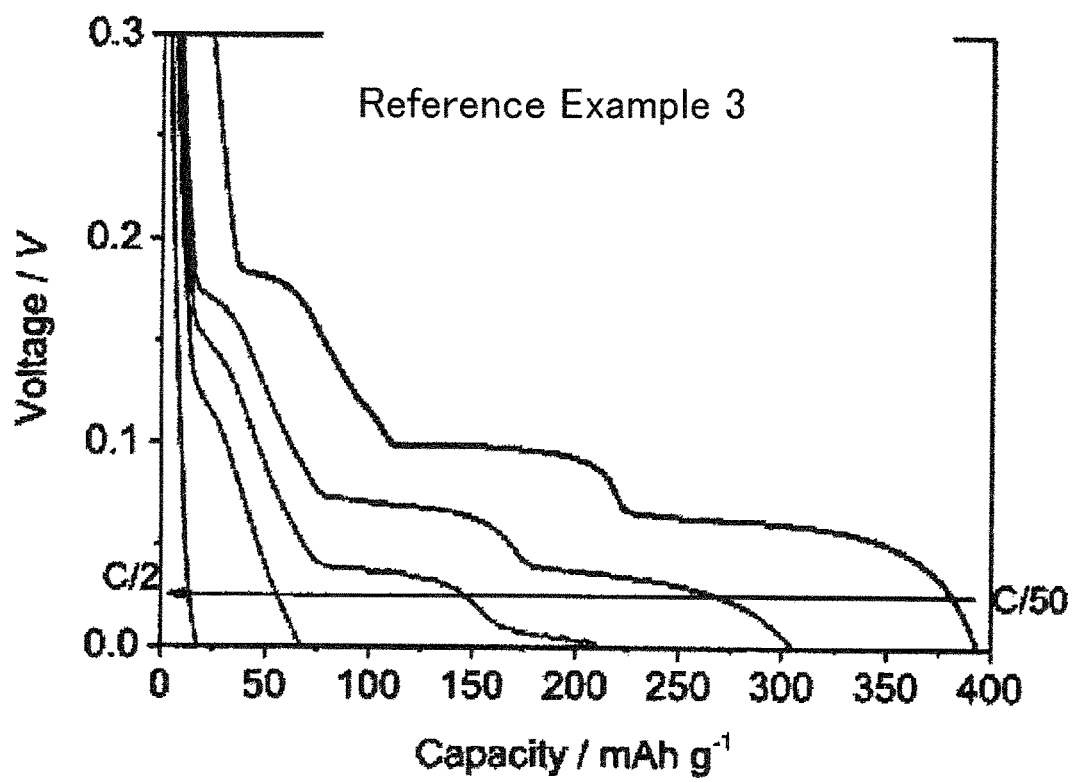
FIG. 58 is a graph showing voltage curves of a half-cell of Reference Example 3 at respective current rates.
Figure 59:
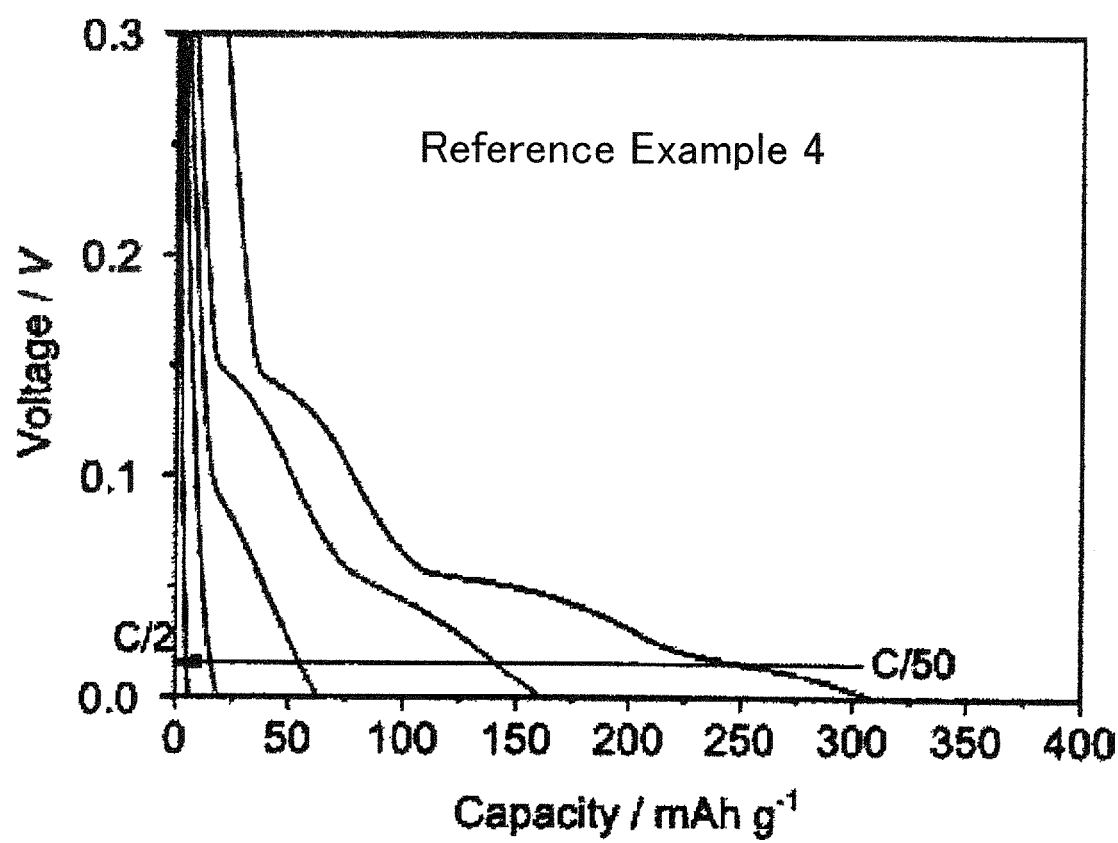
FIG. 59 is a graph showing voltage curves of a half-cell of Reference Example 4 at respective current rates.

Based on FIGS. 58 and 59, voltage curves of the half-cell of Reference Example 3 are understood as to show high voltage at each of the current rates when compared to voltage curves of the half-cell of Reference Example 4. The lithium ion secondary battery using the electrolytic solution of the present invention was confirmed to show excellent rate characteristics even in a low temperature environment.

Evaluation Example 22: Internal Resistance of Battery

Example 13

A lithium ion secondary battery of Example 13 using electrolytic solution E8 was produced in the following manner.

90 parts by mass of a lithium containing metal oxide having a layered rock salt structure and represented by $LiNi_{5/10}CO_{2/10}Mn_{3/10}O_2$, which is a positive electrode active material, 8 parts by mass of acetylene black, which is a conductive additive, and 2 parts by mass of polyvinylidene fluoride, which is a binding agent, were mixed. The mixture was dispersed in a proper amount of N-methyl-2-pyrrolidone to create a slurry. As the positive electrode current collector, an aluminum foil having a thickness of 20 µm was prepared. The slurry was applied in a film form on the surface of the aluminum foil by using a doctor blade. The aluminum foil on which the slurry was applied was dried for 20 minutes at 80° C. to remove N-methyl-2-pyrrolidone through volatilization. Then, the aluminum foil was pressed to obtain a joined object. The obtained joined object was heated and dried in a vacuum dryer for 6 hours at 120° C. to obtain an aluminum foil having the positive electrode active material layer formed thereon. This was used as the positive electrode.

98 parts by mass of natural graphite, which is a negative electrode active material, and 1 part by mass of a styrene butadiene rubber and 1 part by mass of carboxymethyl cellulose, which are binding agents, were mixed. The mixture was dispersed in a proper amount of ion exchanged water to create a slurry. As the negative electrode current collector, a copper foil having a thickness of 20 µm was prepared. The slurry was applied in a film form on the surface of the copper foil by using a doctor blade. The copper foil on which the slurry was applied was dried to remove water, and then the copper foil was pressed to obtain a joined object. The obtained joined object was heated and dried in a vacuum dryer for 6 hours at 100° C. to obtain a copper foil having the negative electrode active material layer formed thereon. This was used as the negative electrode.

As the separator, a nonwoven fabric made from cellulose and having a thickness of 20 µm was prepared.

An electrode assembly was formed by sandwiching the separator between the positive electrode and the negative electrode. The electrode assembly was covered with a set of two sheets of a laminate film. The laminate film was formed into a bag-like shape by having three sides thereof sealed, and electrolytic solution E8 was poured in the laminate film. Four sides were sealed airtight by sealing the remaining one side to obtain a lithium ion secondary battery in which the electrode assembly and the electrolytic solution were sealed. This battery was used as the lithium ion secondary battery of Example 13.

Example 14

A lithium ion secondary battery of Example 14 was obtained using a method similar to that in Example 13, except for using electrolytic solution E10 as the electrolytic solution.

Example 15

A lithium ion secondary battery of Example 15 was obtained using a method similar to that in Example 13, except for using electrolytic solution E12 as the electrolytic solution.

Comparative Example 8

A lithium ion secondary battery of Comparative Example 8 was obtained using a method similar to that in Example 13, except for using electrolytic solution C5 as the electrolytic solution.

The lithium ion secondary batteries of Examples 13 to 15 and Comparative Example 8 were prepared, and internal resistances of the batteries were evaluated.

Figure 60:
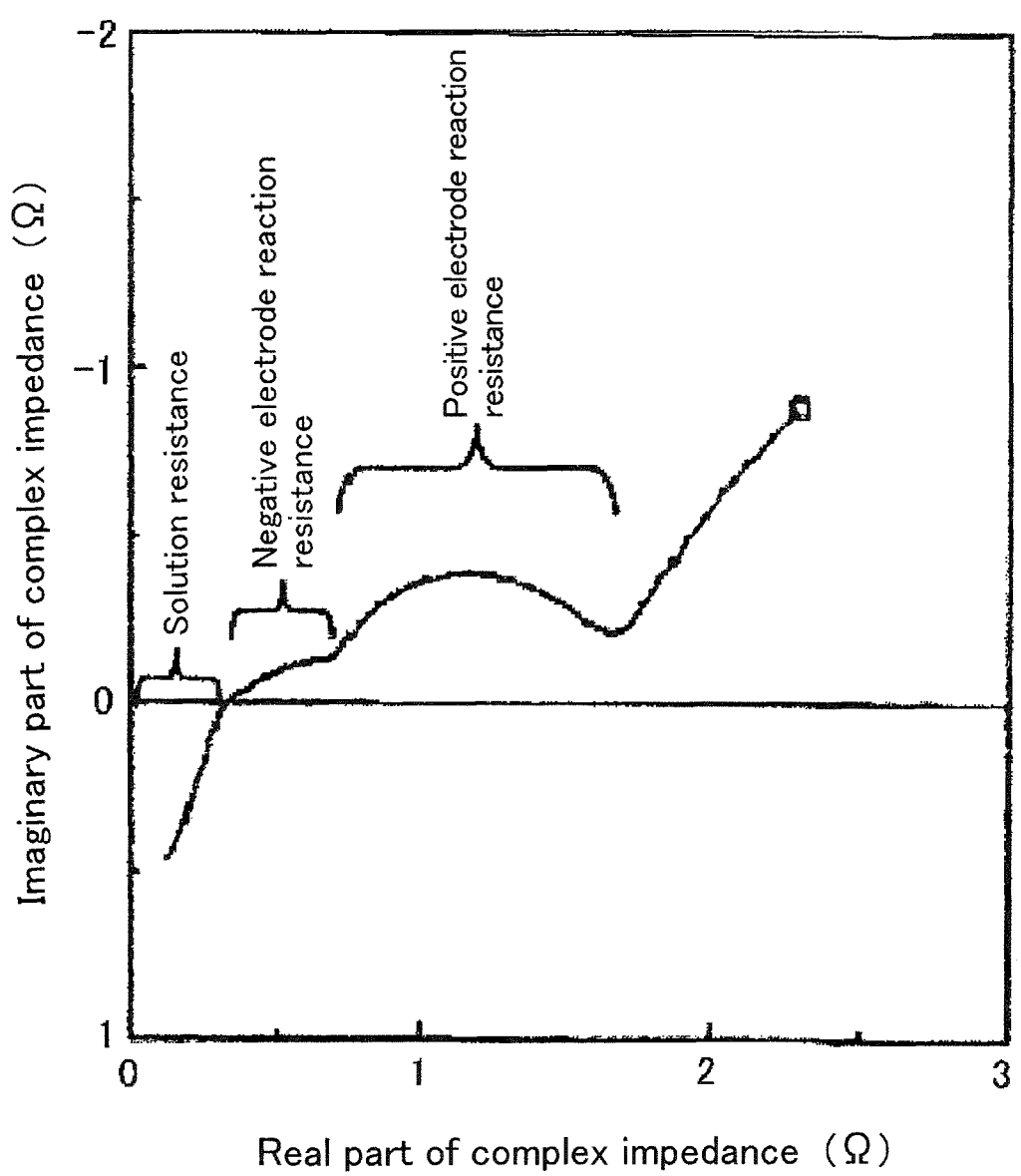
FIG. 60 is a planar plot of complex impedance of a battery in Evaluation Example 22.

With each of the lithium ion secondary batteries, CC charging and discharging, i.e., constant current charging and discharging, were repeated at room temperature in a range of 3.0 V to 4.1 V (vs. Li reference). Then, an alternating current impedance after the first charging and discharging and an alternating current impedance after 100 cycles were measured. Based on obtained complex impedance planar plots, reaction resistances of electrolytic solutions, negative electrodes, and positive electrodes were each analyzed. As shown in FIG. 60, two circular arcs were observed in a complex impedance planar plot. A circular arc on the left side of the figure (i.e., a side in which the real part of complex impedance is smaller) is referred to as a first circular arc. A circular arc on the right side of the figure is referred to as a second circular arc. Reaction resistance of a negative electrode was analyzed based on the size of the first circular arc, and reaction resistance of a positive electrode was analyzed based on the size of the second circular arc. Resistance of an electrolytic solution was analyzed based on a plot continuing from the first circular arc toward the leftmost side in FIG. 60. The analysis results are shown in Tables 15 and 16. Table 15 shows a resistance of an electrolytic solution (i.e., solution resistance), a reaction resistance of a negative electrode, and a reaction resistance of a positive electrode after the first charging and discharging. Table 16 shows respective resistances after 100 cycles.

TABLE 15

<Initial alternating-current resistance> Unit: Ω

|  | Example 13 | Example 14 | Example 15 | Comparative Example 8 |
| --- | --- | --- | --- | --- |
| Electrolytic solution | Electrolytic solution E8 | Electrolytic solution E10 | Electrolytic solution E12 | Electrolytic solution C5 |
| Organic Solvent | AN | DMC | DMC | EC/DEC |
| Metal salt | LiFSA | LiFSA | LiFSA | $LiPF_6$ |
| Solution resistance | 0.3 | 0.5 | 0.4 | 0.3 |
| Negative electrode reaction resistance | 0.4 | 0.5 | 0.4 | 0.4 |
| Positive electrode reaction resistance | 0.1 | 0.5 | 0.5 | 1.0 |

TABLE 16

<Alternating-current resistance after 100 cycles> Unit: Ω

|  | Example 13 | Example 14 | Example 15 | Comparative Example 8 |
|---|---|---|---|---|
| Electrolytic solution | Electrolytic solution E8 | Electrolytic solution E10 | Electrolytic solution E12 | Electrolytic solution C5 |
| Organic Solvent | AN | DMC | DMC | EC/DEC |
| Metal salt | LiFSA | LiFSA | LiFSA | LiPF$_6$ |
| Solution resistance | 0.3 | 0.5 | 0.3 | 0.3 |
| Negative electrode reaction resistance | 0.2 | 0.4 | 0.3 | 0.4 |
| Positive electrode reaction resistance | 0.3 | 0.2 | 0.2 | 0.6 |
| Durability | A | AA | AA | B |

As shown in Tables 15 and 16, in each of the lithium ion secondary batteries, the reaction resistance of the negative electrode and the reaction resistance of the positive electrode tended to decrease after 100 cycles when compared to respective resistances after the first charging and discharging. After 100 cycles as shown in Table 16, the reaction resistances of the negative electrodes and the reaction resistances of the positive electrodes of the lithium ion secondary batteries of Examples 13 to 15 were lower compared to the reaction resistance of the negative electrode and the reaction resistance of the positive electrode of the lithium ion secondary battery of Comparative Example 8.

The solution resistances of the electrolytic solutions in the lithium ion secondary batteries of Examples 13 and 15 and Comparative Example 8 were almost identical, whereas the solution resistance of the electrolytic solution of the lithium ion secondary battery of Example 14 was higher compared to those of Examples 13 and 15 and Comparative Example 8. In addition, the solution resistance of each of the electrolytic solutions of the lithium ion secondary batteries was comparable between after the first charging and discharging and after 100 cycles. Thus, deterioration in durability is considered not to be occurring in each of the electrolytic solutions. The difference that emerged between the reaction resistance of the negative electrode and the reaction resistance of the positive electrode in the Comparative Example and Examples is considered to be occurring in the electrode itself and not related to deterioration in durability of the electrolytic solution.

Internal resistance of a lithium ion secondary battery is comprehensively determined from a solution resistance of an electrolytic solution, a reaction resistance of a negative electrode, and a reaction resistance of a positive electrode. Based on the results in Tables 15 and 16 and from a standpoint of suppressing an increase in internal resistance of a lithium ion secondary battery, the lithium ion secondary batteries of Examples 14 and 15 are considered to excel the most in terms of durability, and the lithium ion secondary battery of Example 13 is considered to excel the next in terms of durability.

Evaluation Example 23: Cycle Durability of Battery

With the lithium ion secondary batteries of Examples 13 to 15 and Comparative Example 8, CC charging and discharging were repeated at room temperature in a range of 3.0 V to 4.1 V (vs. Li reference), and a discharge capacity at the first charging and discharging, a discharge capacity at the 100th cycle, and a discharge capacity at the 500th cycle were measured. When a capacity of each of the lithium ion secondary batteries at the first charging and discharging was defined as 100%, capacity retention rate (%) of each of the lithium ion secondary batteries at the 100th cycle and the 500th cycle was calculated. The results are shown in Table 17.

TABLE 17

|  | Example 13 | Example 14 | Example 15 | Comparative Example 8 |
|---|---|---|---|---|
| Electrolytic solution | Electrolytic solution E8 | Electrolytic solution E10 | Electrolytic solution E12 | Electrolytic solution C5 |
| Organic Solvent | AN | DMC | DMC | EC/DEC |
| Metal salt | LiFSA | LiFSA | LiFSA | LiPF$_6$ |
| 100-Cycle capacity retention rate (%) | 92 | 97 | 97 | 96 |
| 500-Cycle capacity retention rate (%) | 67 | 90 | — | 85 |

As shown in Table 17, the lithium ion secondary batteries of Examples 13 to 15, even though not containing EC that becomes a material of SEI, showed an capacity retention rate at 100 cycles comparable to that of the lithium ion secondary battery of Comparative Example 8 containing EC. The reason may be that a coating originated from the electrolytic solution of the present invention exists on the positive electrode and the negative electrode of each of the lithium ion secondary batteries of Examples 13 to 15. The lithium ion secondary battery of Example 14 showed an extremely high capacity retention rate even after 500 cycles, and was particularly excellent in durability. From this result, durability is considered to improve more when DMC is selected as the organic solvent of the electrolytic solution compared to when AN is selected.

The following specific electrolytic solutions are provided as the electrolytic solution of the present invention. The following electrolytic solutions also include those previously stated.

(Electrolytic Solution A)

The electrolytic solution of the present invention was produced in the following manner.

Approximately 5 mL of 1,2-dimethoxyethane, which is an organic solvent, was placed in a flask including a stirring bar and a thermometer. Under a stirring condition, with respect to 1,2-dimethoxyethane in the flask, $(CF_3SO_2)_2NLi$, which is a lithium salt, was gradually added so as to maintain a solution temperature equal to or lower than 40° C. to be dissolved. Since dissolving of $(CF_3SO_2)_2NLi$ momentarily stagnated at a time point when approximately 13 g of $(CF_3SO_2)_2NLi$ was added, the flask was heated by placing the flask in a temperature controlled bath such that the solution temperature in the flask reaches 50° C. to dissolve $(CF_3SO_2)_2NLi$. Since dissolving of $(CF_3SO_2)_2NLi$ stagnated again at a time point when approximately 15 g of $(CF_3SO_2)_2NLi$ was added, a single drop of 1,2-dimethoxyethane was added thereto using a pipette to dissolve $(CF_3SO_2)_2NLi$. Furthermore, $(CF_3SO_2)_2NLi$ was gradually added to accomplish adding an entire predetermined amount of $(CF_3SO_2)_2NLi$. The obtained electrolytic solution was transferred to a 20-mL measuring flask, and 1,2-dimethoxyethane was added thereto until a volume of 20 mL was obtained. The volume of the obtained electrolytic solution was 20 mL, and 18.38 g of $(CF_3SO_2)_2NLi$ was contained in the electrolytic solution. This was used as electrolytic solution A. In electrolytic solution A, the concentration of $(CF_3SO_2)_2NLi$ was 3.2 mol/L and the density was 1.39 g/cm$^3$. The density was measured at 20° C.

The production was performed within a glovebox under an inert gas atmosphere.

(Electrolytic Solution B)

With a method similar to that of electrolytic solution A, electrolytic solution B whose concentration of $(CF_3SO_2)_2NLi$ was 2.8 mol/L and whose density was 1.36 g/cm$^3$ was produced.

(Electrolytic Solution C)

Approximately 5 mL of acetonitrile, which is an organic solvent, was placed in a flask including a stirring bar. Under a stirring condition, with respect to acetonitrile in the flask, $(CF_3SO_2)_2NLi$, which is a lithium salt, was gradually added to be dissolved. A predetermined amount of $(CF_3SO_2)_2NLi$ was added to the flask, and stirring was performed overnight in the flask. The obtained electrolytic solution was transferred to a 20-mL measuring flask, and acetonitrile was added thereto until a volume of 20 mL was obtained. This was used as electrolytic solution C. The production was performed within a glovebox under an inert gas atmosphere.

Electrolytic solution C contained $(CF_3SO_2)_2NLi$ at a concentration of 4.2 mol/L, and had a density of 1.52 g/cm$^3$.

(Electrolytic Solution D)

With a method similar to that of electrolytic solution C, electrolytic solution D whose concentration of $(CF_3SO_2)_2NLi$ was 3.0 mol/L and whose density was 1.31 g/cm$^3$ was produced.

(Electrolytic Solution E)

With a method similar to that of electrolytic solution C except for using sulfolane as the organic solvent, electrolytic solution E whose concentration of $(CF_3SO_2)_2NLi$ was 3.0 mol/L and whose density was 1.57 g/cm$^3$ was produced.

(Electrolytic Solution F)

With a method similar to that of electrolytic solution C except for using dimethyl sulfoxide as the organic solvent, electrolytic solution F whose concentration of $(CF_3SO_2)_2NLi$ was 3.2 mol/L and whose density was 1.49 g/cm$^3$ was produced.

(Electrolytic Solution G)

With a method similar to that of electrolytic solution C except for using $(FSO_2)_2NLi$ as the lithium salt and using 1,2-dimethoxyethane as the organic solvent, electrolytic solution G whose concentration of $(FSO_2)_2NLi$ was 4.0 mol/L and whose density was 1.33 g/cm$^3$ was produced.

(Electrolytic Solution H)

With a method similar to that of electrolytic solution G, electrolytic solution H whose concentration of $(FSO_2)_2NLi$ was 3.6 mol/L and whose density was 1.29 g/cm$^3$ was produced.

(Electrolytic Solution I)

With a method similar to that of electrolytic solution G, electrolytic solution I whose concentration of $(FSO_2)_2NLi$ was 2.4 mol/L and whose density was 1.18 g/cm$^3$ was produced.

(Electrolytic Solution J)

With a method similar to that of electrolytic solution G except for using acetonitrile as the organic solvent, electrolytic solution J whose concentration of $(FSO_2)_2NLi$ was 5.0 mol/L and whose density was 1.40 g/cm$^3$ was produced.

(Electrolytic Solution K)

With a method similar to that of electrolytic solution J, electrolytic solution K whose concentration of $(FSO_2)_2NLi$ was 4.5 mol/L and whose density was 1.34 g/cm$^3$ was produced.

(Electrolytic Solution L)

Approximately 5 mL of dimethyl carbonate, which is an organic solvent, was placed in a flask including a stirring bar. Under a stirring condition, with respect to dimethyl carbonate in the flask, $(FSO_2)_2NLi$, which is a lithium salt, was gradually added to be dissolved. A total amount of 14.64 g of $(FSO_2)_2NLi$ was added to the flask, and stirring was performed overnight in the flask. The obtained electrolytic solution was transferred to a 20-mL measuring flask, and dimethyl carbonate was added thereto until a volume of 20 mL was obtained. This was used as electrolytic solution L. The production was performed within a glovebox under an inert gas atmosphere.

The concentration of $(FSO_2)2NLi$ in electrolytic solution L was 3.9 mol/L, and the density of electrolytic solution L was 1.44 g/cm$^3$.

(Electrolytic Solution M)

With a method similar to that of electrolytic solution L, electrolytic solution M whose concentration of $(FSO_2)_2NLi$ was 2.9 mol/L and whose density was 1.36 g/cm$^3$ was produced.

(Electrolytic Solution N)

Approximately 5 mL of ethyl methyl carbonate, which is an organic solvent, was placed in a flask including a stirring bar. Under a stirring condition, with respect to ethyl methyl carbonate in the flask, $(FSO_2)_2NLi$, which is a lithium salt, was gradually added to be dissolved. A total amount of 12.81 g of $(FSO_2)_2NLi$ was added to the flask, and stirring was performed overnight in the flask. The obtained electrolytic solution was transferred to a 20-mL measuring flask, and ethyl methyl carbonate was added thereto until a volume of 20 mL was obtained. This was used as electrolytic solution N. The production was performed within a glovebox under an inert gas atmosphere.

The concentration of $(FSO_2)_2NLi$ in electrolytic solution N was 3.4 mol/L, and the density of electrolytic solution N was 1.35 g/cm$^3$.

(Electrolytic Solution O)

Approximately 5 mL of diethyl carbonate, which is an organic solvent, was placed in a flask including a stirring bar. Under a stirring condition, with respect to diethyl carbonate in the flask, $(FSO_2)_2NLi$, which is a lithium salt, was gradually added to be dissolved. A total amount of 11.37 g of $(FSO_2)_2NLi$ was added to the flask, and stirring was performed overnight in the flask. The obtained electrolytic solution was transferred to a 20-mL measuring flask, and diethyl carbonate was added thereto until a volume of 20 mL was obtained. This was used as electrolytic solution O. The production was performed within a glovebox under an inert gas atmosphere.

The concentration of $(FSO_2)_2NLi$ in electrolytic solution O was 3.0 mol/L, and the density of electrolytic solution O was 1.29 g/cm$^3$.

Table 18 shows a list of the electrolytic solutions described above.

TABLE 18

| | Lithium Salt | Organic Solvent | Density d (g/cm$^3$) |
|---|---|---|---|
| Electrolytic solution A | LiTFSA | DME | 1.39 |

TABLE 18-continued

| | Lithium Salt | Organic Solvent | Density d (g/cm³) |
|---|---|---|---|
| Electrolytic solution B | LiTFSA | DME | 1.36 |
| Electrolytic solution C | LiTFSA | AN | 1.52 |
| Electrolytic solution D | LiTFSA | AN | 1.31 |
| Electrolytic solution E | LiTFSA | SL | 1.57 |
| Electrolytic solution F | LiTFSA | DMSO | 1.49 |
| Electrolytic solution G | LiFSA | DME | 1.33 |
| Electrolytic solution H | LiFSA | DME | 1.29 |
| Electrolytic solution I | LiFSA | DME | 1.18 |
| Electrolytic solution J | LiFSA | AN | 1.40 |
| Electrolytic solution K | LiFSA | AN | 1.34 |
| Electrolytic solution L | LiFSA | DMC | 1.44 |
| Electrolytic solution M | LiFSA | DMC | 1.36 |
| Electrolytic solution N | LiFSA | EMC | 1.35 |
| Electrolytic solution O | LiFSA | DEC | 1.29 |

LiTFSA: $(CF_3SO_2)_2NLi$,
LiFSA: $(FSO_2)_2NLi$
AN: acetonitrile,
DME: 1,2-dimethoxyethane
DMSO: dimethyl sulfoxide,
SL: sulfolane
DMC: dimethyl carbonate,
EMC: ethyl methyl carbonate,
DEC: diethyl carbonate

The invention claimed is:

1. A nonaqueous electrolyte secondary battery comprising a positive electrode, a negative electrode, and an electrolytic solution, wherein
the positive electrode has a positive electrode current collector formed of aluminum or an aluminum alloy,
the electrolytic solution contains a salt whose cation is an alkali metal, an alkaline earth metal, or aluminum, and an organic solvent,
a salt concentration c (mol/L) of the electrolytic solution is within a range of $2.2 \leq c$,
the organic solvent comprises a linear carbonate represented by formula (10) below:

$$R^{19}OCOOR^{20} \quad \text{Formula (10)},$$

in Formula (10), $R^{19}$ and $R^{20}$ are each independently selected from $C_nH_aF_bCl_cBr_dI_e$ that is a linear alkyl or $C_mH_fF_gCl_hBr_iI_j$ whose chemical structure includes a cyclicalkyl, "n," "a," "b," "c," "d," "e," "m," "f," "g," "h," "i," and "j" are each independently an integer not smaller than 0, and satisfy $2n+1=a+b+c+d+e$ and $2m-1=f+g+h+i+j$,
regarding an intensity of a peak derived from the linear carbonate in a vibrational spectroscopy spectrum of the electrolytic solution, Is>Io is satisfied when an intensity of an original peak of the linear carbonate is represented as Io and an intensity of a peak resulting from shifting of the original peak is represented as Is, and
an ionic conductivity σ (mS/cm) of the electrolytic solution is 3<σ<100 mS/cm.

2. The nonaqueous electrolyte secondary battery according to claim 1, wherein the cation of the salt is lithium.

3. The nonaqueous electrolyte secondary battery according to claim 1, wherein a chemical structure of an anion of the salt includes at least one element selected from a halogen, boron, nitrogen, oxygen, sulfur, or carbon.

4. The nonaqueous electrolyte secondary battery according to claim 1, wherein a chemical structure of an anion of the salt is represented by formula (1), formula (2), or formula (3) below:

$$(R^1X^1)(R^2X^2)N \quad \text{Formula (1)}$$

($R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^2$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^1$ and $R^2$ optionally bind with each other to form a ring, $X^1$ is selected from $SO_2$, C=O, C=S, $R^aP$=O, $R^bP$=S, S=O, or Si=O, $X^2$ is selected from $SO_2$, C=O, C=S, $R^cP$=O, $R^dP$=S, S=O, or Si=O, $R^a$, $R^b$, $R^c$, and $R^d$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^a$, $R^b$, $R^c$, and $R^d$ each optionally bind with $R^1$ or $R^2$ to form a ring);

$$R^3X^3Y \quad \text{Formula (2)}$$

($R^3$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $X^3$ is selected from $SO_2$, C=O, C=S, $R^eP$=O, $R^fP$=S, S=O, or Si=O, $R^e$ and $R^f$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^e$ and $R^f$ each optionally bind with $R^3$ to form a ring, Y is selected from O or S); and $(R^4X^4)(R^5X^5)(R^6X^6)C$ <span></span> Formula (3)

($R^4$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^5$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^6$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, any two or three of $R^4$, $R^5$, and $R^6$ optionally bind with each other to form a ring, $X^4$ is selected from $SO_2$, C=O, C=S, $R^gP$=O, $R^hP$=S, S=O, or Si=O, $X^5$ is selected from $SO_2$, C=O, C=S, $R^iP$=O, $R^jP$=S, S=O, or Si=O, $X^6$ is selected from $SO_2$, C=O, C=S, $R^kP$=O, $R^lP$=S, S=O, or Si=O, $R^g$, $R^h$, $R^i$, $R^j$, $R^k$, and $R^l$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^g$, $R^h$, $R^i$, $R^j$, $R^k$, and $R^l$ each optionally bind with $R^4$, $R^5$, or $R^6$ to form a ring).

5. The nonaqueous electrolyte secondary battery according to claim 1, wherein a chemical structure of an anion of the salt is represented by formula (4), formula (5), or formula (6) below:

$(R^7X^7)(R^8X^8)N$ <span></span> Formula (4)

($R^7$ and $R^8$ are each independently $C_nH_aF_bCl_cBr_dI_e(CN)_f(SCN)_g(OCN)_h$, "n," "a," "b," "c," "d," "e," "f," "g," and "h" are each independently an integer not smaller than 0, and satisfy $2n+1=a+b+c+d+e+f+g+h$, $R^7$ and $R^8$ optionally bind with each other to form a ring, and, in that case, satisfy $2n=a+b+c+d+e+f+g+h$, $X^7$ is selected from $SO_2$, C=O, C=S, $R^mP$=O, $R^nP$=S, S=O, or Si=O, $X^8$ is selected from $SO_2$, C=O, C=S, $R^oP$=O, $R^pP$=S, S=O, or Si=O, $R^m$, $R^n$, $R^o$, and $R^p$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^m$, $R^n$, $R^o$, and $R^p$ each optionally bind with $R^7$ or $R^8$ to form a ring);

$$R^9X^9Y \qquad \text{Formula (5)}$$

($R^9$ is $C_nH_aF_bCl_cBr_dI_e(CN)_f(SCN)_g(OCN)_h$,

"n," "a," "b," "c," "d," "e," "f," "g," and "h" are each independently an integer not smaller than 0, and satisfy 2n+1=a+b+c+d+e+f+g+h, $X^9$ is selected from $SO_2$, C=O, C=S, $R^qP$=O, $R^rP$=S, S=O, or Si=O, $R^q$ and $R^r$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^q$ and $R^r$ each optionally bind with $R^9$ to form a ring, Y is selected from O or S); and $$(R^{10}X^{10})(R^{11}X^{11})(R^{12}X^{12})C \qquad \text{General Formula (6)}$$

($R^{10}$, $R^{11}$, and $R^{12}$ are each independently $C_nH_aF_bCl_cBr_dI_e(CN)_f(SCN)_g(OCN)_h$, "n," "a," "b," "c," "d," "e," "f," "g," and "h" are each independently an integer not smaller than 0, and satisfy 2n+1=a+b+c+d+e+f+g+h, any two of $R^{10}$, $R^{11}$, and $R^{12}$ optionally bind with each other to form a ring, and, in that case, groups forming the ring satisfy 2n=a+b+c+d+e+f+g+h, Three of $R^{10}$, $R^{11}$, and $R^{12}$ optionally bind with each other to form a ring, and, in that case, among the three, two groups satisfy 2n=a+b+c+d+e+f+g+h and one group satisfies 2n−1=a+b+c+d+e+f+g+h, $X^{10}$ is selected from $SO_2$, C=O, C=S, $R^sP$=O, $R^tP$=S, S=O, or Si=O, $X^{11}$ is selected from $SO_2$, C=O, C=S, $R^uP$=O, $R^vP$=S, S=O, or Si=O, $X^{12}$ is selected from $SO_2$, C=O, C=S, $R^wP$=O, $R^xP$=S, S=O, or Si=O, $R^s$, $R^t$, $R^u$, $R^v$, $R^w$, and $R^x$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^s$, $R^t$, $R^u$, $R^v$, $R^w$, and $R^x$ each optionally bind with $R^{10}$, $R^{11}$, or $R^{12}$ to form a ring).

6. The nonaqueous electrolyte secondary battery according to claim 1, wherein a chemical structure of an anion of the salt is represented by the formula (7), formula (8), or formula (9) below:

$$(R^{13}SO_2)(R^{14}SO_2)N \qquad \text{Formula (7)}$$

($R^{13}$ and $R^{14}$ are each independently $C_nH_aF_bCl_cBr_dI_e$,

"n," "a," "b," "c," "d," and "e" are each independently an integer not smaller than 0, and satisfy 2n+1=a+b+c+d+e, $R^{13}$ and $R^{14}$ optionally bind with each other to form a ring, and, in that case, satisfy 2n=a+b+c+d+e);

$$R^{15}SO_3 \qquad \text{Formula (8)}$$

($R^{15}$ is $C_nH_aF_bCl_cBr_dI_e$,

"n," "a," "b," "c," "d," and "e" are each independently an integer not smaller than 0, and satisfy 2n+1=a+b+c+d+e); and $$(R^{16}SO_2)(R^{17}SO_2)(R^{18}SO_2)C \qquad \text{General Formula (9)}$$

($R^{16}$, $R^{17}$, and $R^{18}$ are each independently $C_nH_aF_bCl_cBr_dI_e$, "n," "a," "b," "c," "d," and "e" are each independently an integer not smaller than 0, and satisfy 2n+1=a+b+c+d+e, any two of $R^{16}$, $R^{17}$, and $R^{18}$ optionally bind with each other to form a ring, and, in that case, groups forming the ring satisfy 2n=a+b+c+d+e, Three of $R^{16}$, $R^{17}$, and $R^{18}$ optionally bind with each other to form a ring, and, in that case, among the three, two groups satisfy 2n=a+b+c+d+e and one group satisfies 2n−1=a+b+c+d+e).

7. The nonaqueous electrolyte secondary battery according to claim 1, wherein the salt is $(CF_3SO_2)_2NLi$, $(FSO_2)_2NLi$, $(C_2F_5SO_2)_2NLi$, $FSO_2(CF_3SO_2)NLi$, $(SO_2CF_2CF_2SO_2)NLi$, $SO_2CF_2CF_2CF_2SO_2)NLi$, $FSO_2(CH_3SO_2)NLi$, $FSO_2(C_2F_5SO_2)NLi$, or $FSO_2(C_2H_5SO_2)NLi$.

8. The nonaqueous electrolyte secondary battery according to claim 1, wherein the organic solvent further comprises acetonitrile or 1,2-dimethoxyethane.

9. The nonaqueous electrolyte secondary battery according to claim 1, wherein the the liner carbonate is selected from dimethyl carbonate, ethyl methyl carbonate, or diethyl carbonate.

10. The nonaqueous electrolyte secondary battery according to claim 1, wherein the nonaqueous electrolyte secondary battery is a lithium ion secondary battery.

11. The nonaqueous electrolyte secondary battery according to claim 1, wherein the electrolytic solution excludes a nonaqueous electrolytic solution in which a lithium salt, an ammonium salt, and at least one type of a fluorinated benzene selected from hexafluorobenzene, pentafluorobenzene, 1,2,3,4-tetrafluorobenzene, 1,2,3,5-tetrafluorobenzene, 1,2,4,5-tetrafluorobenzene, and 1,2,3-trifluorobenzene, is dissolved in at least one type of a nonaqueous solvent selected from the group consisting of ethylene carbonate, propylene carbonate, butylene carbonate, γ-butyrolactone, dimethyl carbonate, ethyl methyl carbonate, diethyl carbonate, dimethoxyethane, ethoxymethoxyethane, and diethoxyethane, and the electrolytic solution excludes an electrolytic solution containing LiN(SO$_2$CF$_3$)$_2$ as the salt and 1,2-dialkoxyethane as the organic solvent, and an electrolytic solution containing LiClO$_4$ as the salt and 1,2-dimethoxyethane as the organic solvent.

12. The nonaqueous electrolyte secondary battery according to claim 1, wherein
the electrolytic solution excludes a nonaqueous electrolytic solution in which a lithium salt, an ammonium salt, and at least one type of a fluorinated benzene selected from hexafluorobenzene, pentafluorobenzene, 1,2,3,4-tetrafluorobenzene, 1,2,3,5-tetrafluorobenzene, 1,2,4,5-tetrafluorobenzene, and 1,2,3-trifluorobenzene, is dissolved in at least one type of a nonaqueous solvent selected from the group consisting of ethylene carbonate, propylene carbonate, butylene carbonate, γ-butyrolactone, dimethyl carbonate, ethyl methyl carbonate, diethyl carbonate, dimethoxyethane, ethoxymethoxyethane, and diethoxyethane, and
the organic solvent further comprises one or more ethers selected from the group consisting of tetrahydrofuran, 1,2-dioxane, 1,3-dioxane, 1,4-dioxane, 2,2-dimethyl-1,3-dioxolane, 2-methyltetrahydropyran, 2-methyltetrahydrofuran, or a crown ether, nitriles, amides, isocyanates, esters, epoxies, oxazoles, ketones, acid anhydrides, sulfones, sulfoxides, nitros, furans, cyclic esters, aromatic heterocycles, heterocycles, and phosphoric acid esters.

13. The nonaqueous electrolyte secondary battery according to claim 1, wherein
the electrolytic solution excludes a nonaqueous electrolytic solution in which a lithium salt, an ammonium salt, and at least one type of a fluorinated benzene selected from hexafluorobenzene, pentafluorobenzene, 1,2,3,4-tetrafluorobenzene, 1,2,3,5-tetrafluorobenzene, 1,2,4,5-tetrafluorobenzene, and 1,2,3-trifluorobenzene, is dissolved in at least one type of a nonaqueous solvent selected from the group consisting of ethylene carbonate, propylene carbonate, butylene carbonate, γ-butyrolactone, dimethyl carbonate, ethyl methyl carbonate, diethyl carbonate, dimethoxyethane, ethoxymethoxyethane, and diethoxyethane, and
the organic solvent further comprises one or more selected from the group consisting of acetonitrile, propionitrile, acrylonitrile, tetrahydrofuran, 1,2-dioxane, 1,3-dioxane, 1,4-dioxane, 2,2-dimethyl-1,3-dioxolane, 2-methyltetrahydropyran, 2-methyltetrahydrofuran, a crown ether, ethylene carbonate, propylene carbonate, formamide, N,N-dimethylformamide, N,N-dimethylacetamide, N-methylpyrrolidone, isopropyl isocyanate, n-propylisocyanate, methyl acetate, ethyl acetate, propyl acetate, methyl propionate, methyl formate, ethyl formate, vinyl acetate, methyl acrylate, methyl methacrylate, oxazole, acetone, methyl ethyl ketone, methyl isobutyl ketone, acetic anhydride, propionic anhydride, sulfolane, dimethyl sulfoxide, 1-nitropropane, 2-nitropropane, furan, furfural, γ-butyrolactone, γ-valerolactone, δ-valerolactone, thiophene, pyridine, 1-methylpyrrolidine, N-methylmorpholine, trimethyl phosphate, and triethyl phosphate.

14. The nonaqueous electrolyte secondary battery according to claim 1, wherein a relationship between the Io and the Is is Is>2×Io.

15. The nonaqueous electrolyte secondary battery according to claim 1, wherein a density d (g/cm$^3$) of the electrolytic solution is 1.2≤d≤2.2.

16. The nonaqueous electrolyte secondary battery according to claim 1, wherein
the cation is lithium, and
a chemical structure of an anion of the salt is represented by formula (7) below:

$$(R^{13}SO_2)(R^{14}SO_2)N \qquad \text{Formula (7)}$$

($R^{13}$ and $R^{14}$ are each independently $C_nH_aF_bCl_cBr_dI_e$,
"n," "a," "b," "c," "d," and "e" are each independently an integer not smaller than 0, and satisfy 2n+1=a+b+c+d+e,
$R^{13}$ and $R^{14}$ optionally bind with each other to form a ring, and, in that case, satisfy 2n=a+b+c+d+e,
"n" is an integer from 0 to 6, when $R^{13}$ and $R^{14}$ bind with each other to form a ring, "n" is an integer from 1 to 8).

17. The nonaqueous electrolyte secondary battery according to claim 1, wherein
the cation is lithium,
a chemical structure of an anion of the salt is represented by formula (7) below:

$$(R^{13}SO_2)(R^{14}SO_2)N \qquad \text{Formula (7)}$$

($R^{13}$ and $R^{14}$ are each independently $C_nH_aF_bCl_cBr_dI_e$,
"n," "a," "b," "c," "d," and "e" are each independently an integer not smaller than 0, and satisfy 2n+1=a+b+c+d+e,
$R^{13}$ and $R^{14}$ optionally bind with each other to form a ring, and, in that case, satisfy 2n=a+b+c+d+e,
"n" is an integer from 0 to 6, when $R^{13}$ and $R^{14}$ bind with each other to form a ring, "n" is an integer from 1 to 8), and
the electrolytic solution excludes: a nonaqueous electrolytic solution in which a lithium salt, an ammonium salt, and at least one type of a fluorinated benzene selected from hexafluorobenzene, pentafluorobenzene, 1,2,3,4-tetrafluorobenzene, 1,2,3,5-tetrafluorobenzene, 1,2,4,5-tetrafluorobenzene, and 1,2,3-trifluorobenzene, is dissolved in at least one type of a nonaqueous solvent selected from the group consisting of ethylene carbonate, propylene carbonate, butylene carbonate, γ-butyrolactone, dimethyl carbonate, ethyl methyl carbonate, diethyl carbonate, dimethoxyethane, ethoxymethoxyethane, and diethoxyethane; and an electrolytic solution containing LiN(SO$_2$CF$_3$)$_2$ as the salt and 1,2-dialkoxyethane as the organic solvent.

18. The nonaqueous electrolyte secondary battery according to claim 1, wherein
the cation is lithium,
a chemical structure of an anion of the salt is represented by formula (7) below:

$$(R^{13}SO_2)(R^{14}SO_2)N \qquad \text{Formula (7)}$$

($R^{13}$ and $R^{14}$ are each independently $C_nH_aF_bCl_cBr_dI_e$,
"n," "a," "b," "c," "d," and "e" are each independently an integer not smaller than 0, and satisfy 2n+1=a+b+c+d+e,
$R^{13}$ and $R^{14}$ optionally bind with each other to form a ring, and, in that case, satisfy 2n=a+b+c+d+e,
"n" is an integer from 0 to 6, when $R^{13}$ and $R^{14}$ bind with each other to form a ring, "n" is an integer from 1 to 8),
the electrolytic solution excludes a nonaqueous electrolytic solution in which a lithium salt, an ammonium salt, and at least one type of a fluorinated benzene selected from hexafluorobenzene, pentafluorobenzene, 1,2,3,4-tetrafluorobenzene, 1,2,3,5-tetrafluorobenzene, 1,2,4,5-tetrafluorobenzene, and 1,2,3-trifluorobenzene, is dissolved in at least one type of a nonaqueous solvent selected from the group consisting of ethylene carbonate, propylene carbonate, butylene carbonate, γ-butyrolactone, dimethyl carbonate, ethyl methyl carbonate, diethyl carbonate, dimethoxyethane, ethoxymethoxyethane, and diethoxyethane, and the organic solvent further comprises one or more ethers selected from the group consisting of tetrahydrofuran, 1,2-dioxane, 1,3-dioxane, 1,4-dioxane, 2,2-dimethyl-1,3-dioxolane, 2-methyltetrahydropyran, 2-methyltetrahydrofuran, a crown ether, nitriles, amides, isocyanates, esters, epoxies, oxazoles, ketones, acid anhydrides, sulfones, sulfoxides, nitros, furans, cyclic esters, aromatic heterocycles, heterocycles, and phosphoric acid esters.

19. The nonaqueous electrolyte secondary battery according to claim 1, wherein
the cation is lithium,
a chemical structure of an anion of the salt is represented by formula (7) below:

$$(R^{13}SO_2)(R^{14}SO_2)N \quad \text{Formula (7)}$$

($R^{13}$ and $R^{14}$ are each independently $C_nH_aF_bCl_cBr_dI_e$,
"n," "a," "b," "c," "d," "e" are each independently an integer not smaller than 0, and satisfy $2n+1=a+b+c+d+e$,
$R^{13}$ and $R^{14}$ optionally bind with each other to form a ring, and, in that case, satisfy $2n=a+b+c+d+e$,
"n" is an integer from 0 to 6, when $R^{13}$ and $R^{14}$ bind with each other to form a ring, "n" is an integer from 1 to 8),
the electrolytic solution excludes a nonaqueous electrolytic solution in which a lithium salt, an ammonium salt, and at least one type of a fluorinated benzene selected from hexafluorobenzene, pentafluorobenzene, 1,2,3,4-tetrafluorobenzene, 1,2,3,5-tetrafluorobenzene, 1,2,4,5-tetrafluorobenzene, and 1,2,3-trifluorobenzene, is dissolved in at least one type of a nonaqueous solvent selected from the group consisting of ethylene carbonate, propylene carbonate, butylene carbonate, γ-butyrolactone, dimethyl carbonate, ethyl methyl carbonate, diethyl carbonate, dimethoxyethane, ethoxymethoxyethane, and diethoxyethane, and the organic solvent further comprises one or more selected from the group consisting of acetonitrile, propionitrile, acrylonitrile, tetrahydrofuran, 1,2-dioxane, 1,3-dioxane, 1,4-dioxane, 2,2-dimethyl-1,3-dioxolane, 2-methyltetrahydropyran, 2-methyltetrahydrofuran, a crown ether, ethylene carbonate, propylene carbonate, formamide, N,N-dimethylformamide, N,N-dimethylacetamide, N-methylpyrrolidone, isopropyl isocyanate, n-propylisocyanate, methyl acetate, ethyl acetate, propyl acetate, methyl propionate, methyl formate, ethyl formate, vinyl acetate, methyl acrylate, methyl methacrylate, oxazole, acetone, methyl ethyl ketone, methyl isobutyl ketone, acetic anhydride, propionic anhydride, sulfolane, dimethyl sulfoxide, 1-nitropropane, 2-nitropropane, furan, furfural, γ-butyrolactone, γ-valerolactone, δ-valerolactone, thiophene, pyridine, 1-methylpyrrolidine, N-methylmorpholine, trimethyl phosphate, and triethyl phosphate.

20. The nonaqueous electrolyte secondary battery according to claim 1, wherein
the salt is at least one selected from $(CF_3SO_2)_2NLi$, $(FSO_2)_2NLi$, $(C_2F_5SO_2)_2NLi$, $FSO_2(CF_3SO_2)NLi$, $(SO_2CF_2CF_2SO_2)NLi$, $(SO_2CF_2CF_2CF_2SO_2)NLi$, $FSO_2(CH_3SO_2)NLi$, $FSO_2(C_2F_5SO_2)NLi$, or $FSO_2(C_2H_5SO_2)NLi$, the organic solvent further comprises one or more selected from the group consisting of acetonitrile, propionitrile, acrylonitrile, tetrahydrofuran, 1,2-dioxane, 1,3-dioxane, 1,4-dioxane, 2,2-dimethyl-1,3-dioxolane, 2-methyltetrahydropyran, 2-methyltetrahydrofuran, a crown ether, ethylene carbonate, propylene carbonate, formamide, N,N-dimethylformamide, N,N-dimethylacetamide, N-methylpyrrolidone, isopropyl isocyanate, n-propylisocyanate, methyl acetate, ethyl acetate, propyl acetate, methyl propionate, methyl formate, ethyl formate, vinyl acetate, methyl acrylate, methyl methacrylate, oxazole, acetone, methyl ethyl ketone, methyl isobutyl ketone, acetic anhydride, propionic anhydride, sulfolane, dimethyl sulfoxide, 1-nitropropane, 2-nitropropane, furan, furfural, γ-butyrolactone, γ-valerolactone, δ-valerolactone, thiophene, pyridine, 1-methylpyrrolidine, N-methylmorpholine, trimethyl phosphate, and triethyl phosphate.

21. The nonaqueous electrolyte secondary battery according to claim 1, wherein
the electrolytic solution excludes a nonaqueous electrolytic solution in which a lithium salt, an ammonium salt, and at least one type of a fluorinated benzene selected from hexafluorobenzene, pentafluorobenzene, 1,2,3,4-tetrafluorobenzene, 1,2,3,5-tetrafluorobenzene, 1,2,4,5-tetrafluorobenzene, and 1,2,3-trifluorobenzene, is dissolved in at least one type of a nonaqueous solvent selected from the group consisting of ethylene carbonate, propylene carbonate, butylene carbonate, γ-butyrolactone, dimethyl carbonate, ethyl methyl carbonate, diethyl carbonate, dimethoxyethane, ethoxymethoxyethane, and diethoxyethane, the salt is at least one selected from $(CF_3SO_2)_2NLi$, $(FSO_2)_2NLi$, $(C_2F_5SO_2)_2NLi$, $FSO_2(CF_3SO_2)NLi$, $(SO_2CF_2CF_2SO_2)NLi$, $(SO_2CF_2CF_2CF_2SO_2)NLi$, $FSO_2(CH_3SO_2)NLi$, $FSO_2(C_2F_5SO_2)NLi$, or $FSO_2(C_2H_5SO_2)NLi$, and the organic solvent further comprises one or more selected from the group consisting of acetonitrile, propionitrile, acrylonitrile, tetrahydrofuran, 1,2-dioxane, 1,3-dioxane, 1,4-dioxane, 2,2-dimethyl-1,3-dioxolane, 2-methyltetrahydropyran, 2-methyltetrahydrofuran, a crown ether, ethylene carbonate, propylene carbonate, formamide, N,N-dimethylformamide, N,N-dimethylacetamide, N-methylpyrrolidone, isopropyl isocyanate, n-propylisocyanate, methyl acetate, ethyl acetate, propyl acetate, methyl propionate, methyl formate, ethyl formate, vinyl acetate, methyl acrylate, methyl methacrylate, oxazole, acetone, methyl ethyl ketone, methyl isobutyl ketone, acetic anhydride, propionic anhydride, sulfolane, dimethyl sulfoxide, 1-nitropropane, 2-nitropropane, furan, furfural, γ-butyrolactone, γ-valerolactone, δ-valerolactone, thiophene, pyridine, 1-methylpyrrolidine, N-methylmorpholine, trimethyl phosphate, and triethyl phosphate.

22. The nonaqueous electrolyte secondary battery according to claim 1, wherein the salt is $(FSO_2)_2NLi$, and the linear carbonate is selected from dimethyl carbonate, ethyl methyl carbonate, or diethyl carbonate.

* * * * *